United States Patent
Alnafoosi et al.

(10) Patent No.: US 9,772,904 B2
(45) Date of Patent: *Sep. 26, 2017

(54) ROBUST RECEPTION OF DATA UTILIZING ENCODED DATA SLICES

(71) Applicant: International Business Machines Corporation, Armonk, NY (US)

(72) Inventors: Ahmad Alnafoosi, Streamwood, IL (US); Jason K. Resch, Chicago, IL (US); S. Christopher Gladwin, Chicago, IL (US)

(73) Assignee: INTERNATIONAL BUSINESS MACHINES COPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,273

(22) Filed: Feb. 24, 2017

(65) Prior Publication Data

US 2017/0161145 A1    Jun. 8, 2017

Related U.S. Application Data

(63) Continuation of application No. 13/959,262, filed on Aug. 5, 2013, and a continuation-in-part of
(Continued)

(51) Int. Cl.
*G06F 11/10* (2006.01)
*H04L 29/08* (2006.01)
*G06F 3/06* (2006.01)

(52) U.S. Cl.
CPC ......... *G06F 11/1076* (2013.01); *G06F 3/064* (2013.01); *G06F 3/067* (2013.01); *G06F 3/0619* (2013.01); *H04L 67/1097* (2013.01)

(58) Field of Classification Search
CPC .... G06F 11/1076; G06F 3/0169; G06F 3/064; G06F 3/067; H04L 67/1097
See application file for complete search history.

(56) References Cited

U.S. PATENT DOCUMENTS 4,092,732 A    5/1978  Ouchi
5,454,101 A    9/1995  Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Vivek Srivastava
*Assistant Examiner* — Todd L Barker
(74) *Attorney, Agent, or Firm* — Garlick & Markison; Timothy W. Markison; Bruce E. Stuckman

(57) ABSTRACT

A method begins by a processing module receiving a random order of encoded data slices and interpreting slice names to de-randomize the encoded data slices into of sets of transmit encoded data slices. The method continues with the processing module determining whether a decode threshold number of encoded data slices of a set of transmit encoded data slices have been received. When not received, the method continues with the processing module determining whether a sufficient number of encoded data slices of the set of transmit encoded data slices are still to be received and waiting until the decode threshold number of encoded data slices are received when encoded data slices are still to be received. When the decode threshold number of encoded data slices are received, the method continues with the processing module decoding the decode threshold number of encoded data slices to recapture a corresponding data segment.

17 Claims, 73 Drawing Sheets

Related U.S. Application Data application No. 15/230,145, filed on Aug. 5, 2016, which is a continuation of application No. 14/292,727, filed on May 30, 2014, now Pat. No. 9,413,529, which is a continuation-in-part of application No. 13/736,848, filed on Jan. 8, 2013, now Pat. No. 9,009,491, which is a continuation of application No. 12/814,467, filed on Jun. 13, 2010, now Pat. No. 8,351,600.

(60) Provisional application No. 61/711,106, filed on Oct. 8, 2012, provisional application No. 61/256,411, filed on Oct. 30, 2009.

(56) References Cited

U.S. PATENT DOCUMENTS

| | | |
|---|---|---|
| 5,485,474 A | 1/1996 | Rabin |
| 5,699,365 A * | 12/1997 | Klayman ............ H03M 13/35 714/708 |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,325,141 B2 | 1/2008 | Chow et al. |
| 7,636,724 B2 | 12/2009 | de la Torre et al. |
| 8,031,875 B1 | 10/2011 | Juels et al. |
| 8,468,368 B2 | 6/2013 | Gladwin et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0174840 A1 | 9/2003 | Bogan |
| 2004/0024963 A1 | 2/2004 | Talagala et al. |
| 2004/0049700 A1 | 3/2004 | Yoshida |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0034453 A1 | 2/2006 | Liu |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0263113 A1* | 10/2008 | Krishnaiyer ...... G06F 17/30138 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0115063 A1* | 5/2010 | Gladwin ............ H04L 67/1097 709/219 |
| 2011/0106909 A1* | 5/2011 | Gladwin ............ G06F 11/1004 709/217 |
| 2011/0182424 A1* | 7/2011 | Grube ................ G06F 11/1076 380/43 |
| 2011/0185193 A1* | 7/2011 | Grube ................ G06F 11/1076 713/194 |
| 2012/0137095 A1* | 5/2012 | Grube ................ G06F 12/0638 711/162 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Kin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Narking Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Sciberras; Lightweight Directory Access Protocol (LDAP): Schema for User Applications; IETF Network Working Group; RFC 4519; Jun. 2006; pp. 1-33.

* cited by examiner

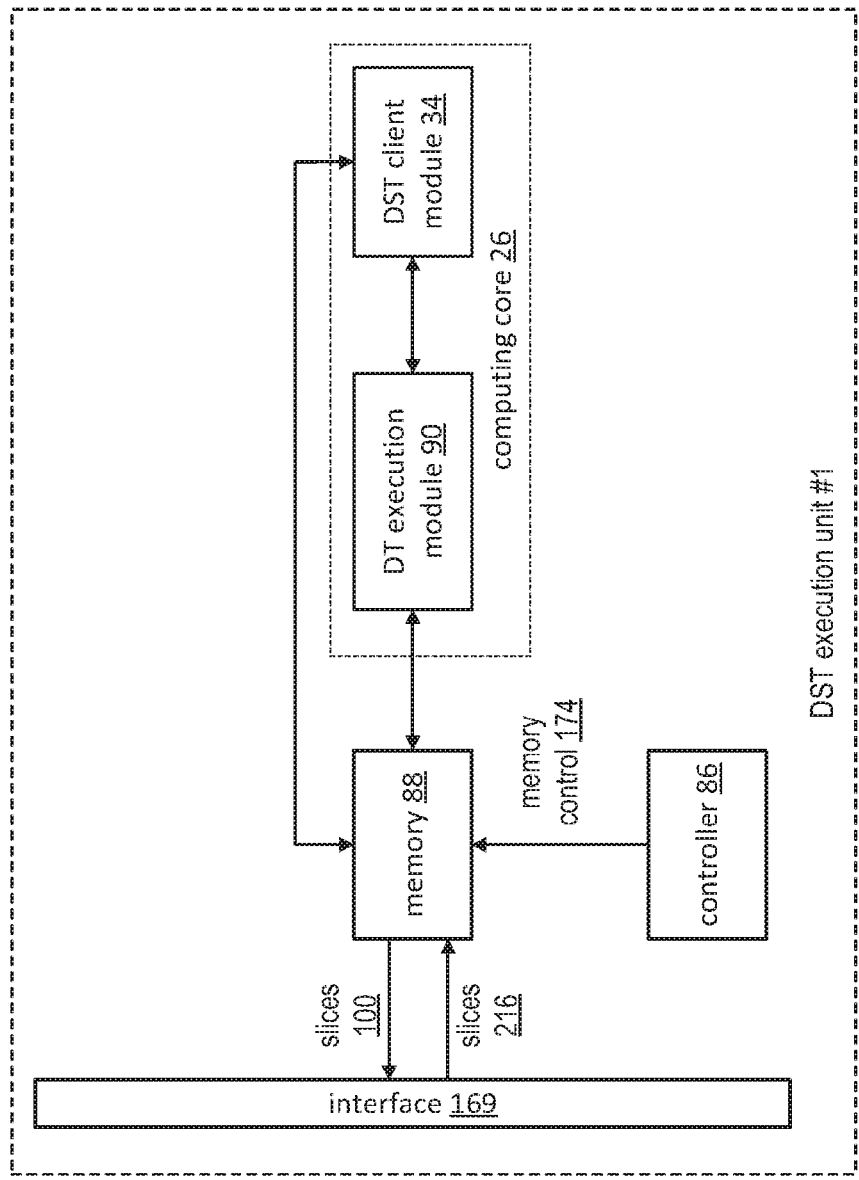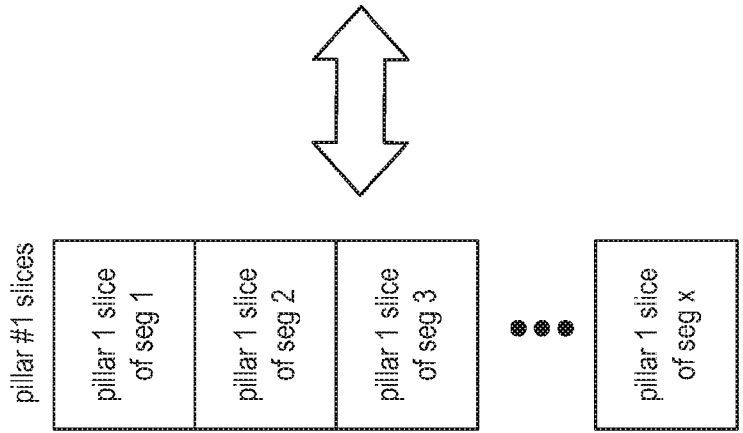
FIG. 24

| DST allocation info 242 | data partition info 320: data ID; No. of partitions; Addr. info for each partition; format conversion indication |
|---|---|

| task execution info 322 | | | | intermediate result info 324 | | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1-4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

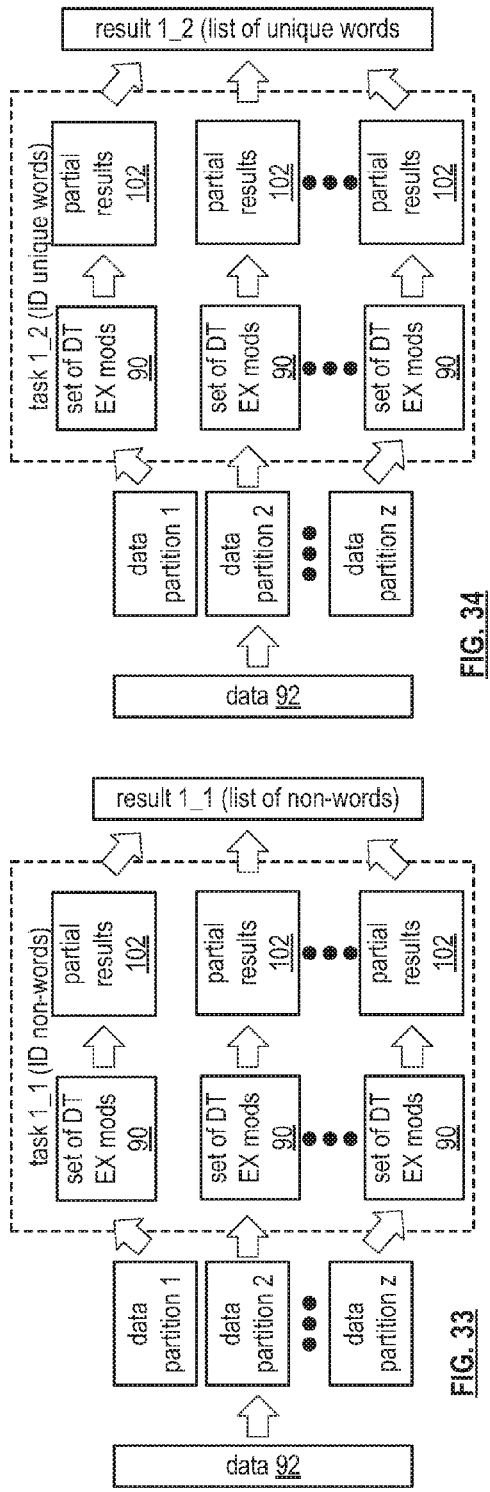
FIG. 33 / FIG. 34
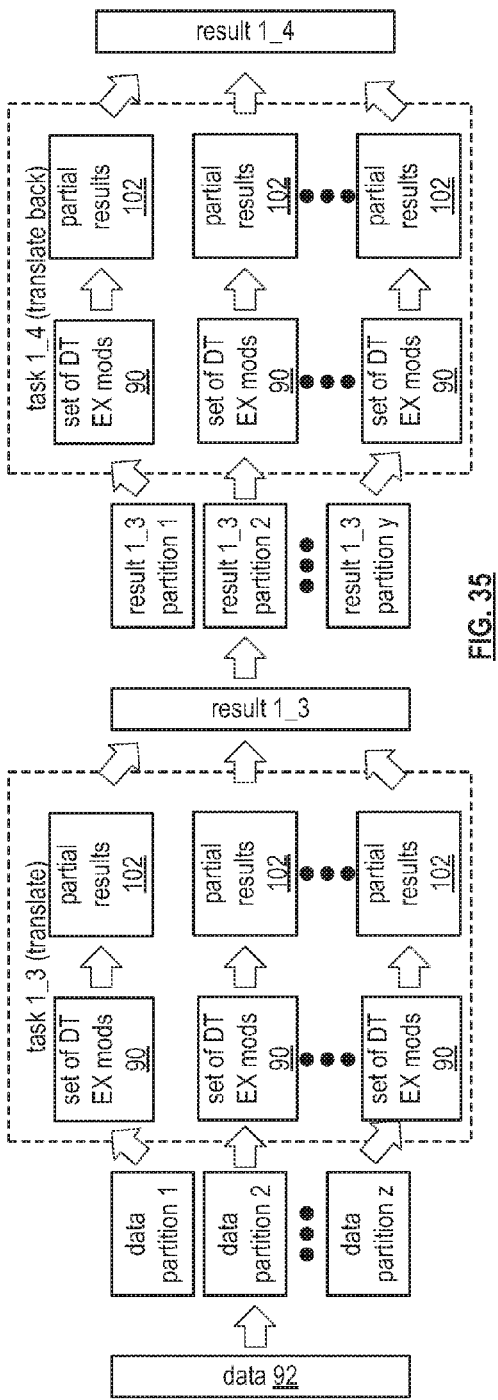
FIG. 35

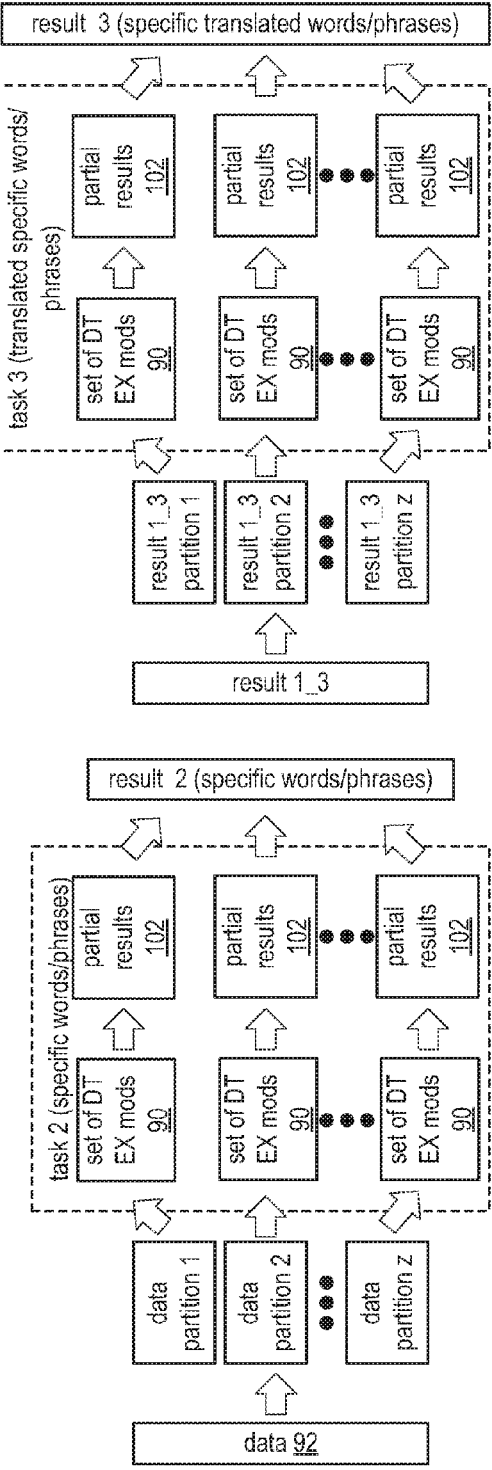
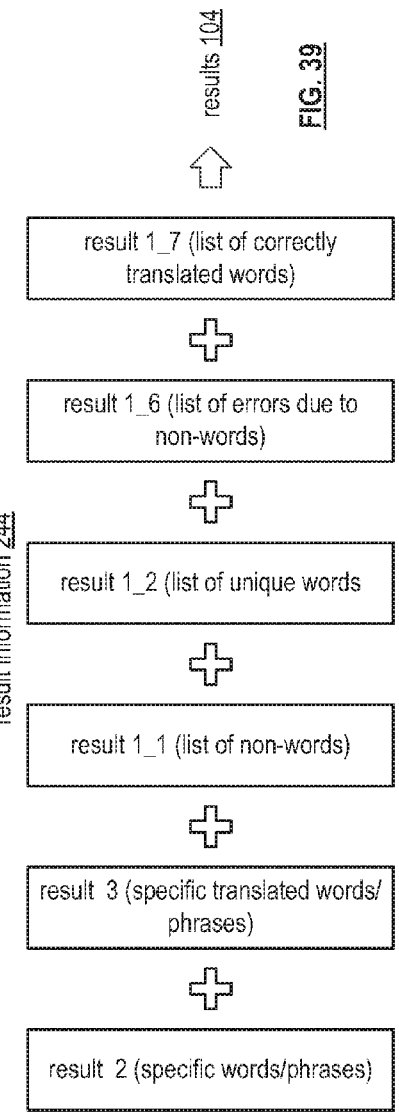

data access processing 396

|  | UNT1 | UNT2 | UNT3 | UNT4 | UNT5 |
|---|---|---|---|---|---|
| INTVL1 | x | x | x |  |  |
| INTVL2 | x | x | x | x | x |
| INTVL3 | x | x |  |  | x |
| INTVL4 |  | x | x | x | x |
| INTVL5 | x | x | x | x | x |
| ... | | | | | |
| INTVL6 |  | x | x | x |  | partial task processing 398

|  | UNT1 | UNT2 | UNT3 | UNT4 | UNT5 |
|---|---|---|---|---|---|
| INTVL1 |  |  |  |  | x |
| INTVL2 |  |  |  | x |  |
| INTVL3 |  |  | x |  |  |
| INTVL4 |  | x |  |  |  |
| INTVL5 | x |  |  |  |  |
| ... | | | | | |
| INTVL6 |  |  |  |  | x |

FIG. 42D

| data access processing 400 | UNT1 | UNT2 | UNT3 | UNT4 | UNT5 |
|---|---|---|---|---|---|
| INTVL1 | x | x | x | x |  |
| INTVL2 | x | x | x | x |  |
| INTVL3 | x | x | x | x |  |
| INTVL4 | x | x | x |  | x |
| INTVL5 | x | x | x |  | x |
| INTVL6 | x | x | x |  | x |
| INTVL7 | x | x |  | x | x |
| INTVL8 | x | x |  | x | x |
| INTVL9 | x | x |  | x | x |
| INTVL10 | x |  | x | x | x |
| INTVL11 | x |  | x | x | x |
| INTVL12 | x |  | x | x | x |
| INTVL13 |  | x | x | x | x |
| INTVL14 |  | x | x | x | x |
| INTVL15 |  | x | x | x | x |
| INTVL16 | x | x | x | x |  |
| INTVL17 | x | x | x | x |  |
| INTVL18 | x | x | x | x |  |

| partial task processing 402 | UNT1 | UNT2 | UNT3 | UNT4 | UNT5 |
|---|---|---|---|---|---|
| INTVL1 |  |  |  |  | x |
| INTVL2 |  |  |  |  | x |
| INTVL3 |  |  |  |  | x |
| INTVL4 |  |  |  | x |  |
| INTVL5 |  |  |  | x |  |
| INTVL6 |  |  |  | x |  |
| INTVL7 |  |  | x |  |  |
| INTVL8 |  |  | x |  |  |
| INTVL9 |  |  | x |  |  |
| INTVL10 |  | x |  |  |  |
| INTVL11 |  | x |  |  |  |
| INTVL12 |  | x |  |  |  |
| INTVL13 | x |  |  |  |  |
| INTVL14 | x |  |  |  |  |
| INTVL15 | x |  |  |  |  |
| INTVL16 |  |  |  |  | x |
| INTVL17 |  |  |  |  | x |
| INTVL18 |  |  |  |  | x |

FIG. 42E

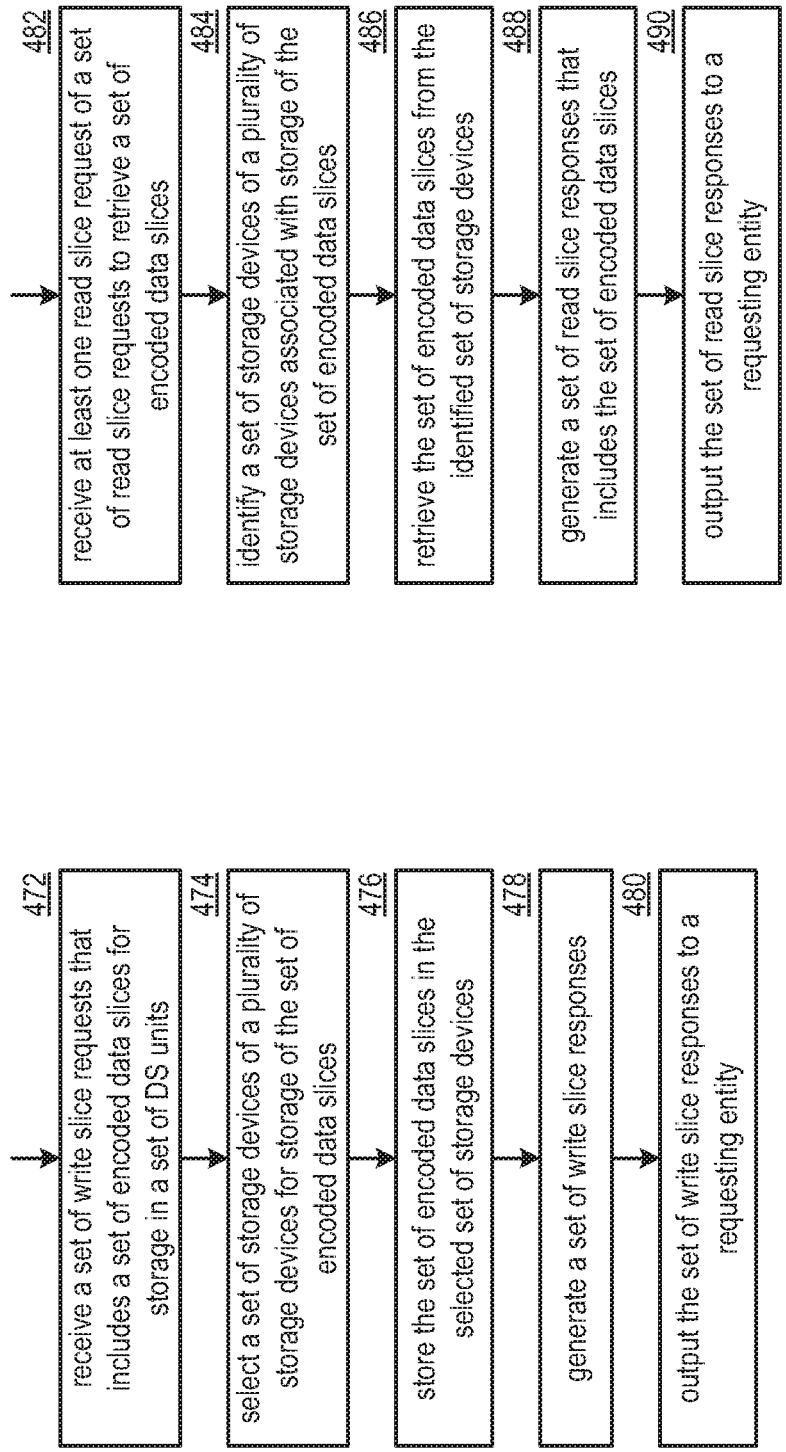

FIG. 46E segment buffering 552

| segment collection 1 | SEG 4_1 | SEG 4_2 | SEG 4_3 | SEG 4_4 |
| segment collection 2 | SEG 3_1 | SEG 3_2 | SEG 3_3 | SEG 3_4 |
| segment collection 3 | SEG 2_1 | SEG 2_2 | SEG 2_3 | SEG 2_4 |
| segment collection 4 | SEG 1_1 | SEG 1_2 | SEG 1_3 | SEG 1_4 ← segment 1 of partition 4 |

FIG. 46F segment buffering 552

| segment collection 1 | SEG 4_1 | SEG 1_2 | SEG 1_3 | SEG 3_4 |
| segment collection 2 | SEG 3_1 | SEG 2_2 | SEG 4_3 | SEG 1_4 |
| segment collection 3 | SEG 2_1 | SEG 3_2 | SEG 3_3 | SEG 2_4 |
| segment collection 4 | SEG 1_1 | SEG 4_2 | SEG 2_3 | SEG 4_4 |

FIG. 46G segment buffering 552

| segment collection 1 | SEG 4_1 | SEG 4_2 | SEG 3_1 | SEG 4_4 |
| segment collection 2 | SEG 4_3 | SEG 3_2 | SEG 3_3 | SEG 2_1 |
| segment collection 3 | SEG 3_4 | SEG 2_2 | SEG 2_3 | SEG 1_2 |
| segment collection 4 | SEG 1_1 | SEG 2_4 | SEG 1_3 | SEG 1_4 |

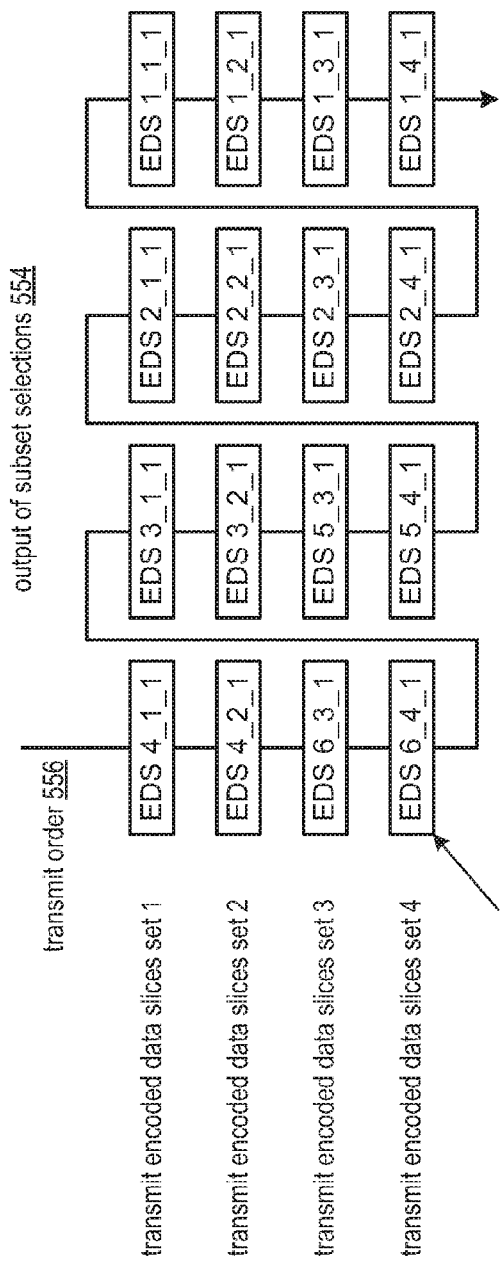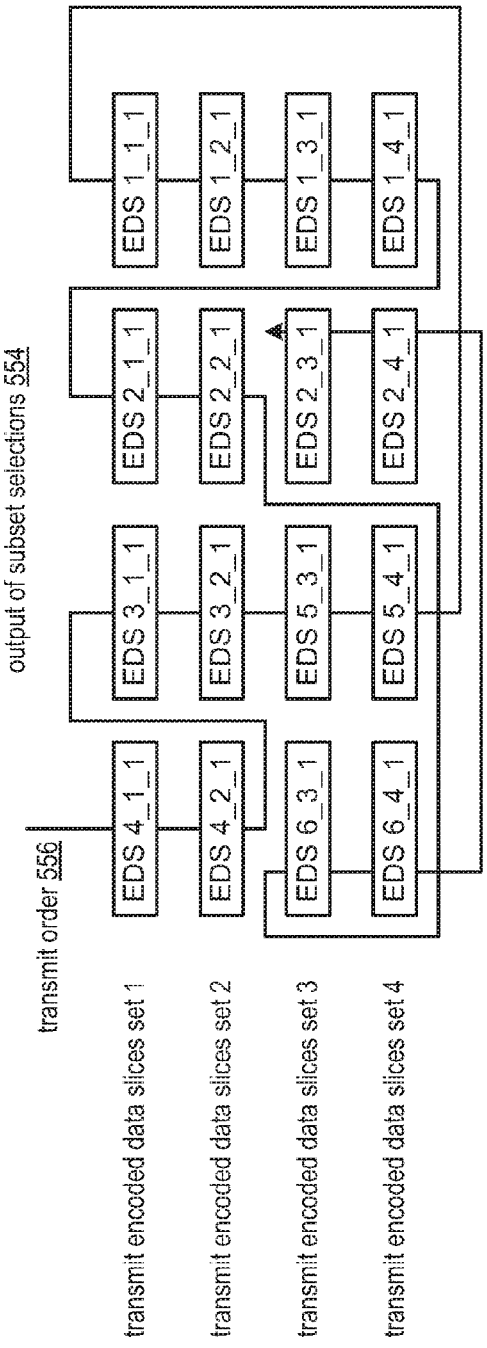

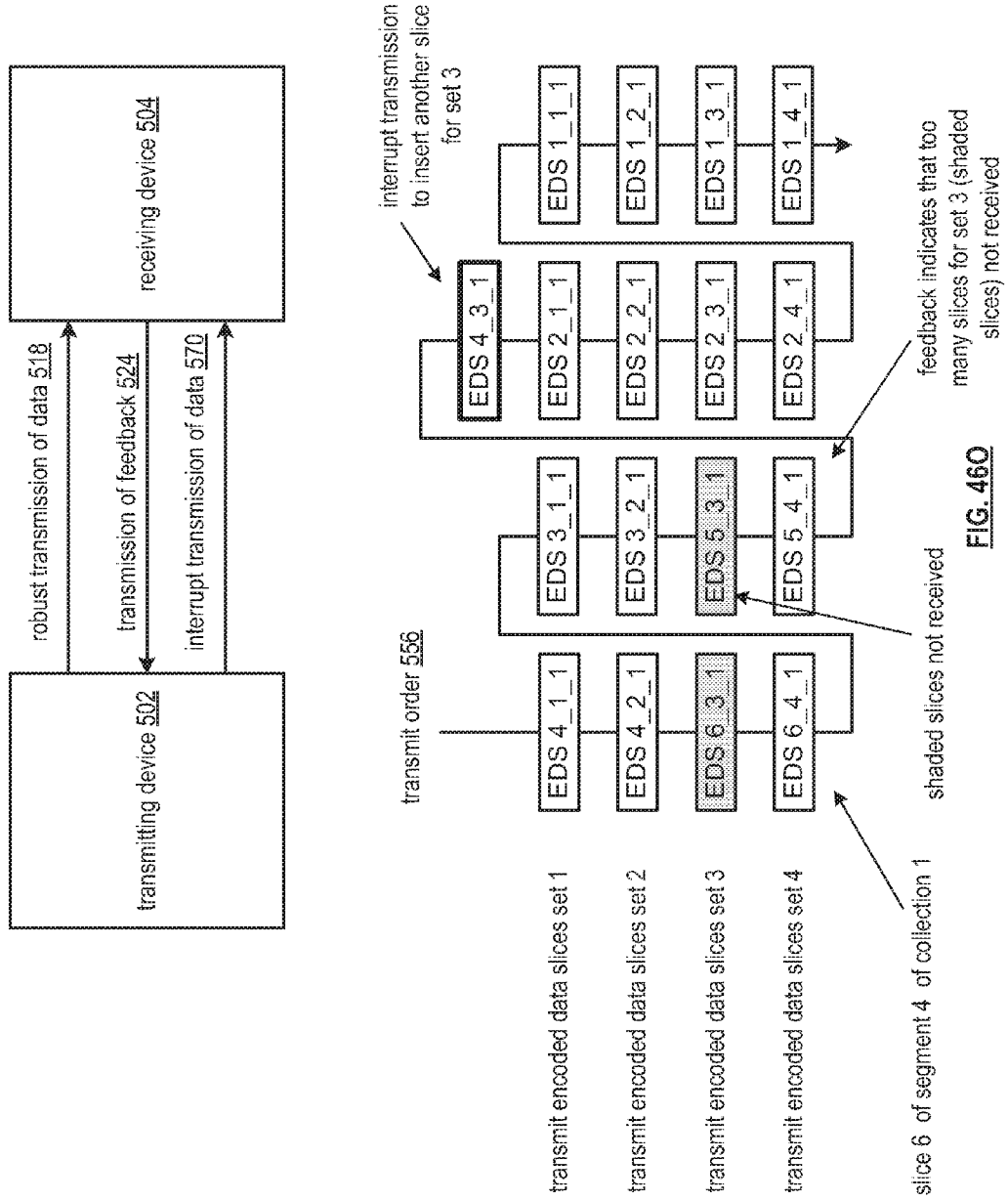

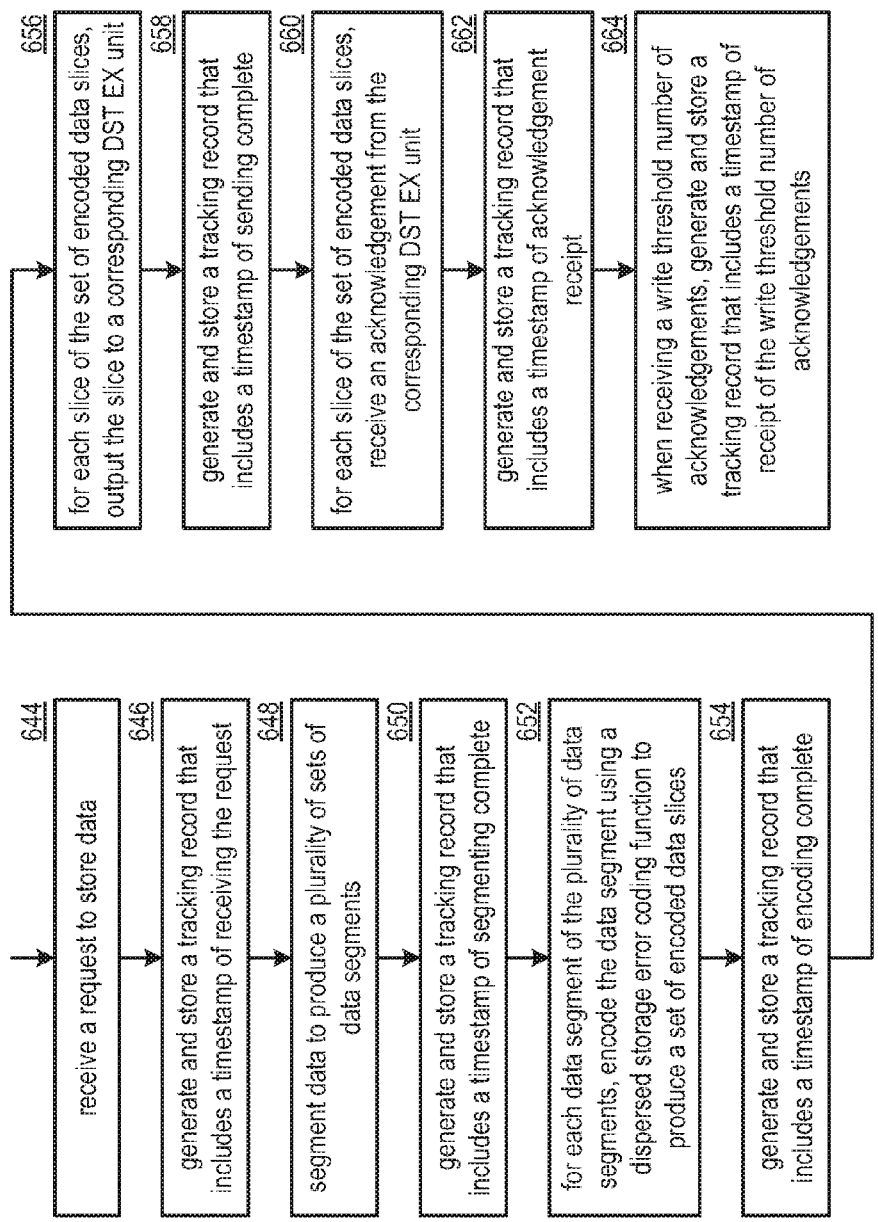

ROBUST RECEPTION OF DATA UTILIZING ENCODED DATA SLICES

CROSS REFERENCE TO RELATED PATENTS

The present U.S. Utility Patent Application claims priority pursuant to 35 U.S.C. §120 as a continuation of U.S. Utility application Ser. No. 13/959,262, entitled "ROBUST RECEPTION OF DATA UTILIZING ENCODED DATA SLICES", filed Aug. 5, 2013, which claims priority pursuant to 35 U.S.C. §119(e) to U.S. Provisional Application No. 61/711,106, entitled "PRIORITIZING TASKS IN A DISTRIBUTED STORAGE AND TASK NETWORK", filed Oct. 8, 2012, both of which are hereby incorporated herein by reference in their entirety and made part of the present U.S. Utility Patent Application for all purposes.

The present U.S. Utility Patent Application also claims priority pursuant to 35 U.S.C. §120 as a continuation-in-part of U.S. Utility application Ser. No. 15/230,145, entitled "DISTRIBUTED STORAGE NETWORK AND METHOD FOR STORING AND RETRIEVING ENCRYPTION KEYS", filed Aug. 5, 2016, which is a continuation of U.S. Utility application Ser. No. 14/292,727, entitled "DISTRIBUTED STORAGE NETWORK AND METHOD FOR STORING AND RETRIEVING ENCRYPTION KEYS", filed May 30, 2014, issued as U.S. Pat. No. 9,413,529 on Aug. 9, 2016, which is a continuation-in-part of U.S. Utility application Ser. No. 13/736,848, entitled "DISTRIBUTED STORAGE NETWORK AND METHOD FOR ENCRYPTING AND DECRYPTING DATA USING HASH FUNCTIONS", filed Jan. 8, 2013, issued as U.S. Pat. No. 9,009,491 on Apr. 14, 2015, which is a continuation of U.S. Utility application Ser. No. 12/814,467, entitled "DISTRIBUTED STORAGE NETWORK AND METHOD FOR ENCRYPTING AND DECRYPTING DATA USING HASH FUNCTIONS", filed Jun. 13, 2010, issued as U.S. Pat. No. 8,351,600 on Jan. 8, 2013, which claims priority pursuant to 35 U.S.C. §119(e) to U.S. Provisional Application No. 61/256,411, entitled "DISTRIBUTED STORAGE NETWORK DATA PROCESSING", filed Oct. 30, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 42D is a diagram of a pair of tables illustrating an example of allocating data access requests and partial tasks to a set of distributed storage and task execution (DSTE) units in accordance with the present invention;

FIG. 42E is a diagram of a pair of tables illustrating another example of allocating data access requests and partial tasks to a set of distributed storage and task execution (DSTE) units in accordance with the present invention;

FIG. 45B is a flowchart illustrating another example of storing data in accordance with the present invention;

FIG. 45C is a flowchart illustrating another example of retrieving data in accordance with the present invention;

Figure 46A:
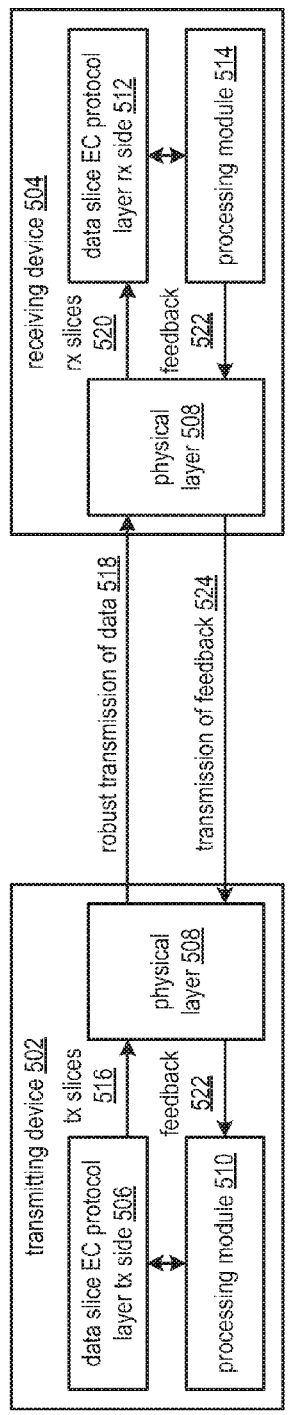
FIG. 46A is a schematic block diagram of an embodiment of a data communication system in accordance with the present invention.
Figure 46B:
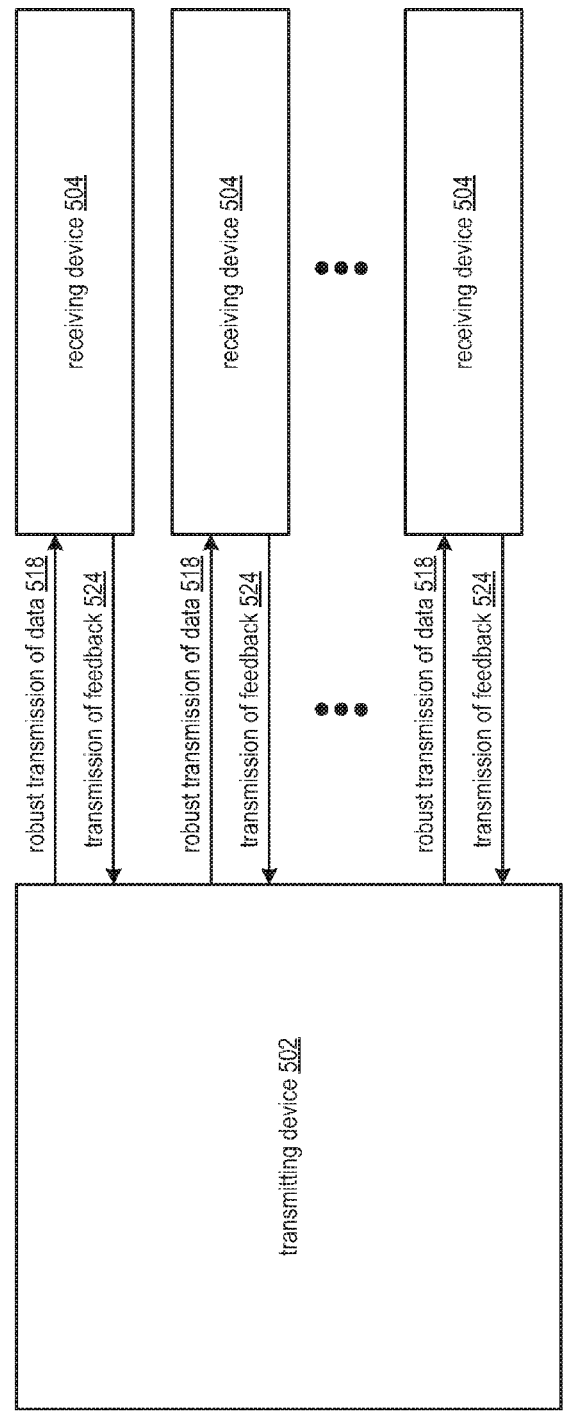
FIG. 46B is a schematic block diagram of another embodiment of a data communication system in accordance with the present invention.
Figure 46C:
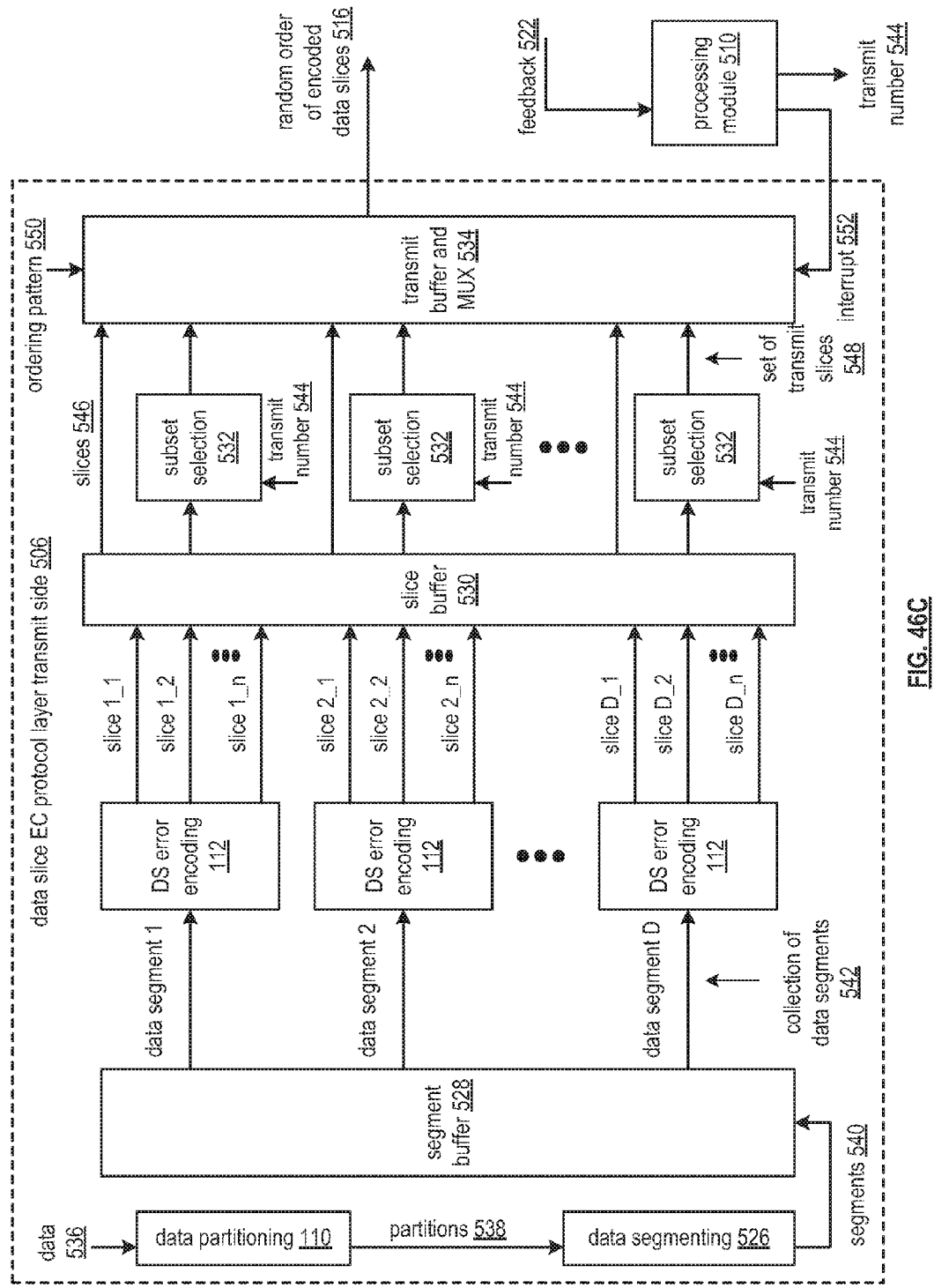
FIG. 46C is a schematic block diagram of an embodiment of a data slice error coded protocol layer transmit side in accordance with the present invention.
Figure 46D:
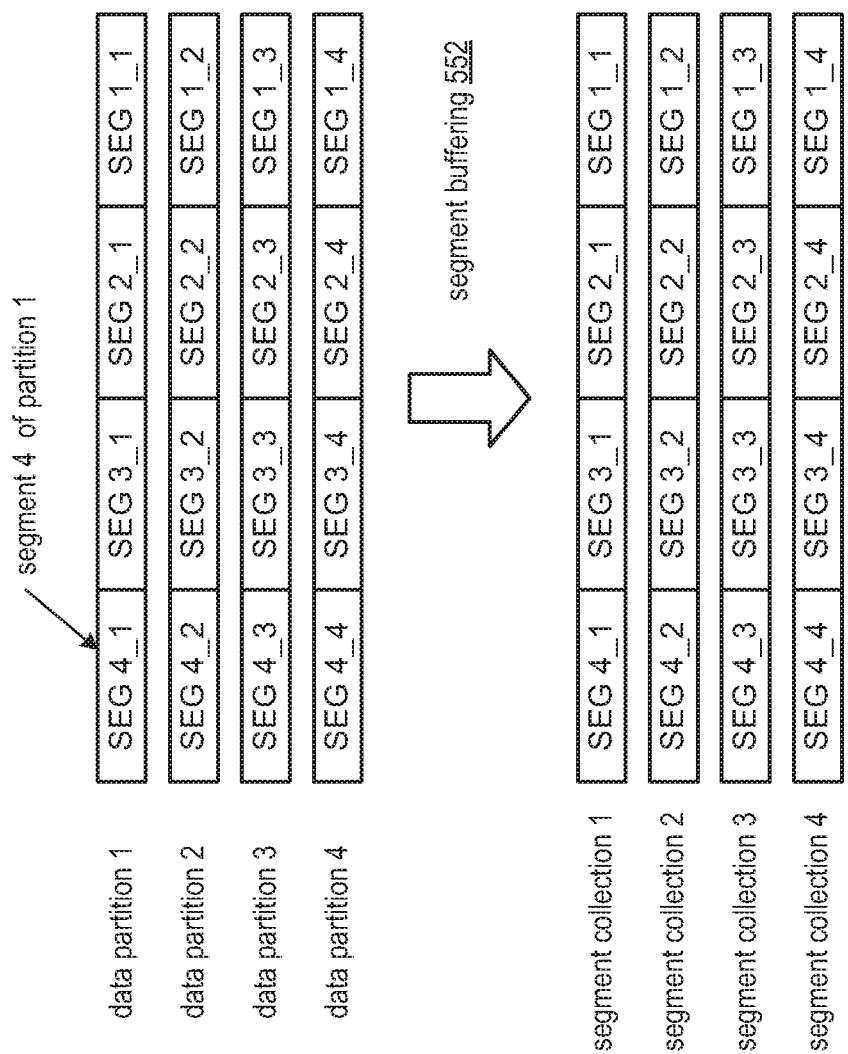
Figure 46H:
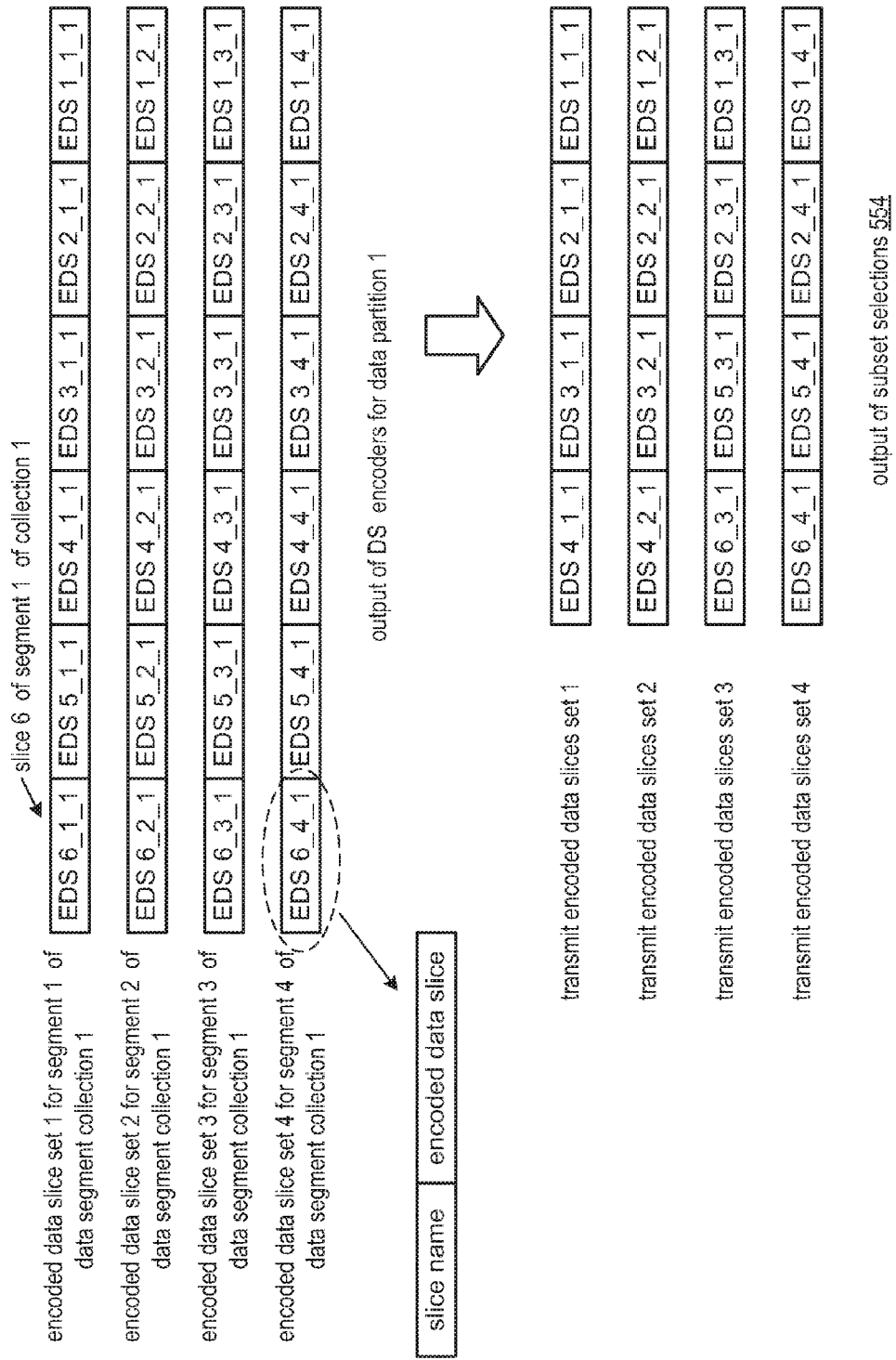
Figure 46K:
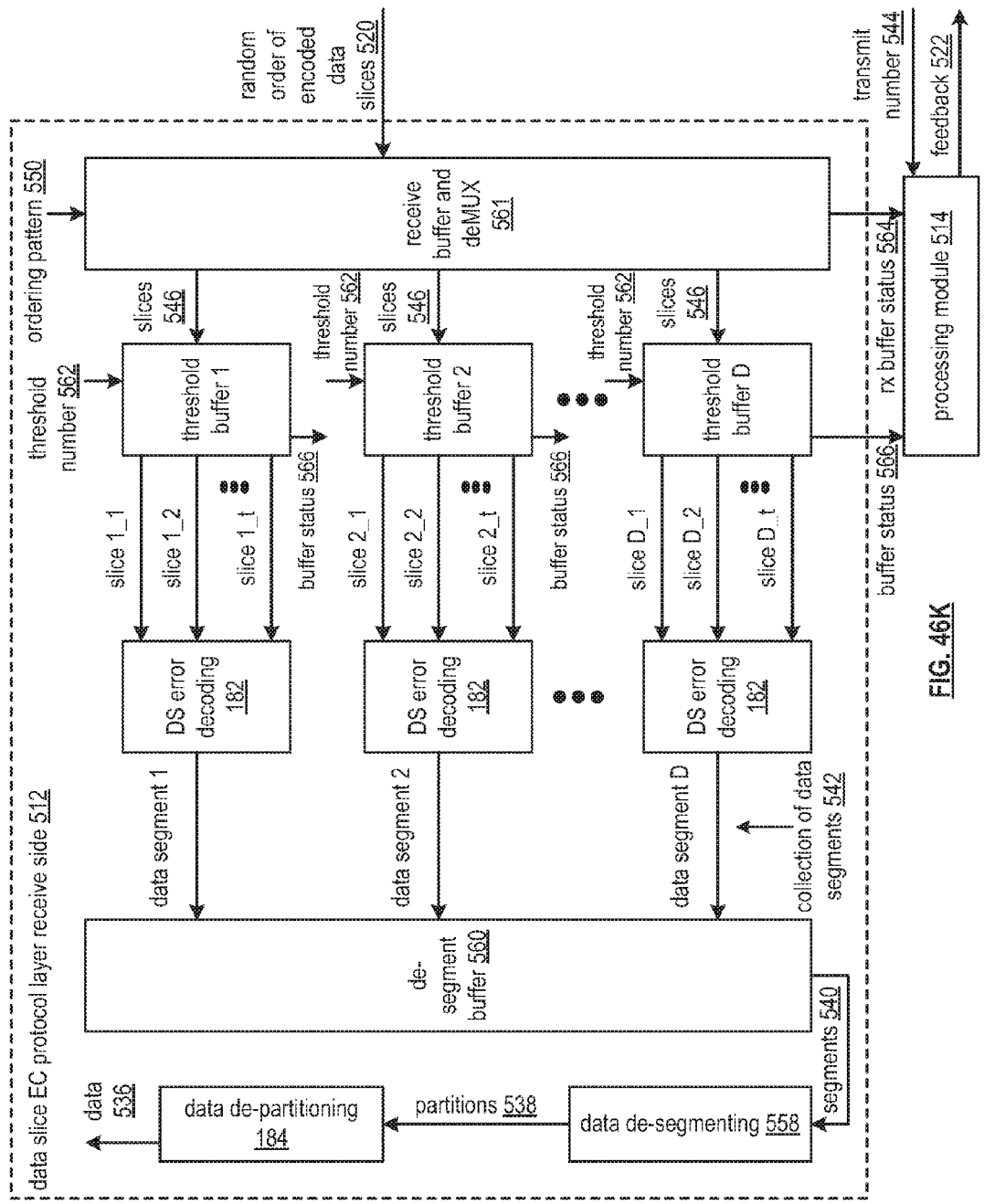
Figure 46L:
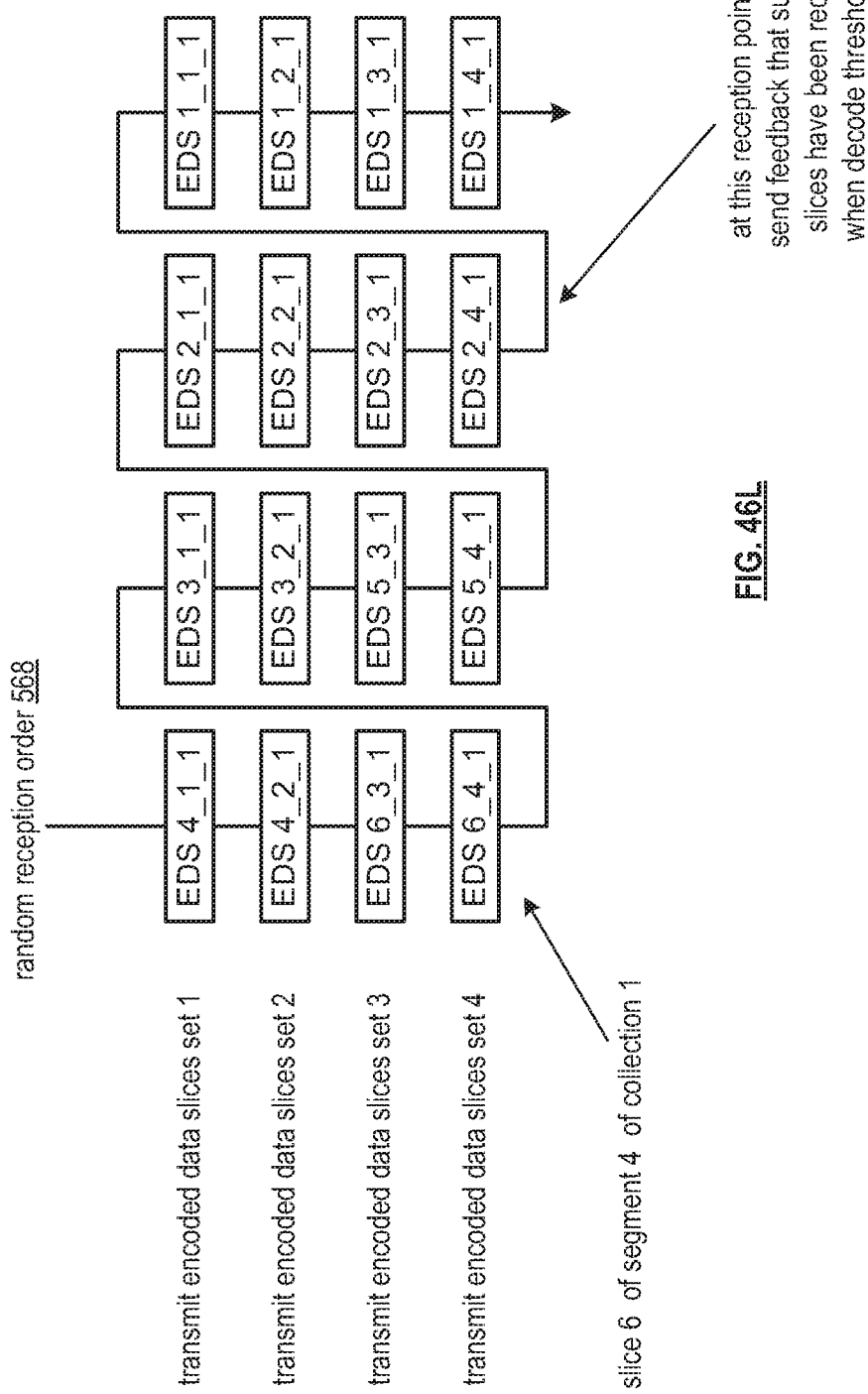
Figure 46M:
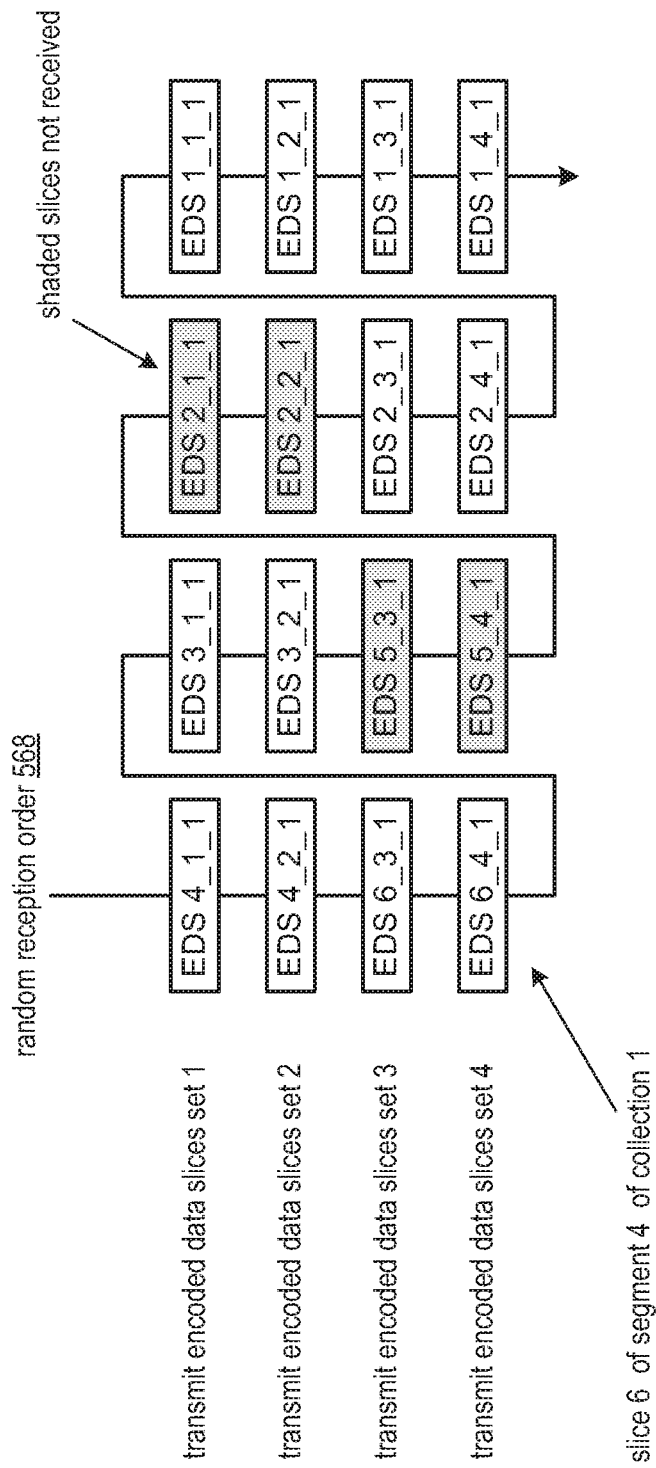
Figure 46N:
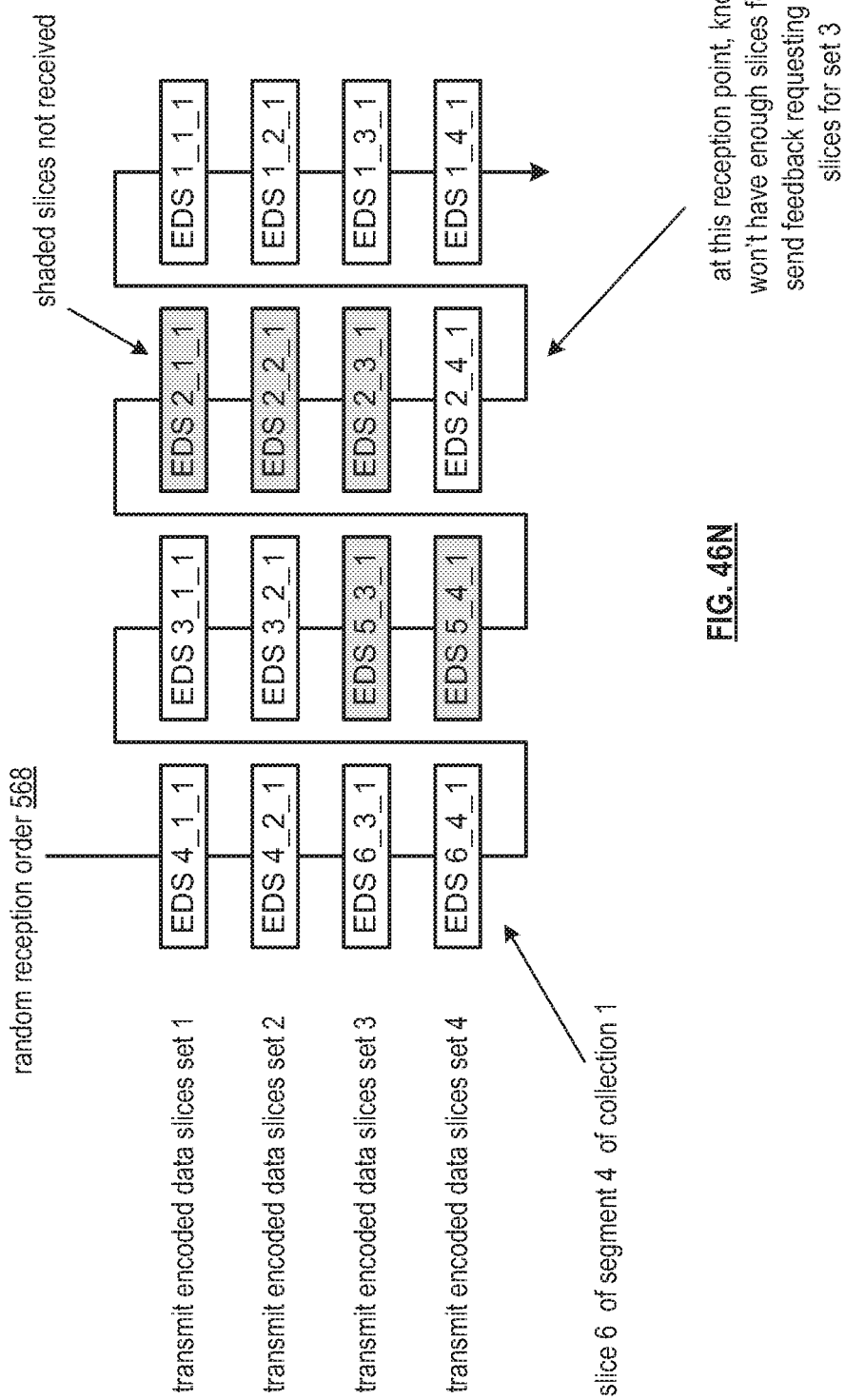
Figure 46P:
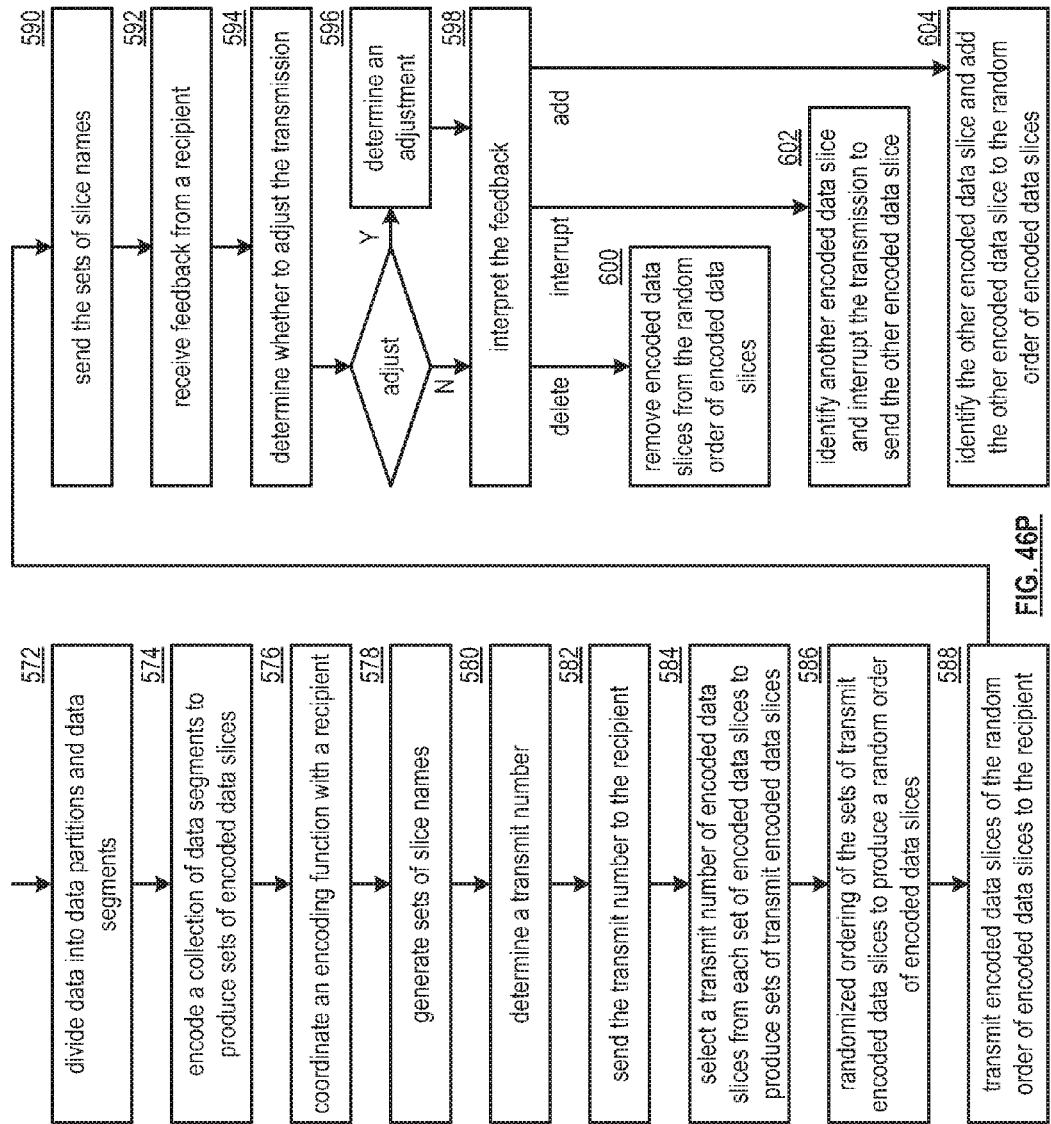
Figure 46Q:
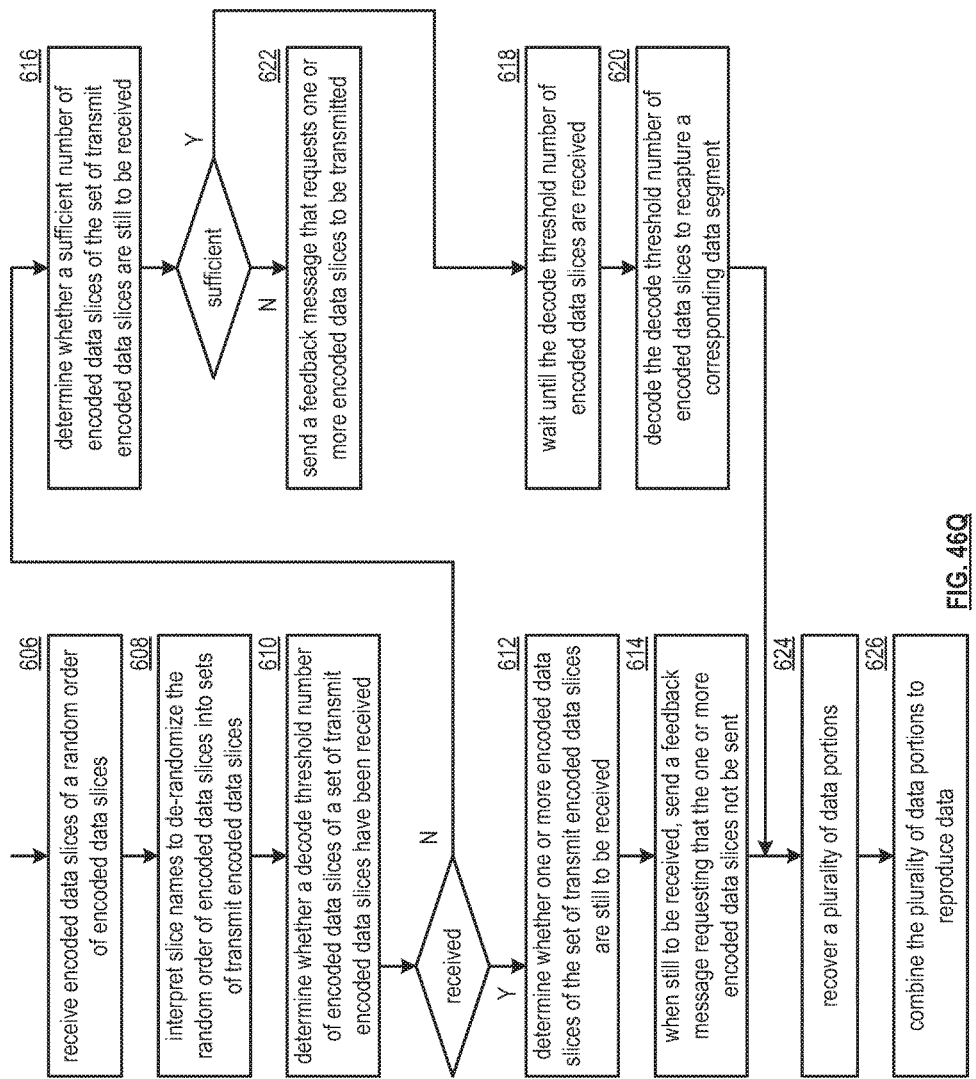
Figure 47A:
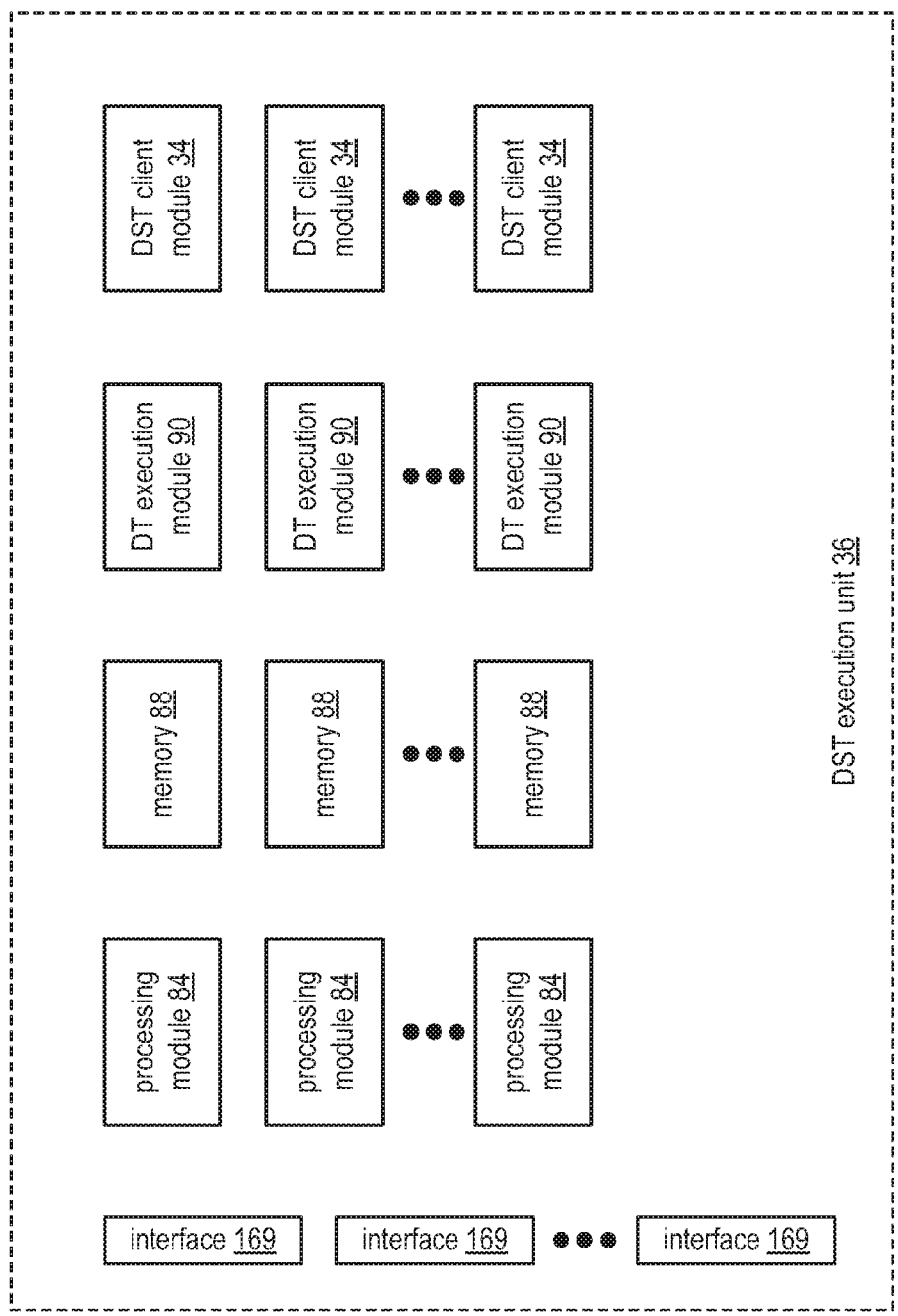
Figure 47B:
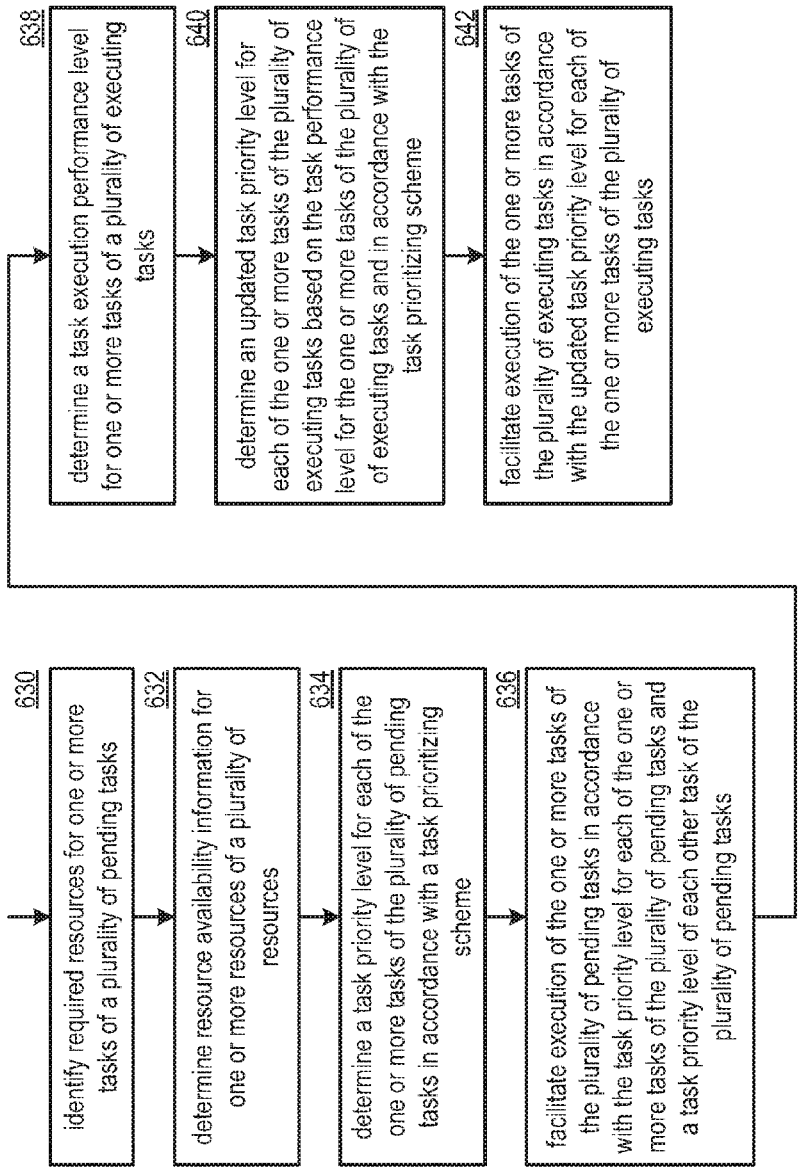

FIGS. 46D-G are diagrams illustrating examples of data segment buffering in accordance with the present invention;

FIG. 46H is a diagram illustrating an example of selecting a subset of encoded data slices in accordance with the present invention;

FIGS. 46I-J are diagrams illustrating examples of transmit ordering of a subset of encoded data slices in accordance with the present invention;

FIG. 46K is a schematic block diagram of an embodiment of a data slice error coded protocol layer receive side in accordance with the present invention;

FIGS. 46L-N are diagrams illustrating examples of received ordering of encoded data slices in accordance with the present invention;

FIG. 46O is a diagram illustrating an example of interrupt transmit ordering of encoded data slices in accordance with the present invention;

FIG. 46P is a flowchart illustrating an example of encoding data in accordance with the present invention;

FIG. 46Q is a flowchart illustrating an example of decoding data in accordance with the present invention;

FIG. 47A is a schematic block diagram of another embodiment of a distributed storage and task (DST) execution unit in accordance with the present invention;

FIG. 47B is a flowchart illustrating an example of prioritizing tasks in accordance with the present invention; and FIG. 48 is a flowchart illustrating an example of generating a tracking record in accordance with the present invention.

DETAILED DESCRIPTION OF THE INVENTION

Figure 1:
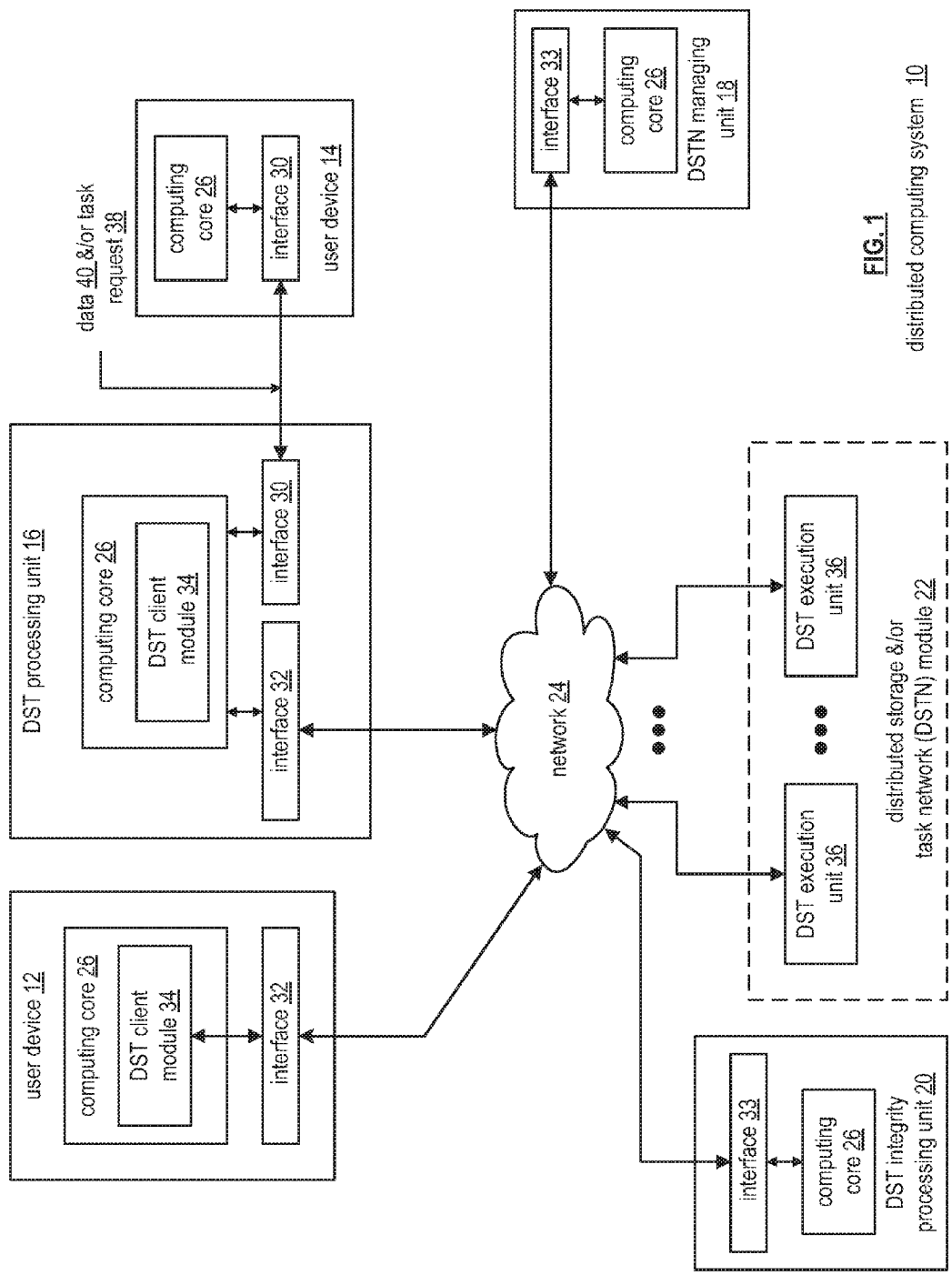
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
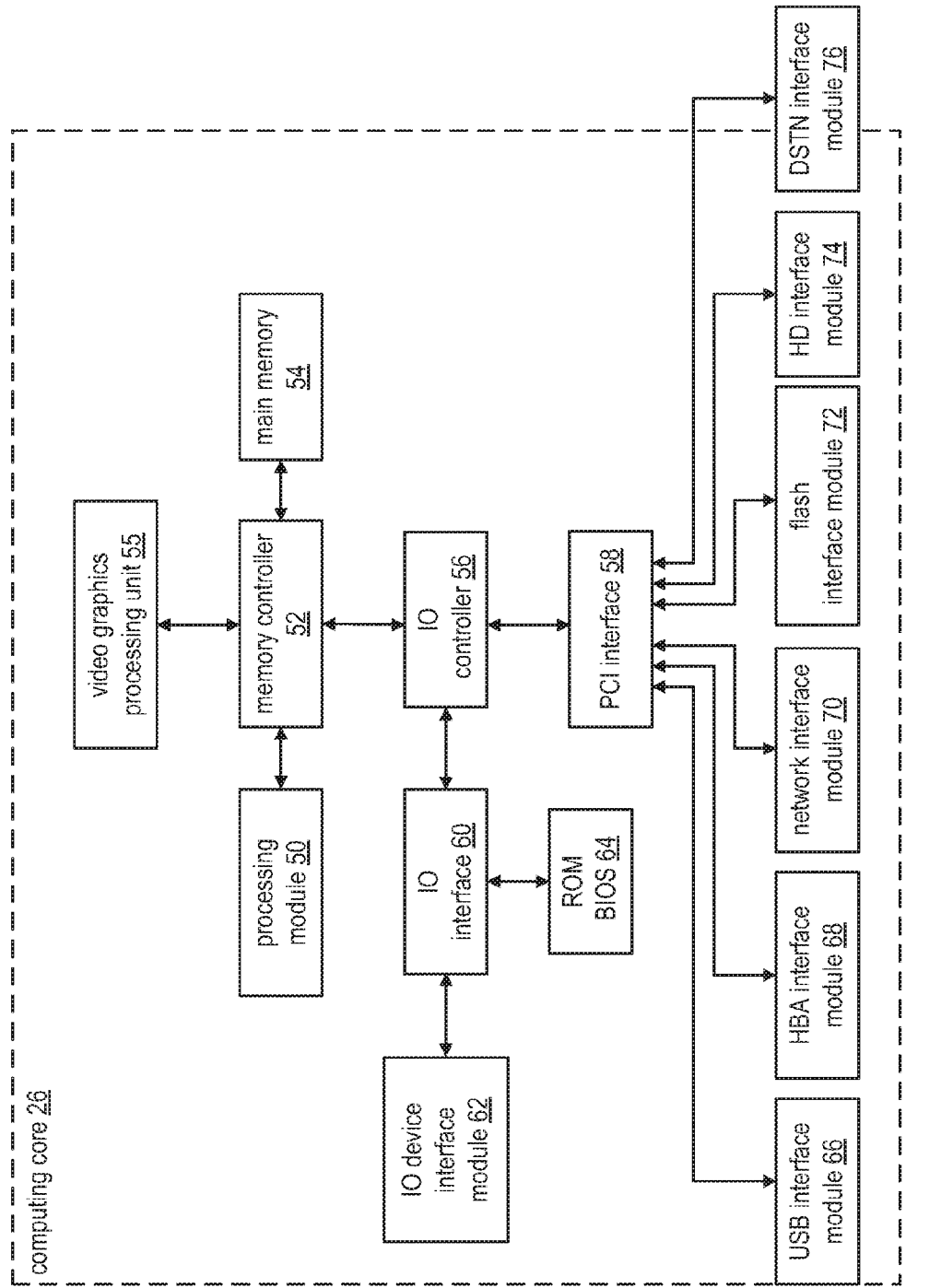
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
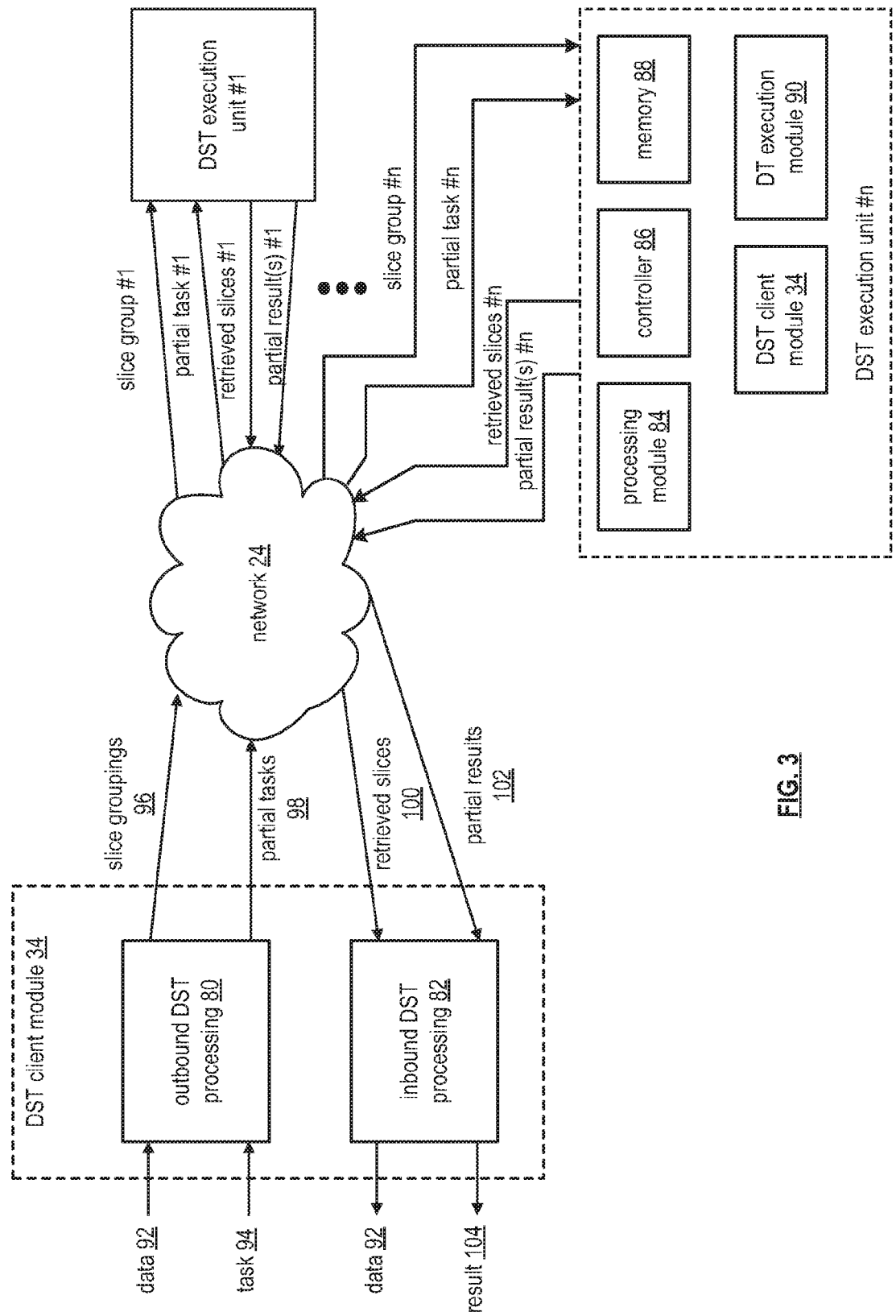
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
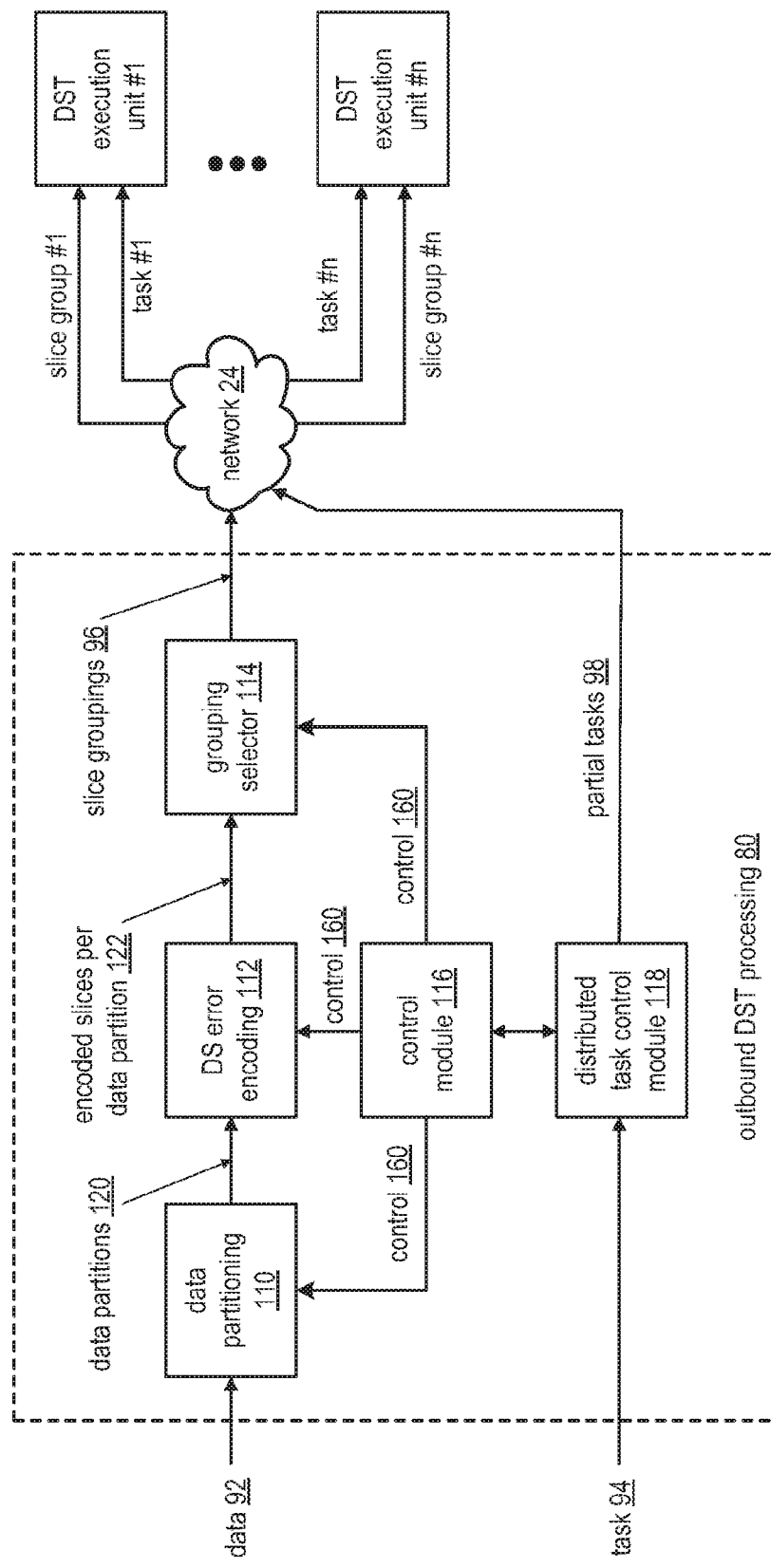
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
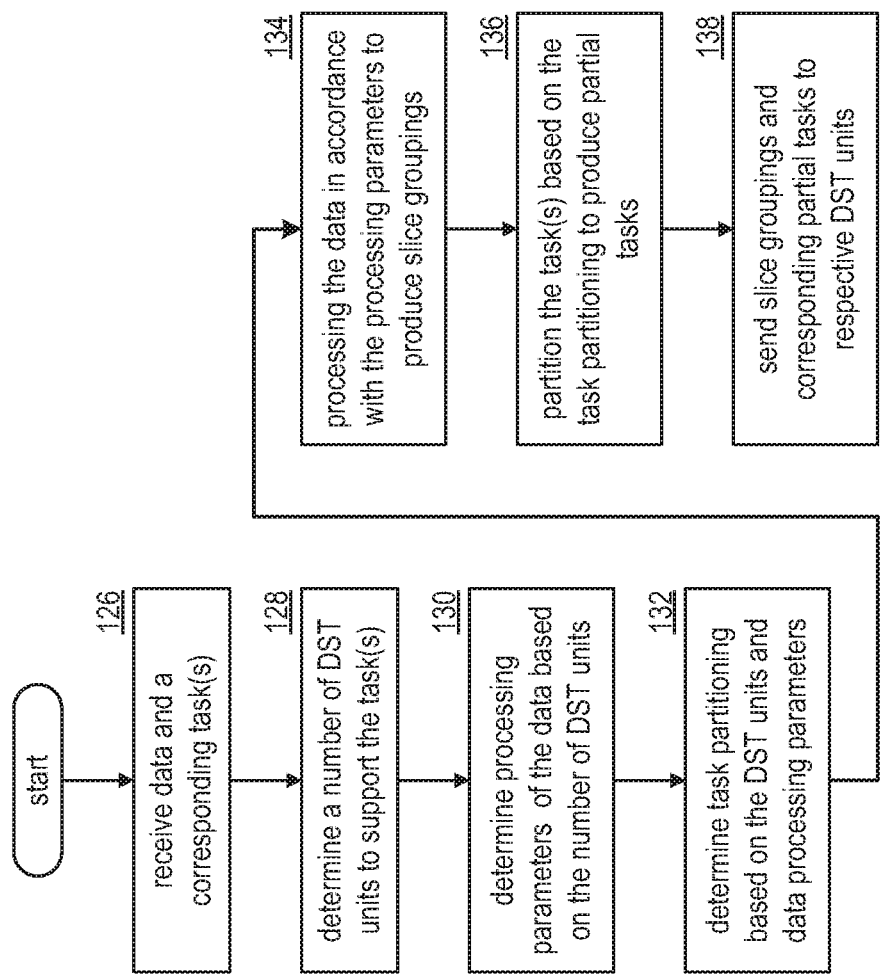
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
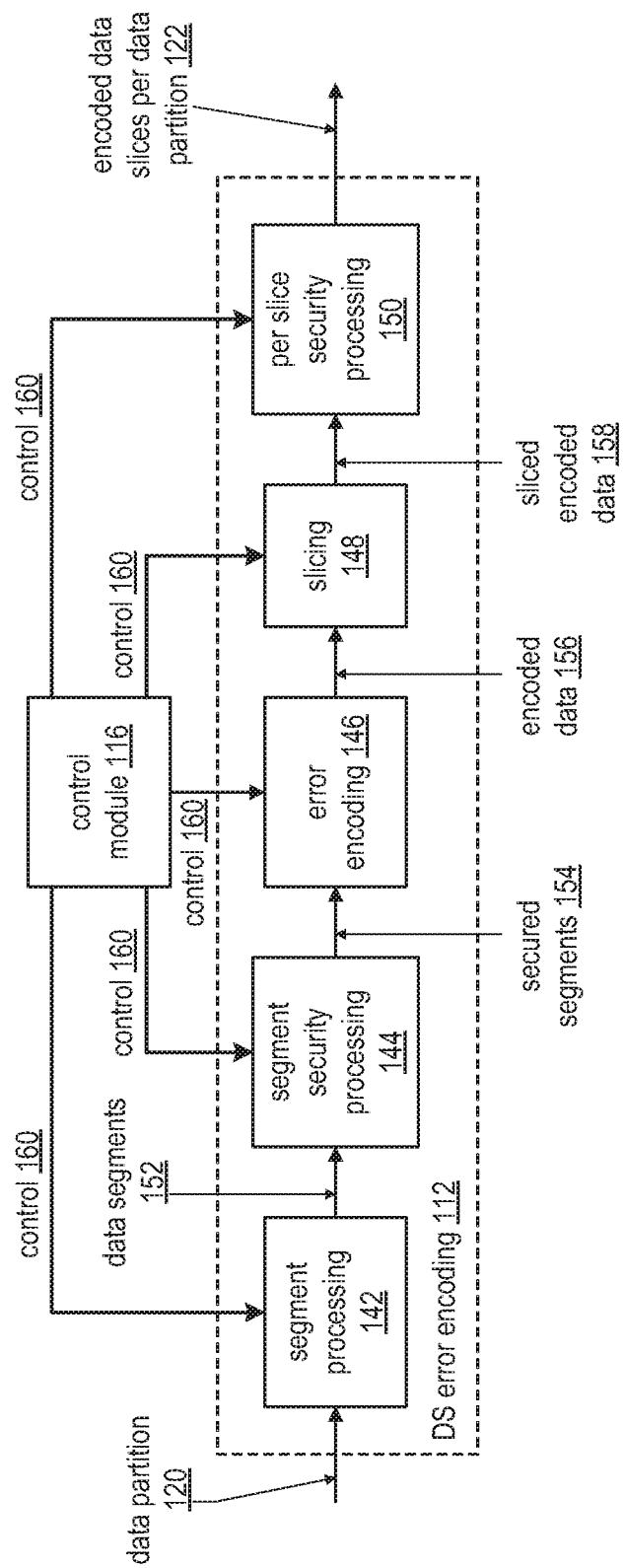
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
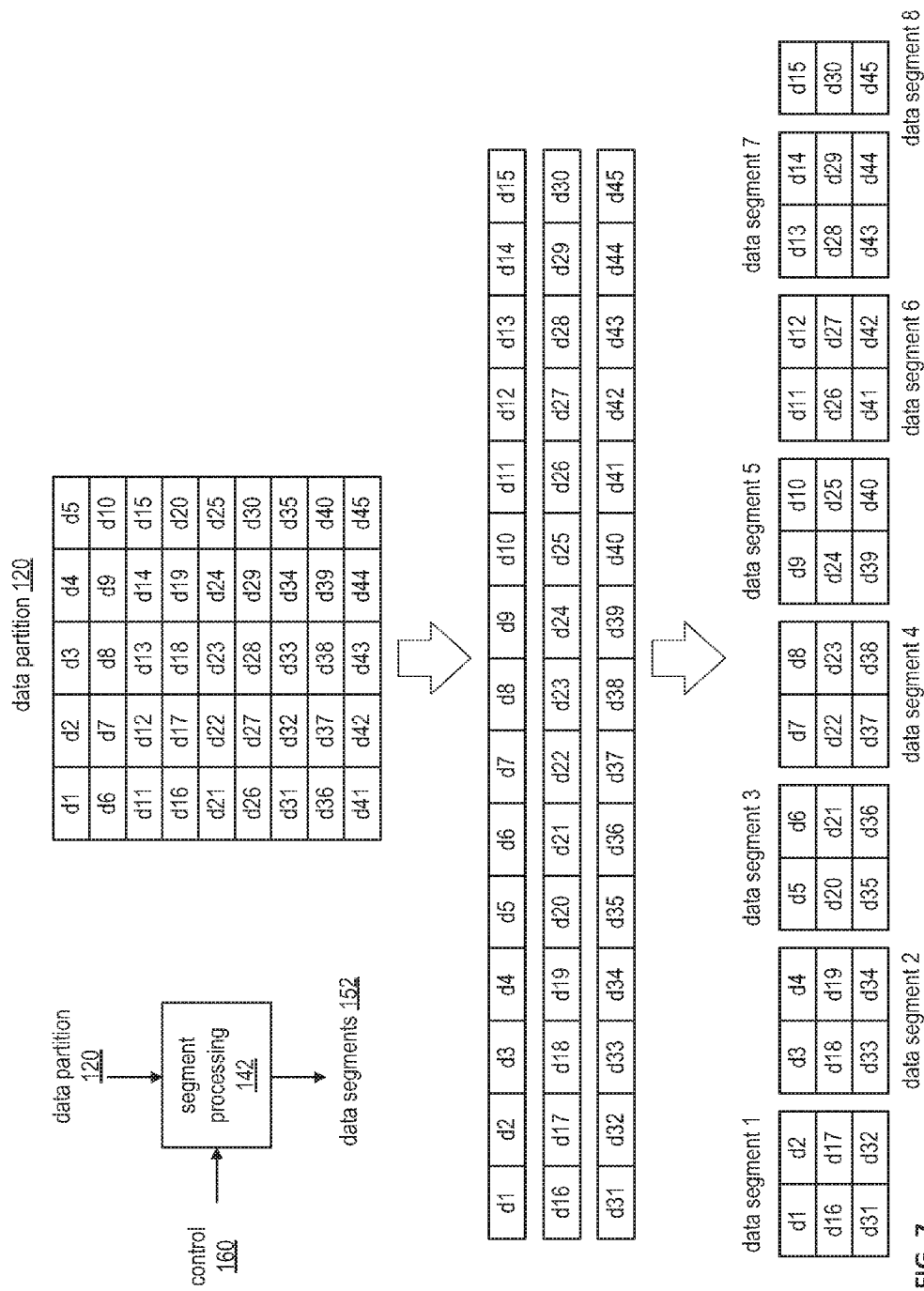
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
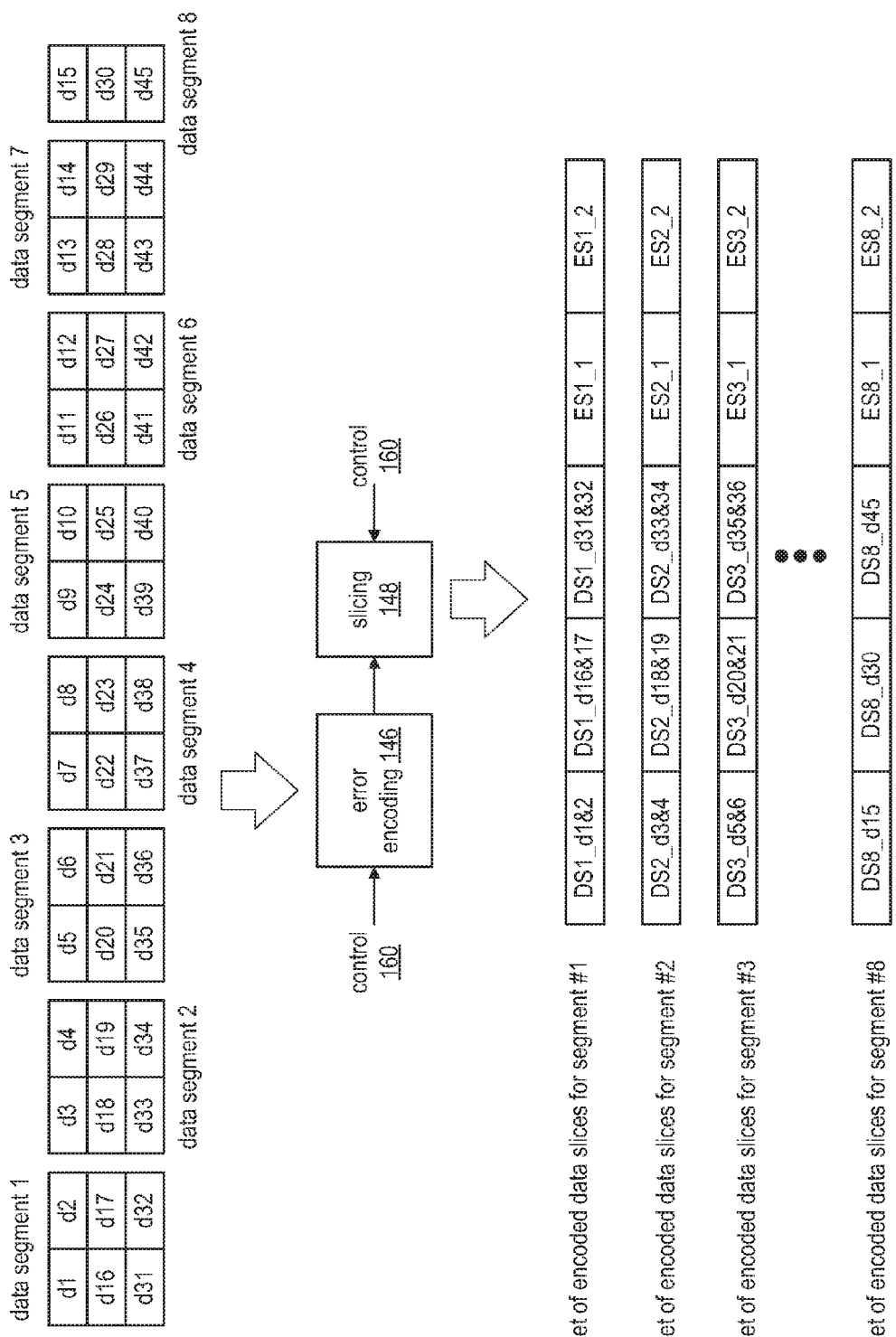
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_*d*31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_*d*3&4) of the second set of encoded data slices (e.g., corresponding to data segment 2) is substantially similar to content of the first word (e.g., d3 & d4); the content of the second encoded data slice (DS2_*d*18&19) of the second set of encoded data slices is substantially similar to content of the second word (e.g., d18 & d19); and the content of the third encoded data slice (DS2_*d*33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
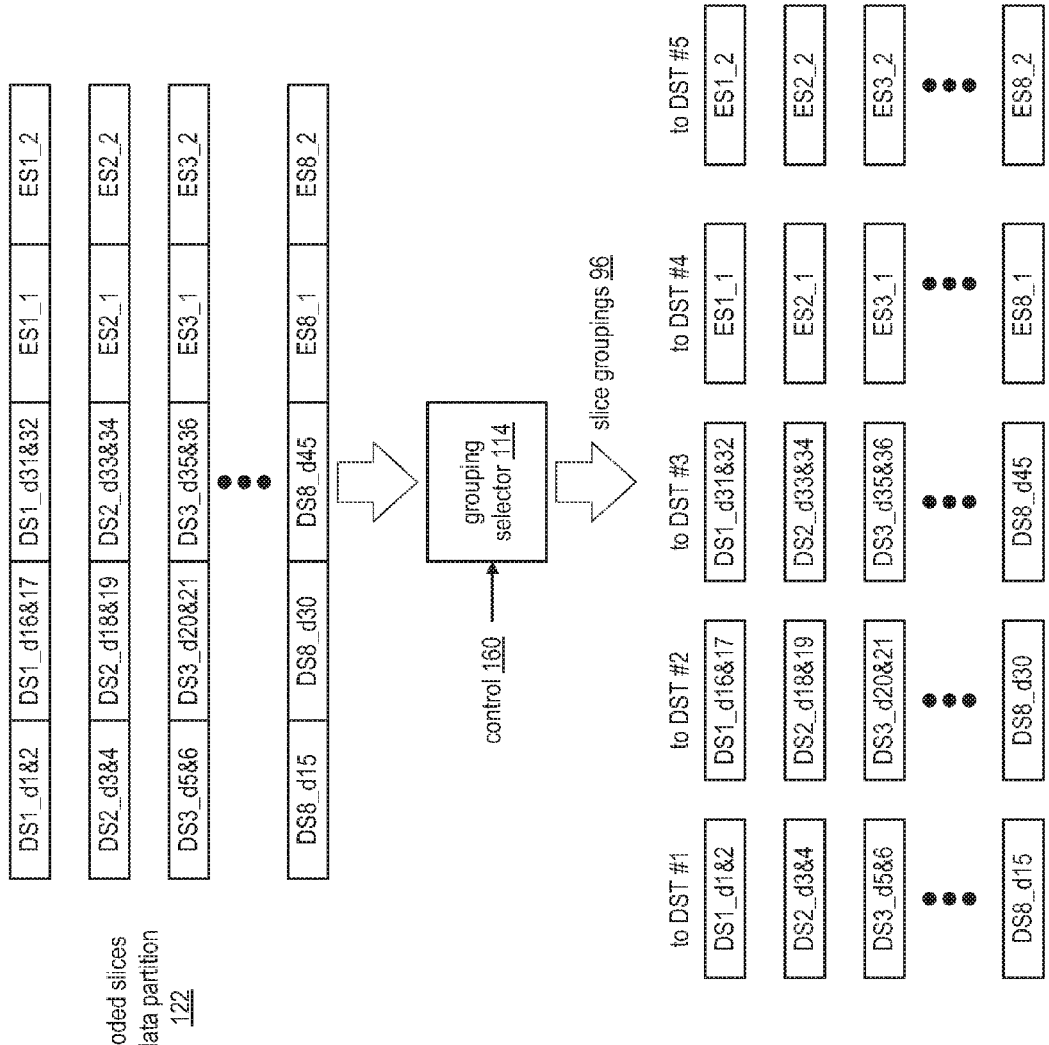
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
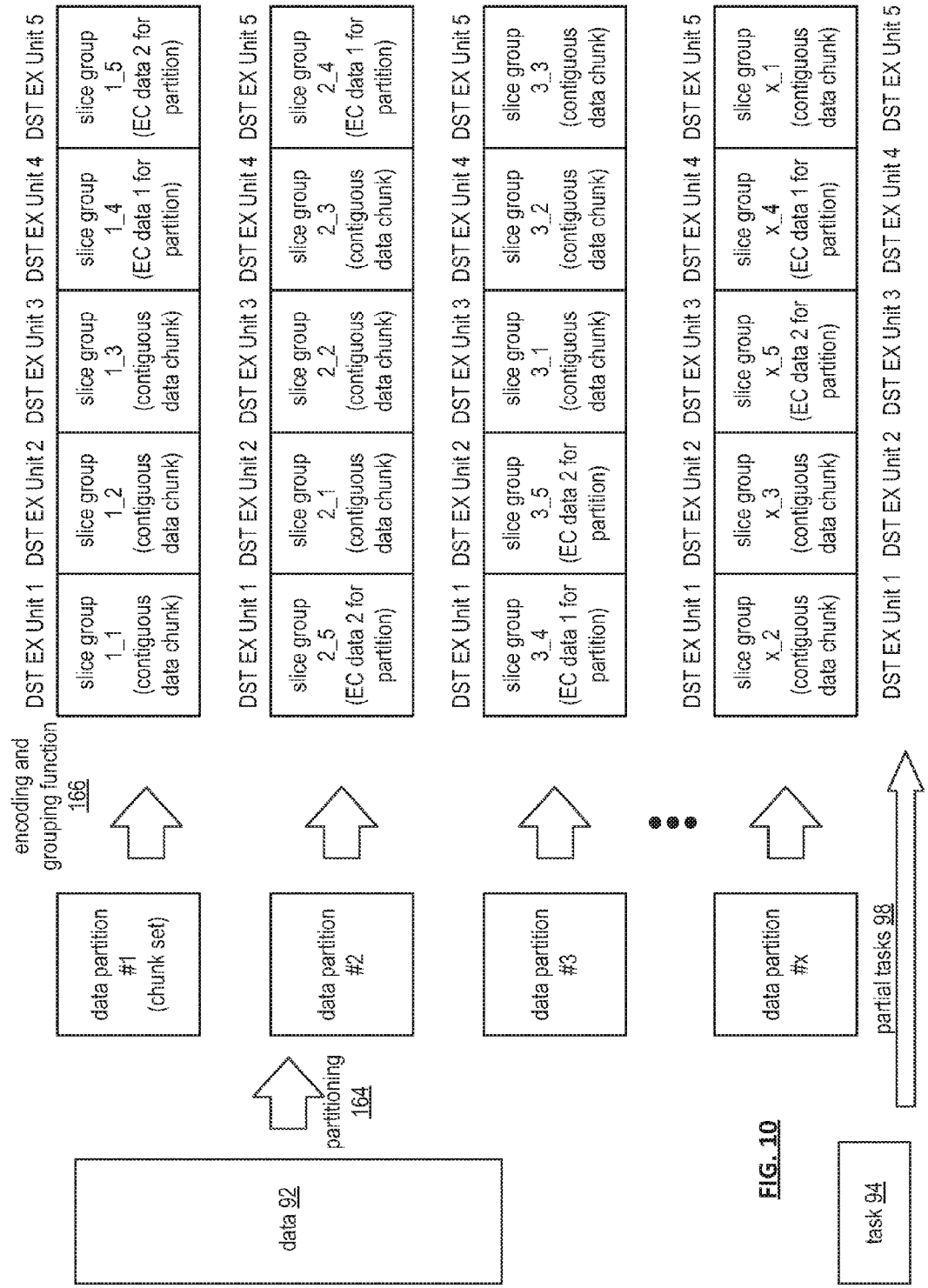
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-*x*, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
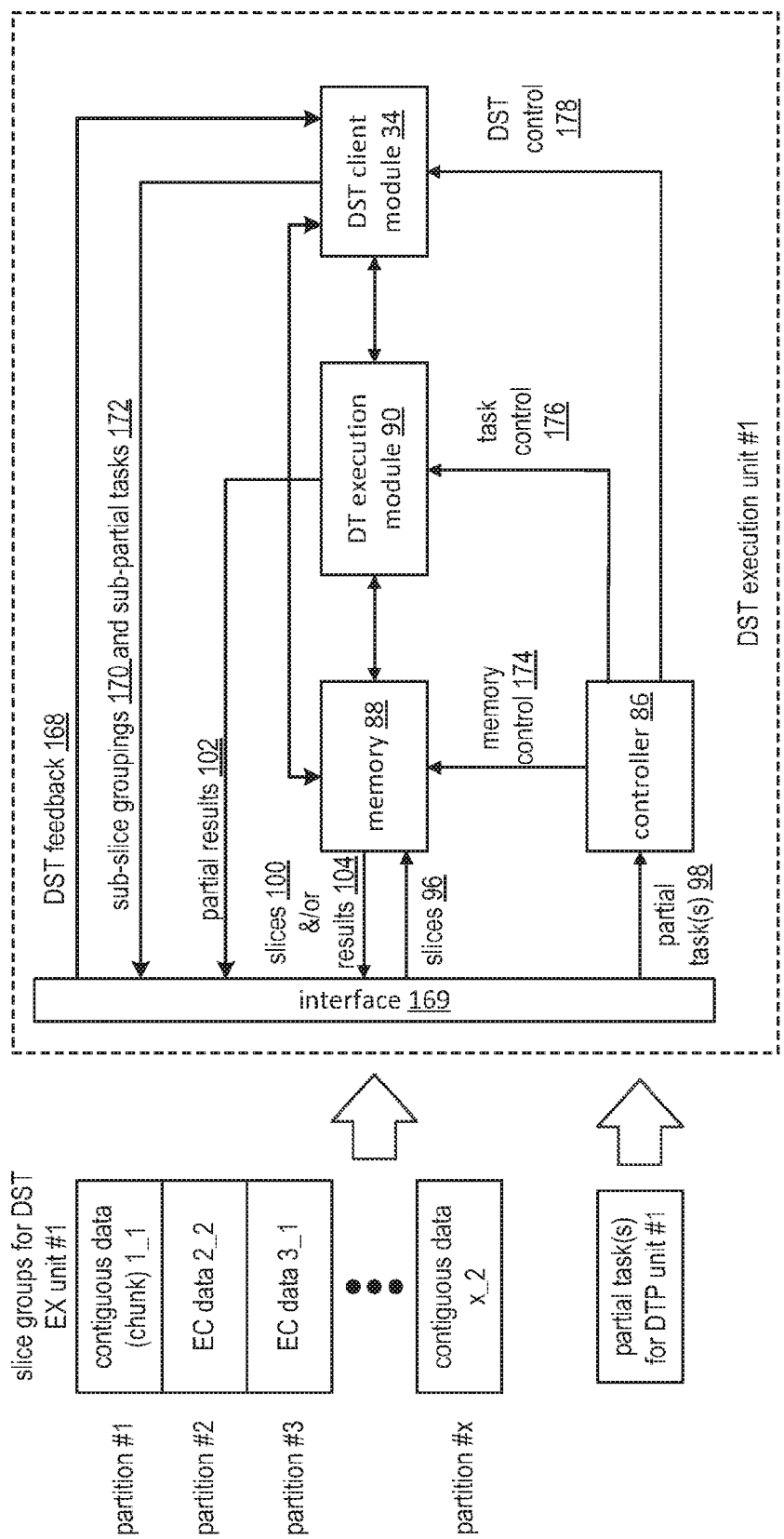
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
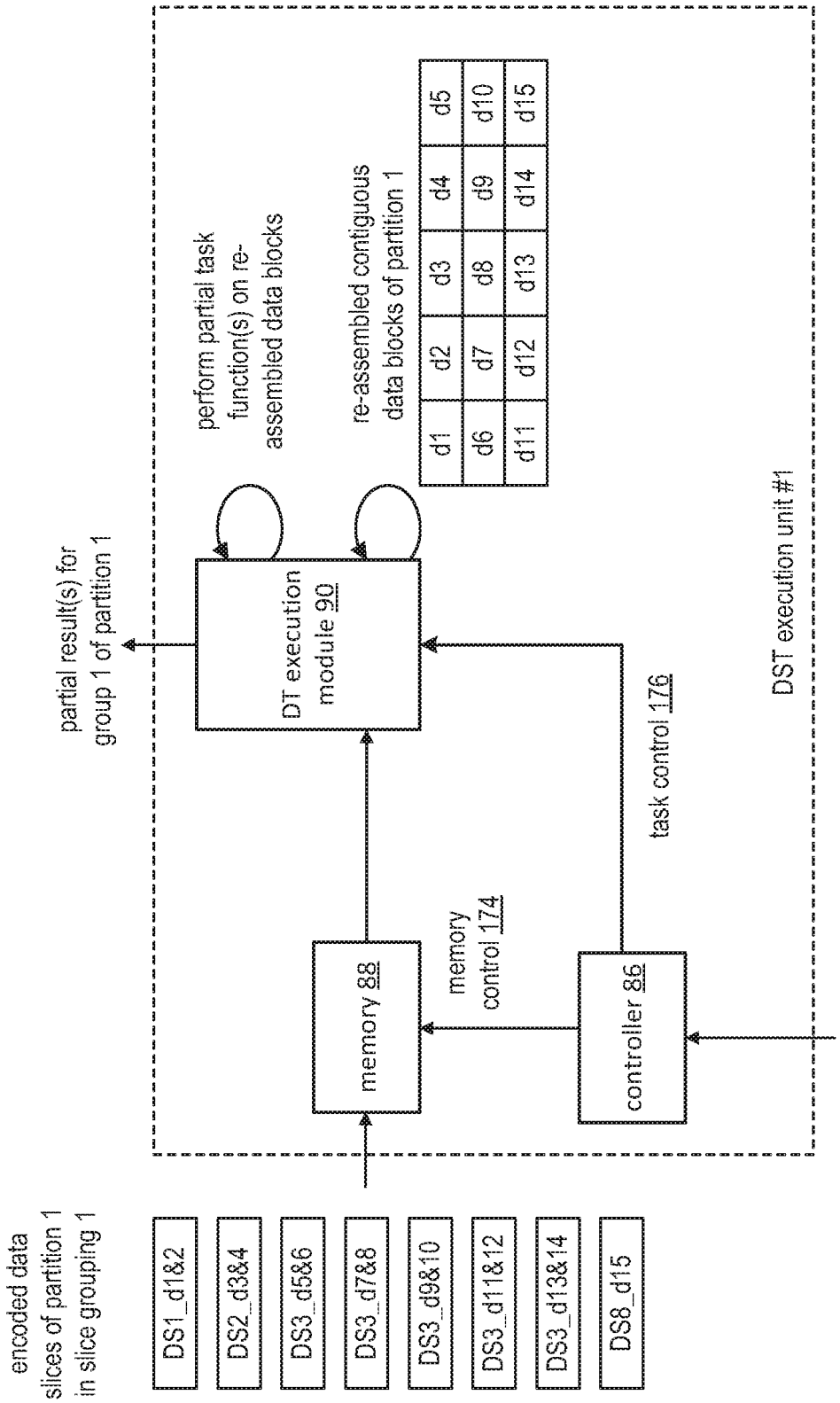
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
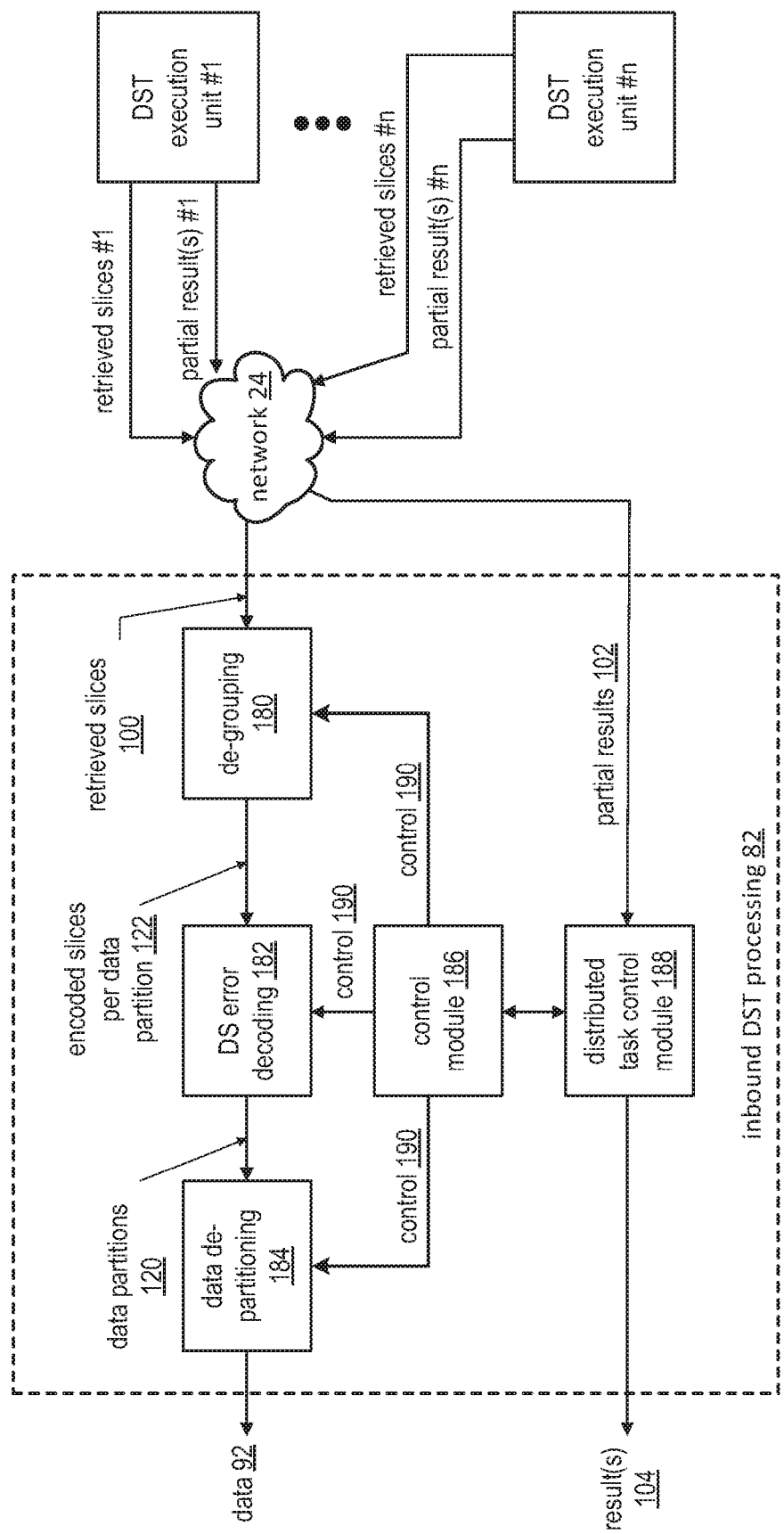
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
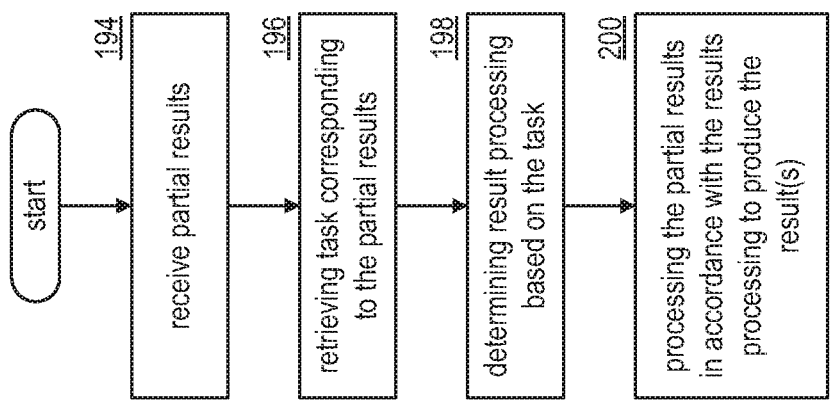
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
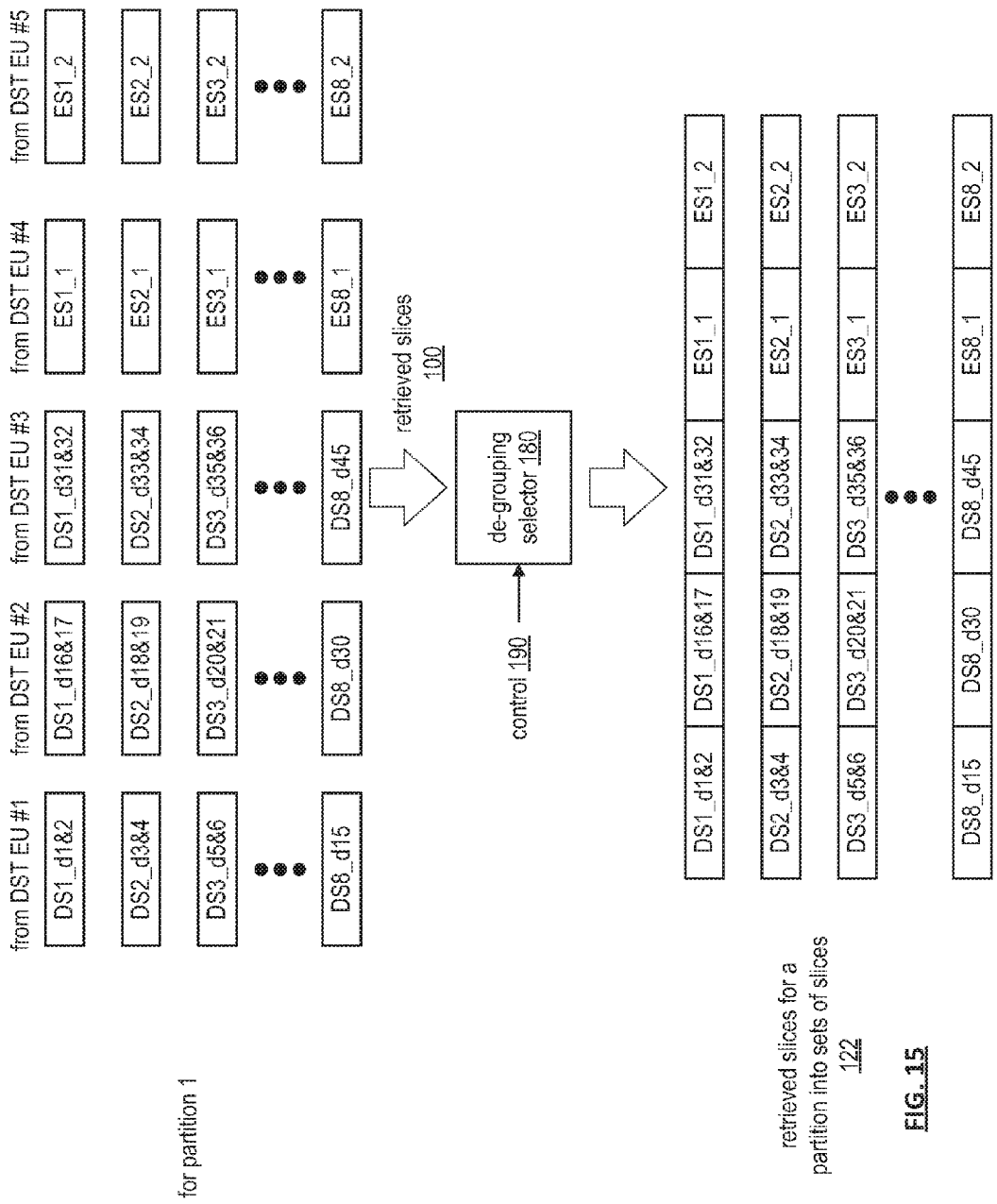
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
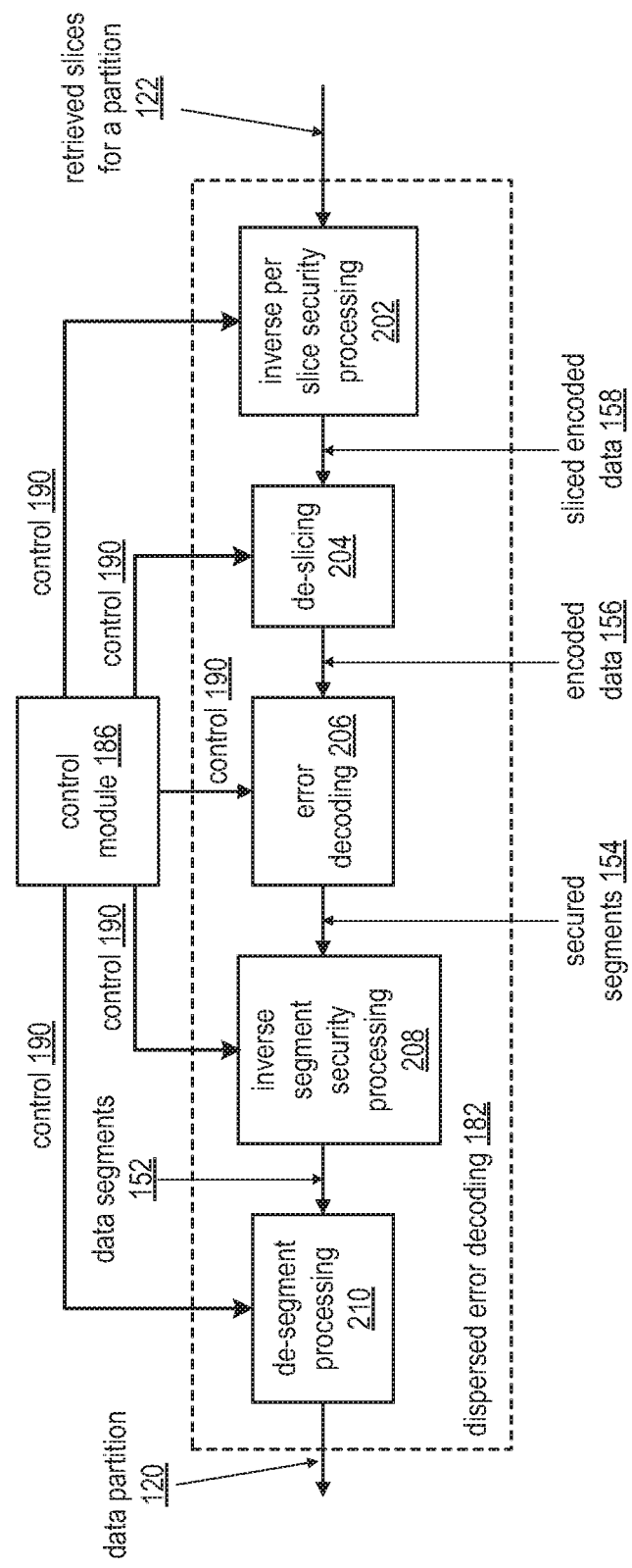
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
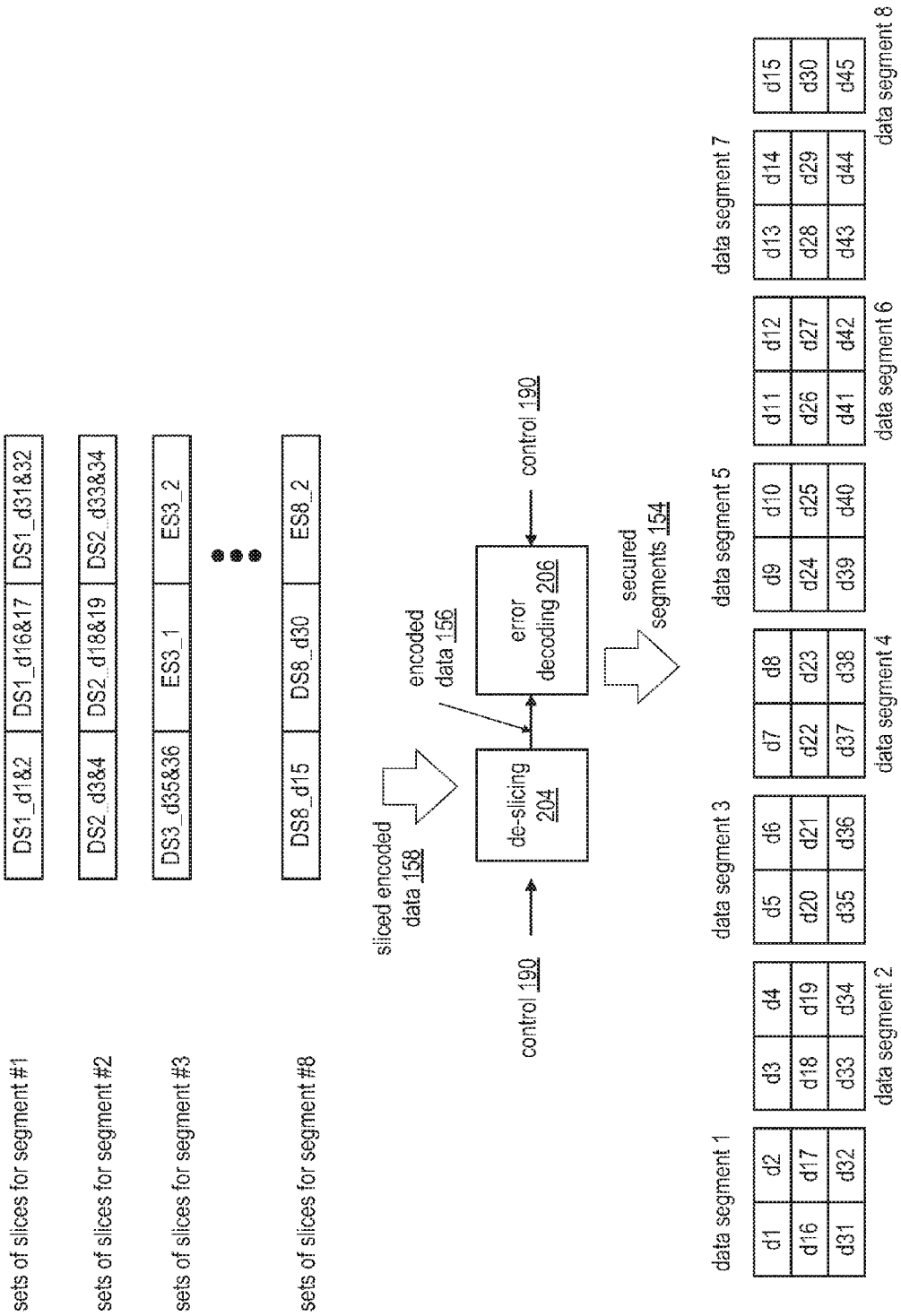
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
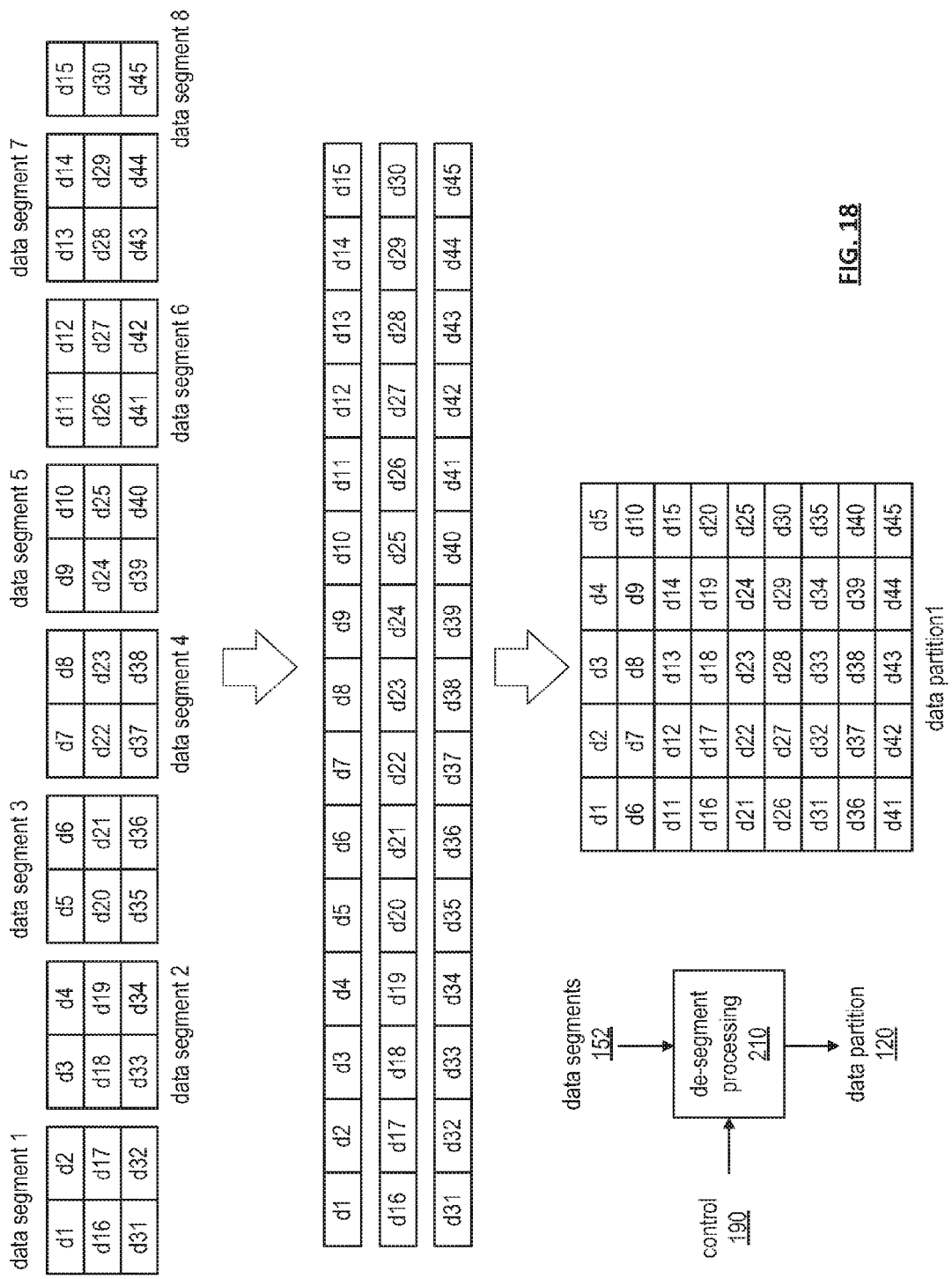
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
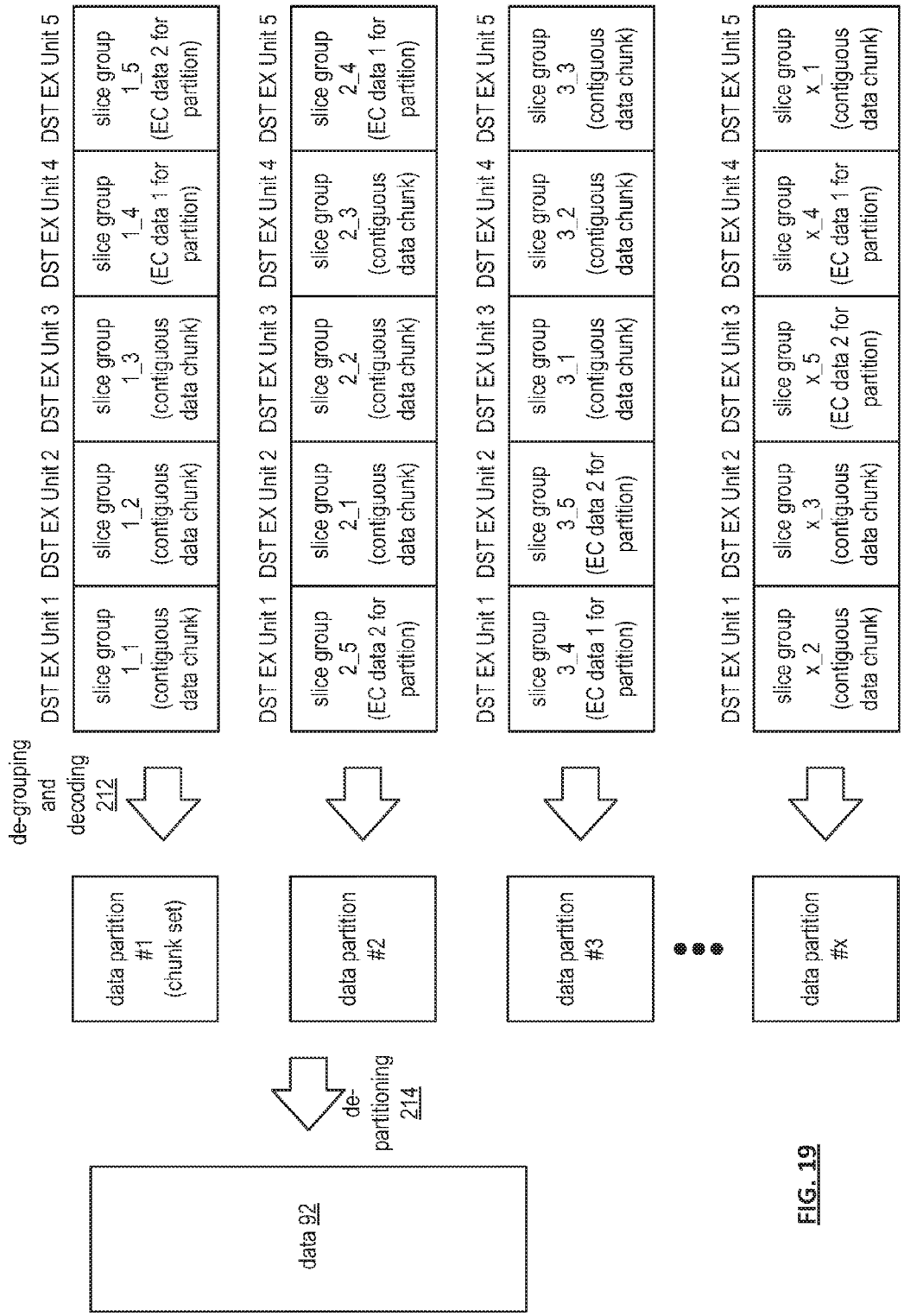
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
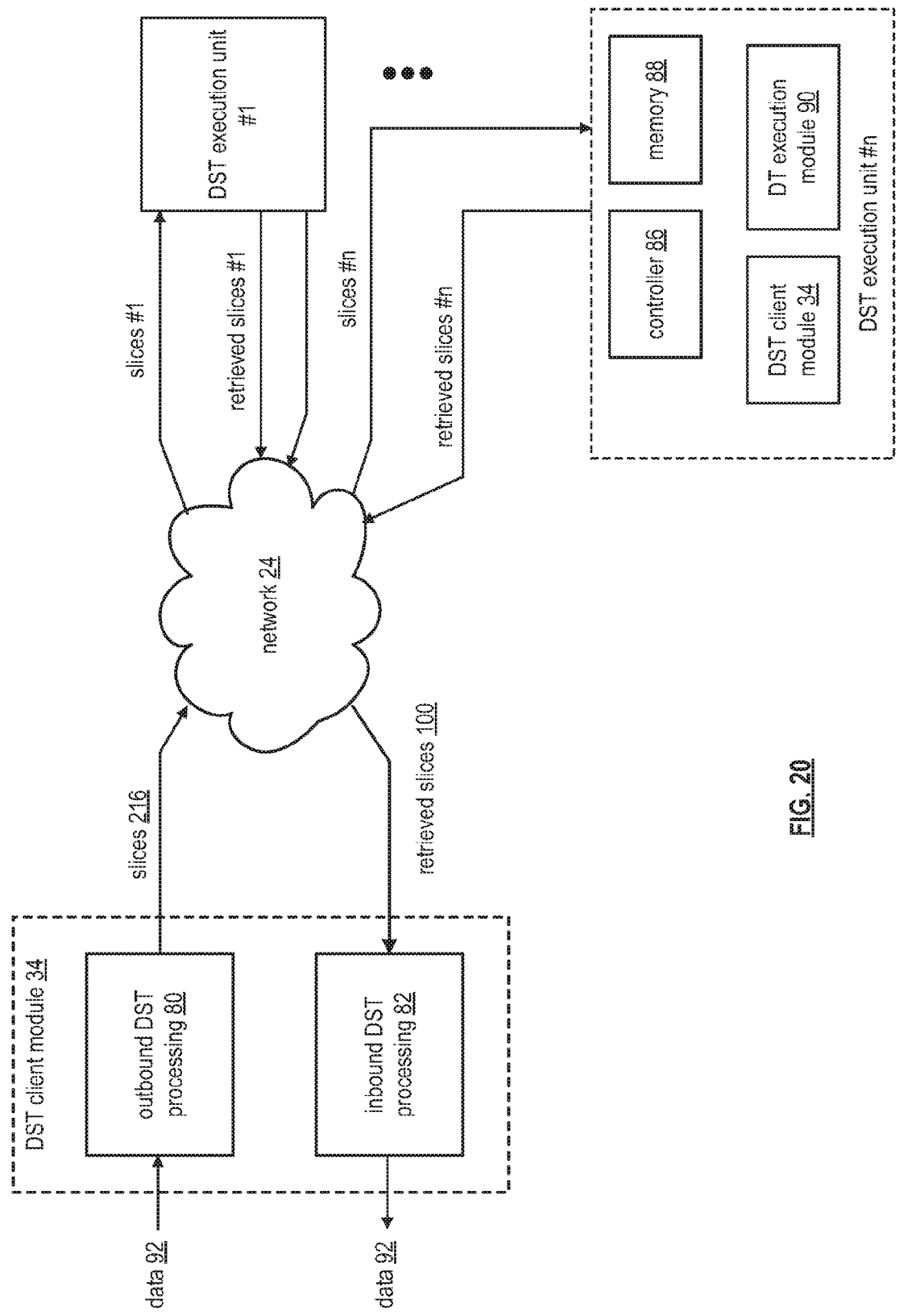
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
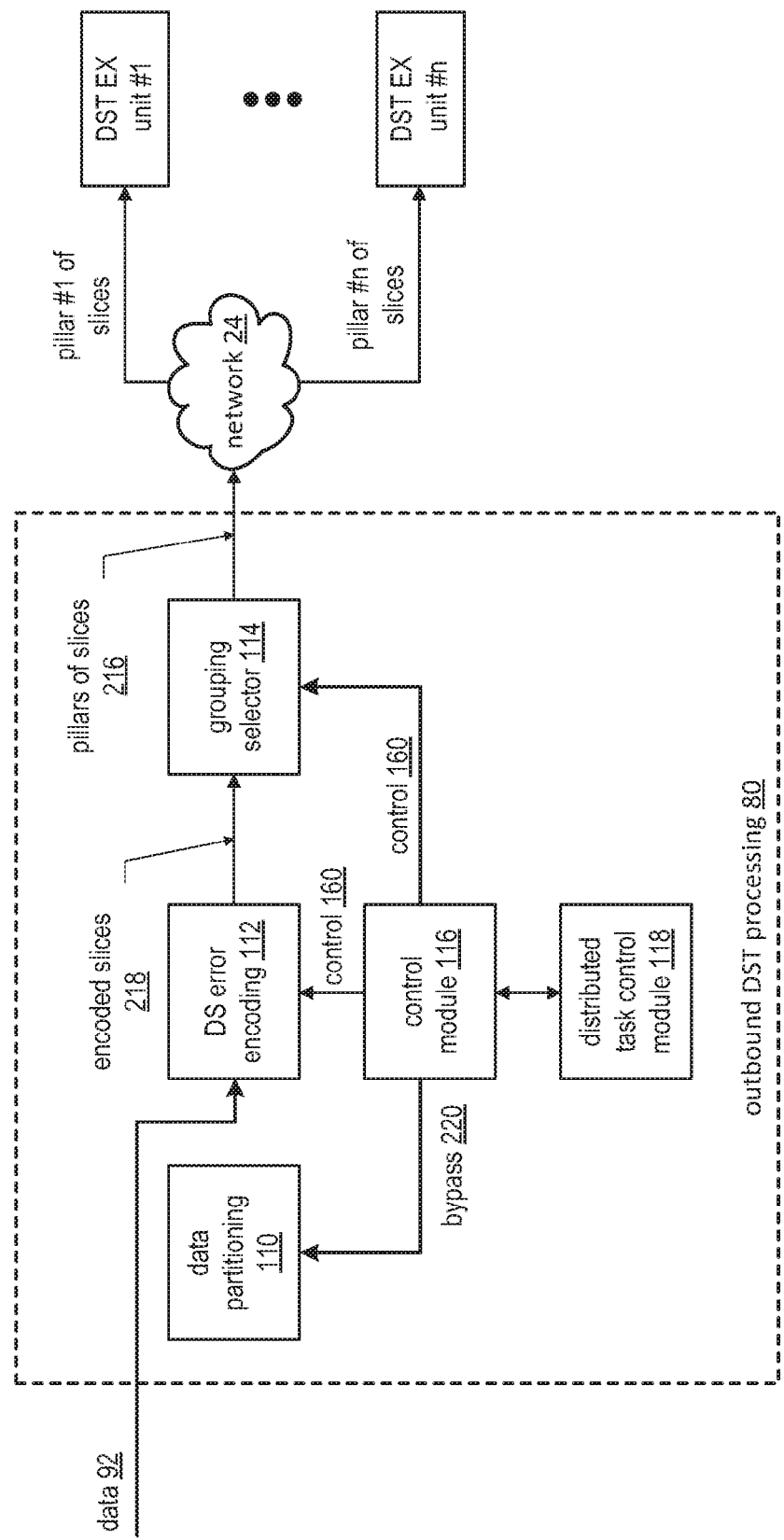
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
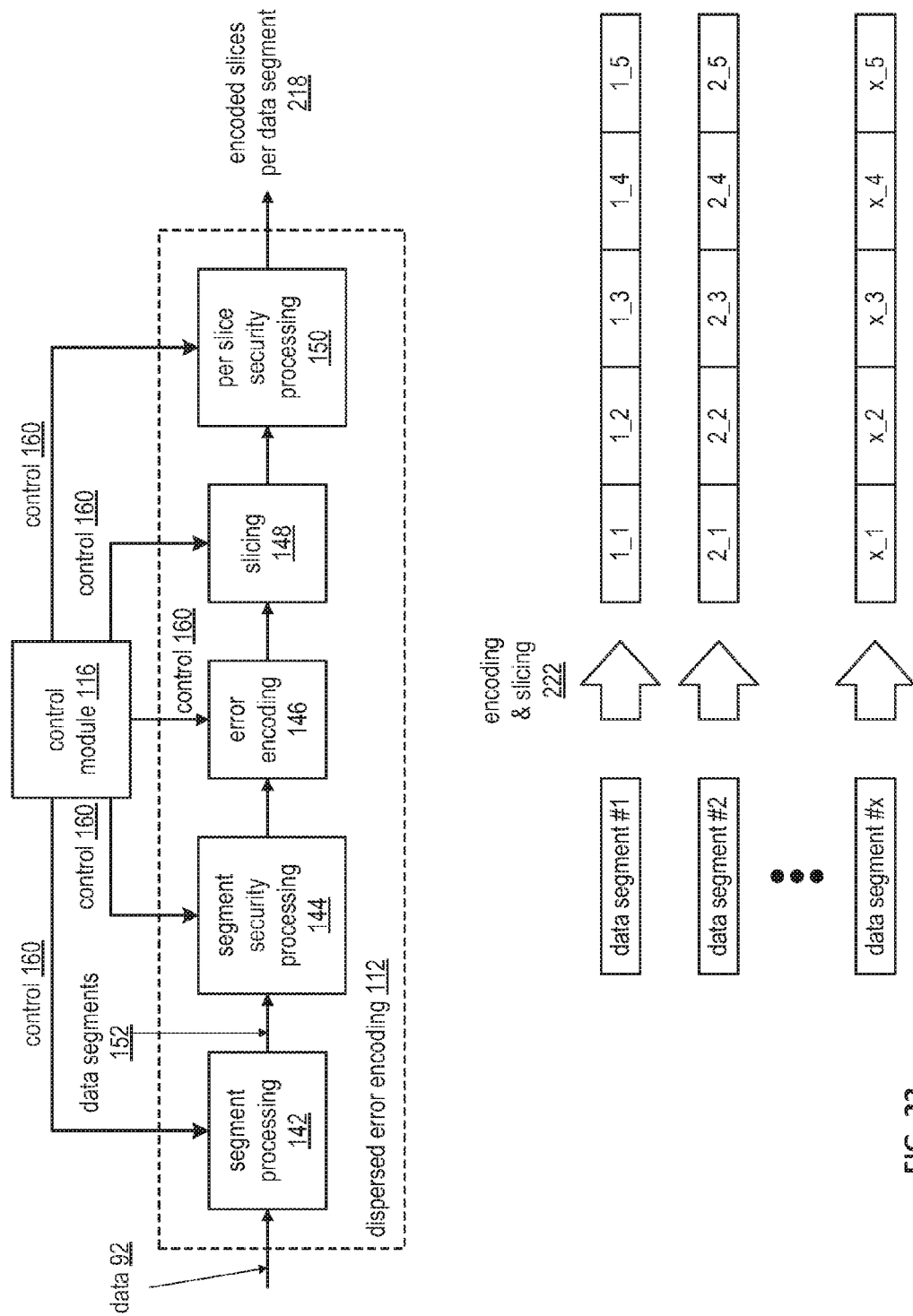
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
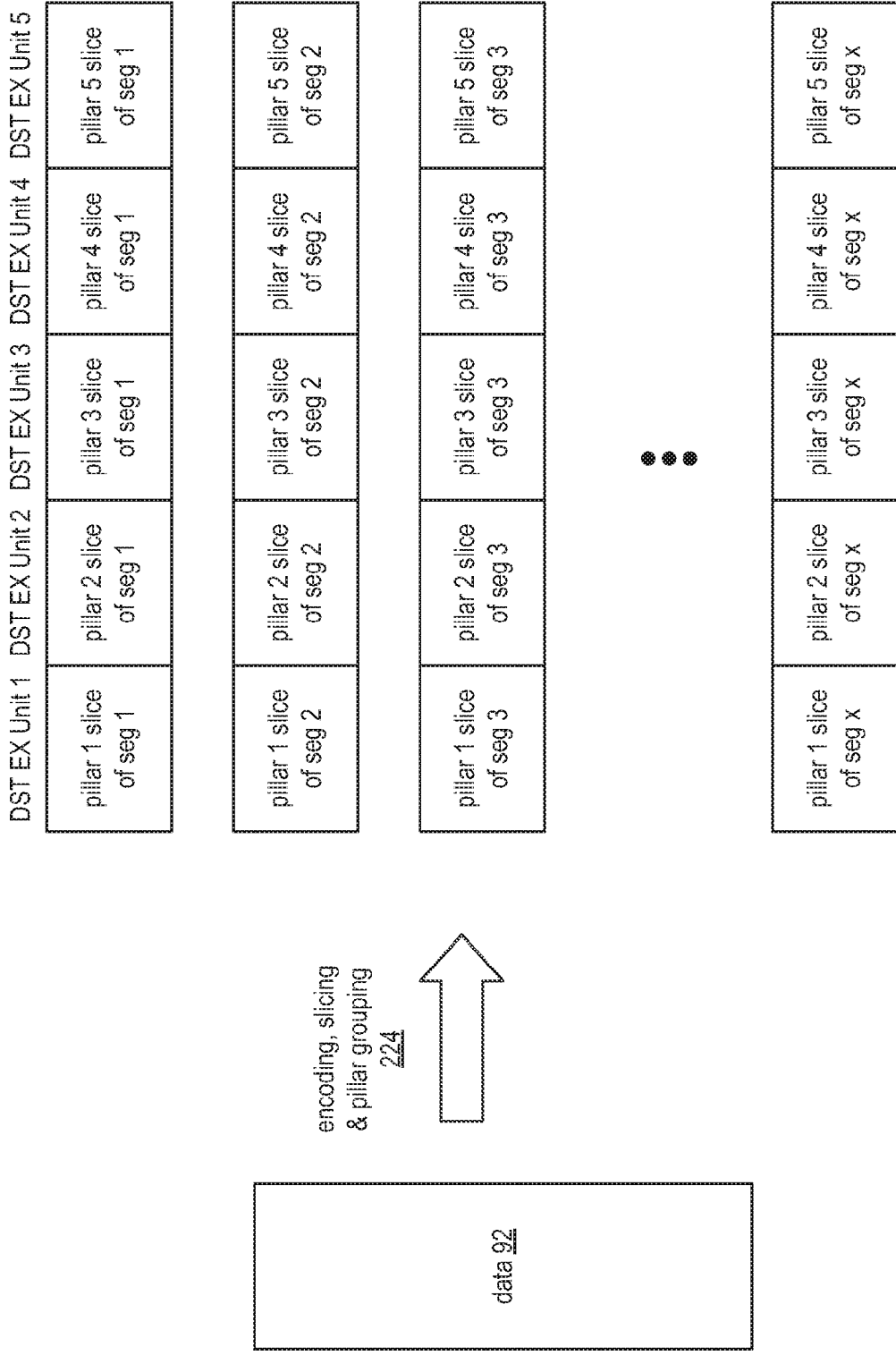
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
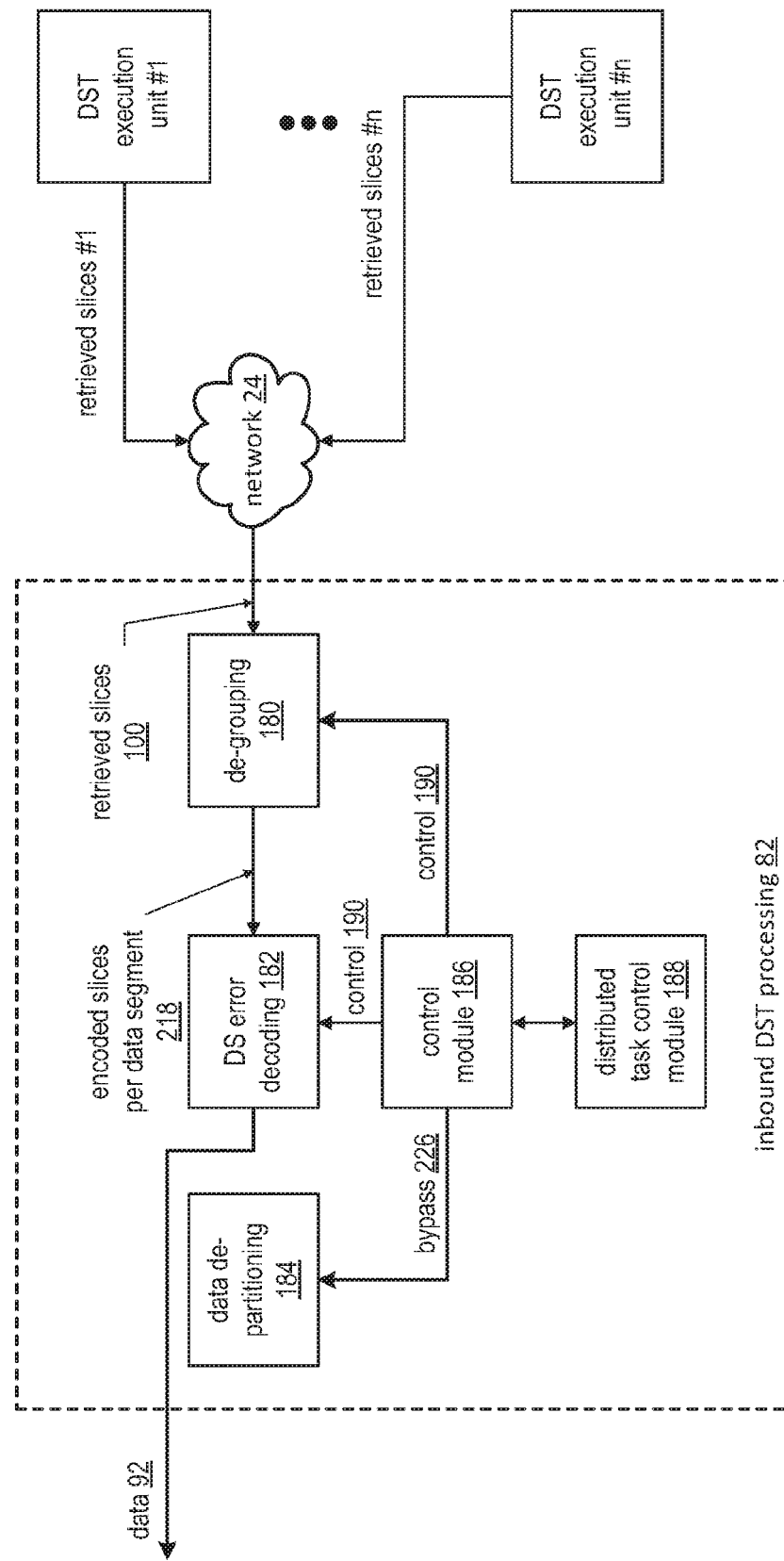
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
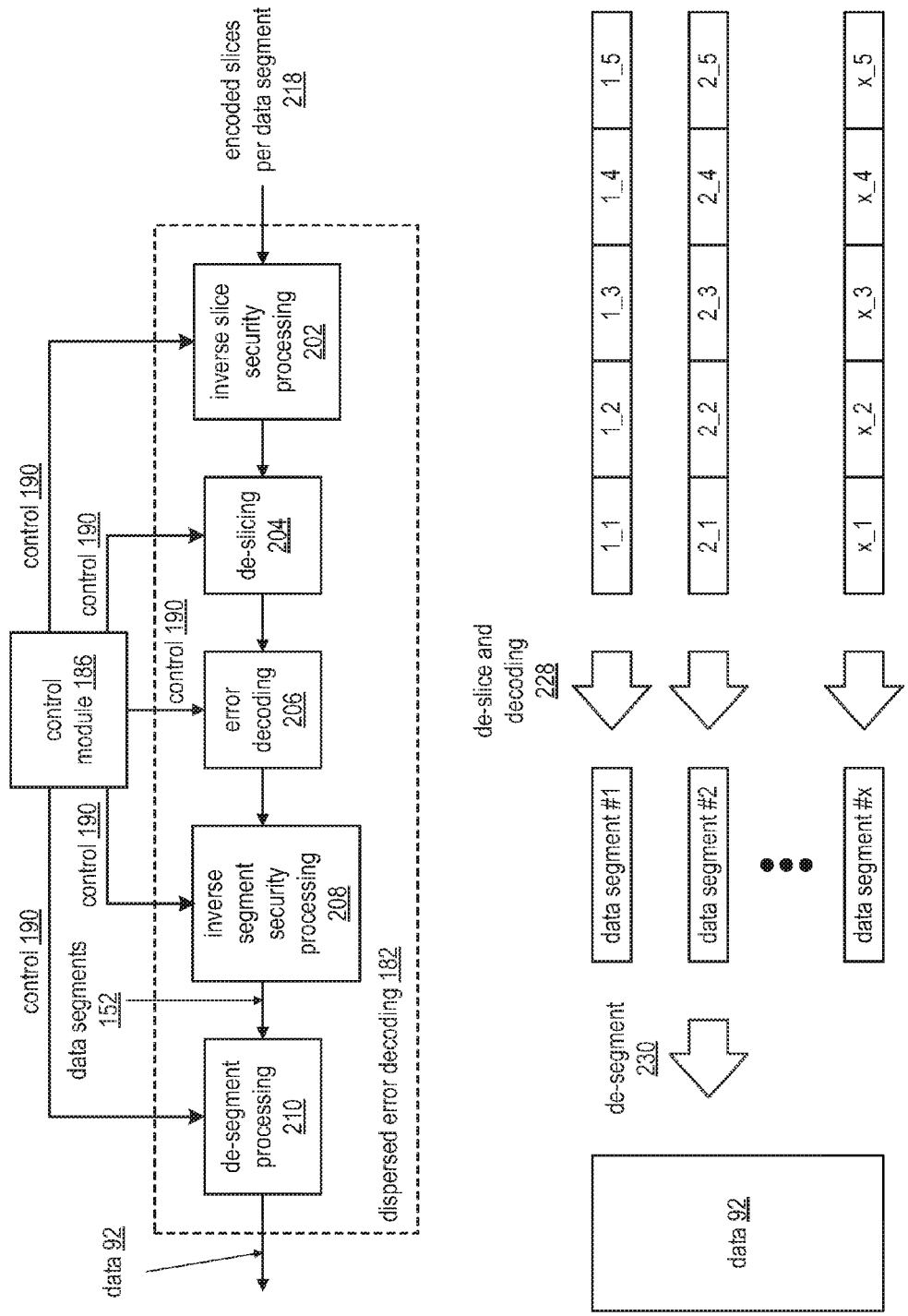
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
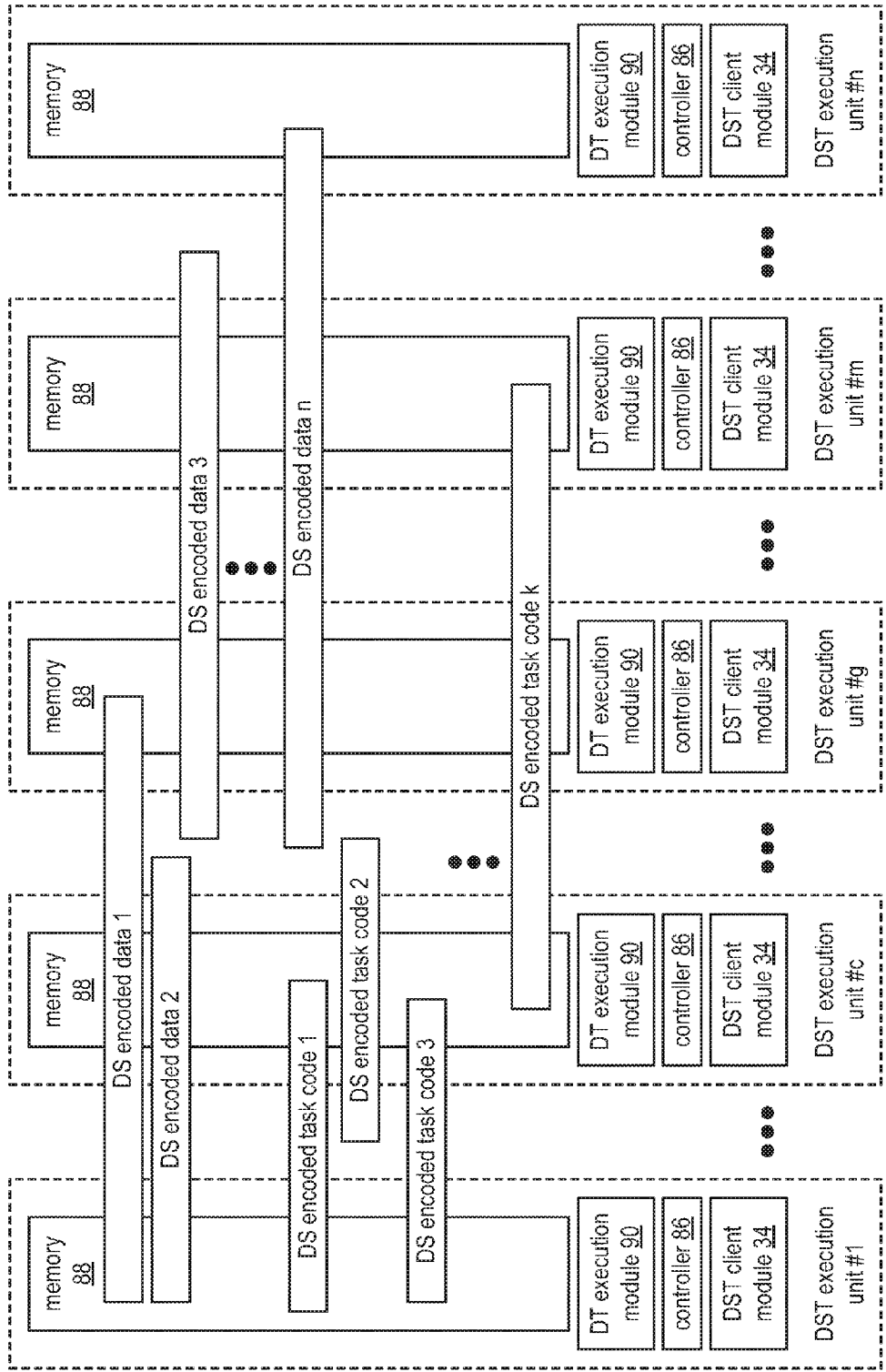
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
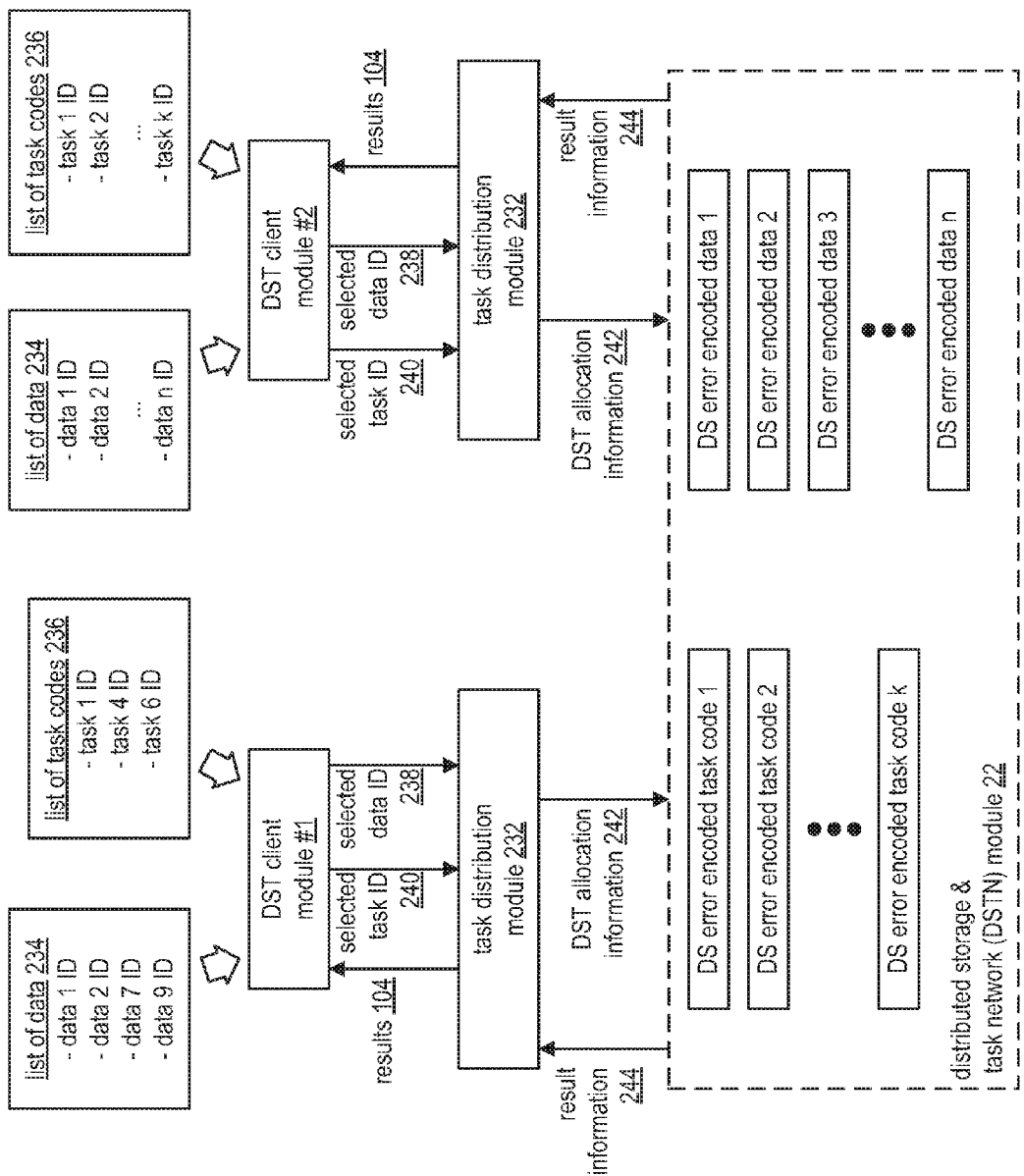
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
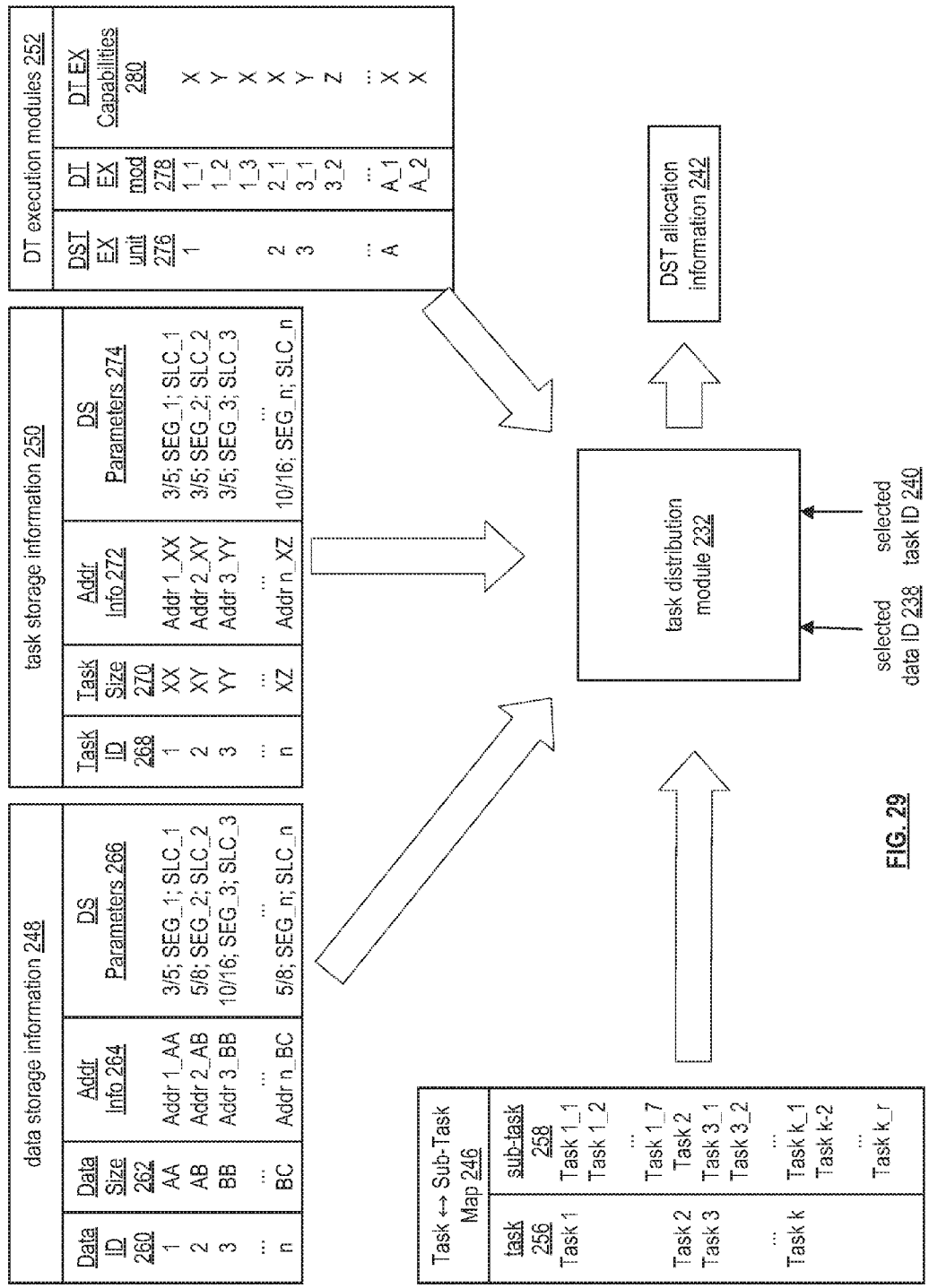
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
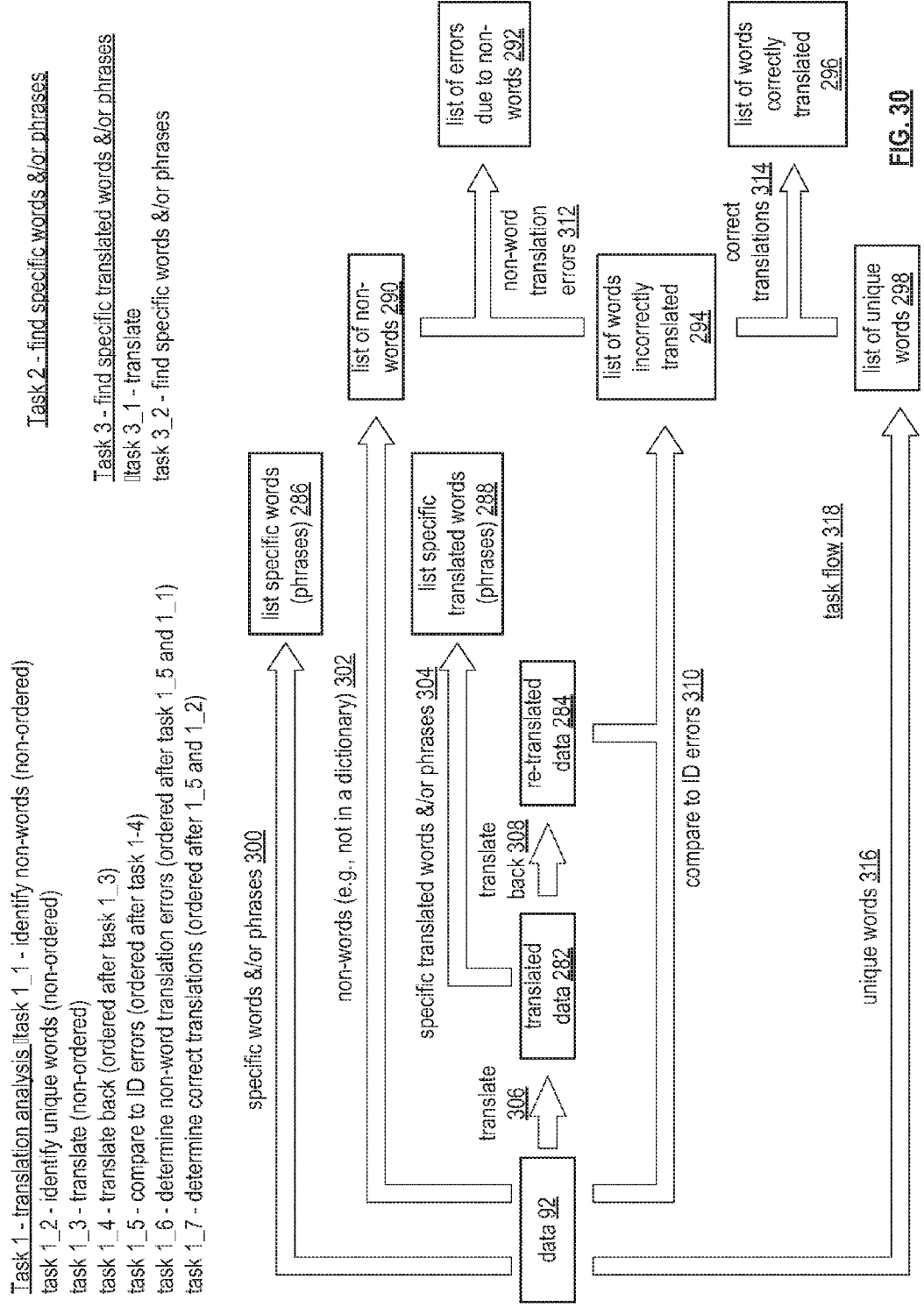
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.)), may include the word and/or phrase, how many times it is used, where in the data it is used, and/or any other information requested regarding a word and/or phrase.

Figure 31:
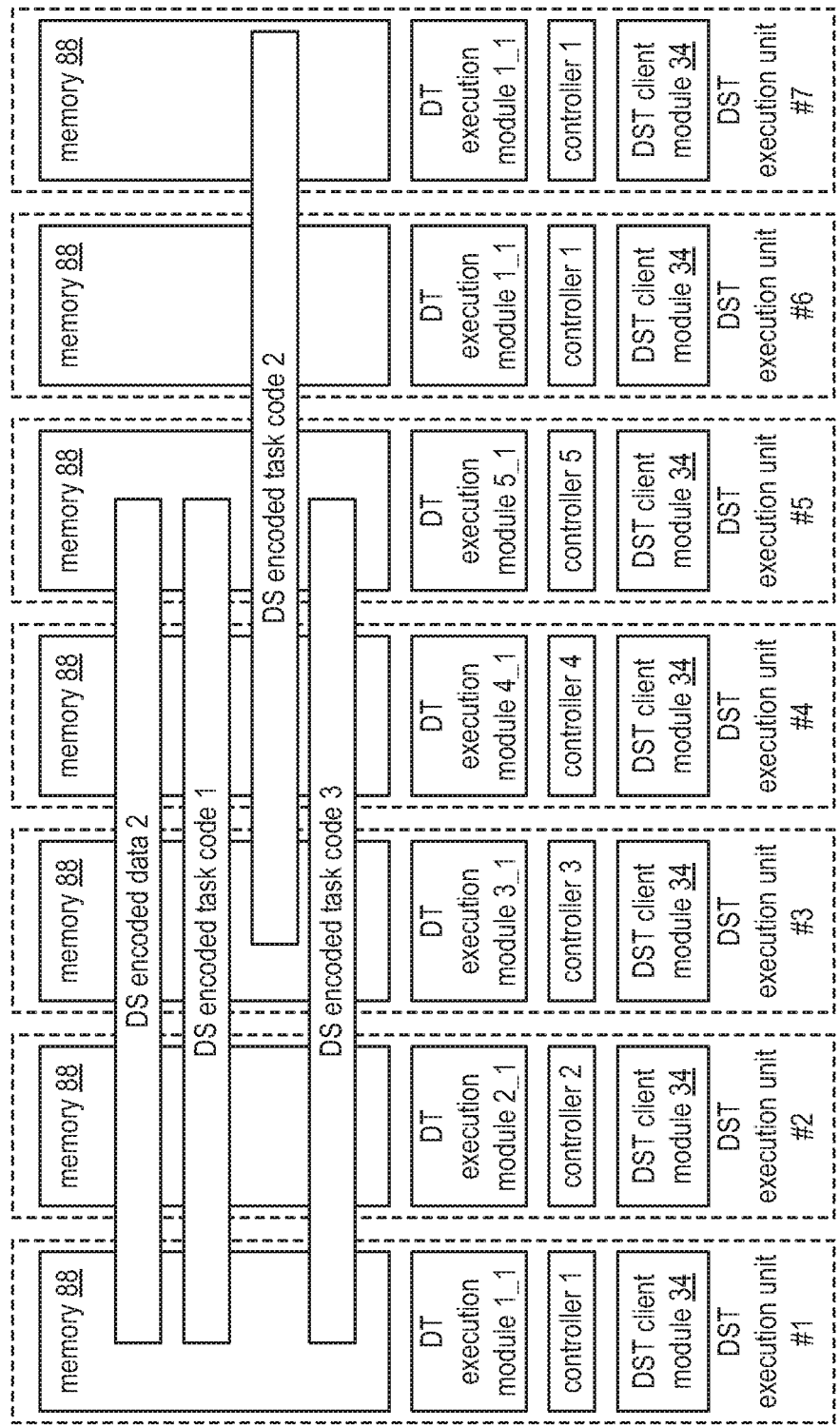
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
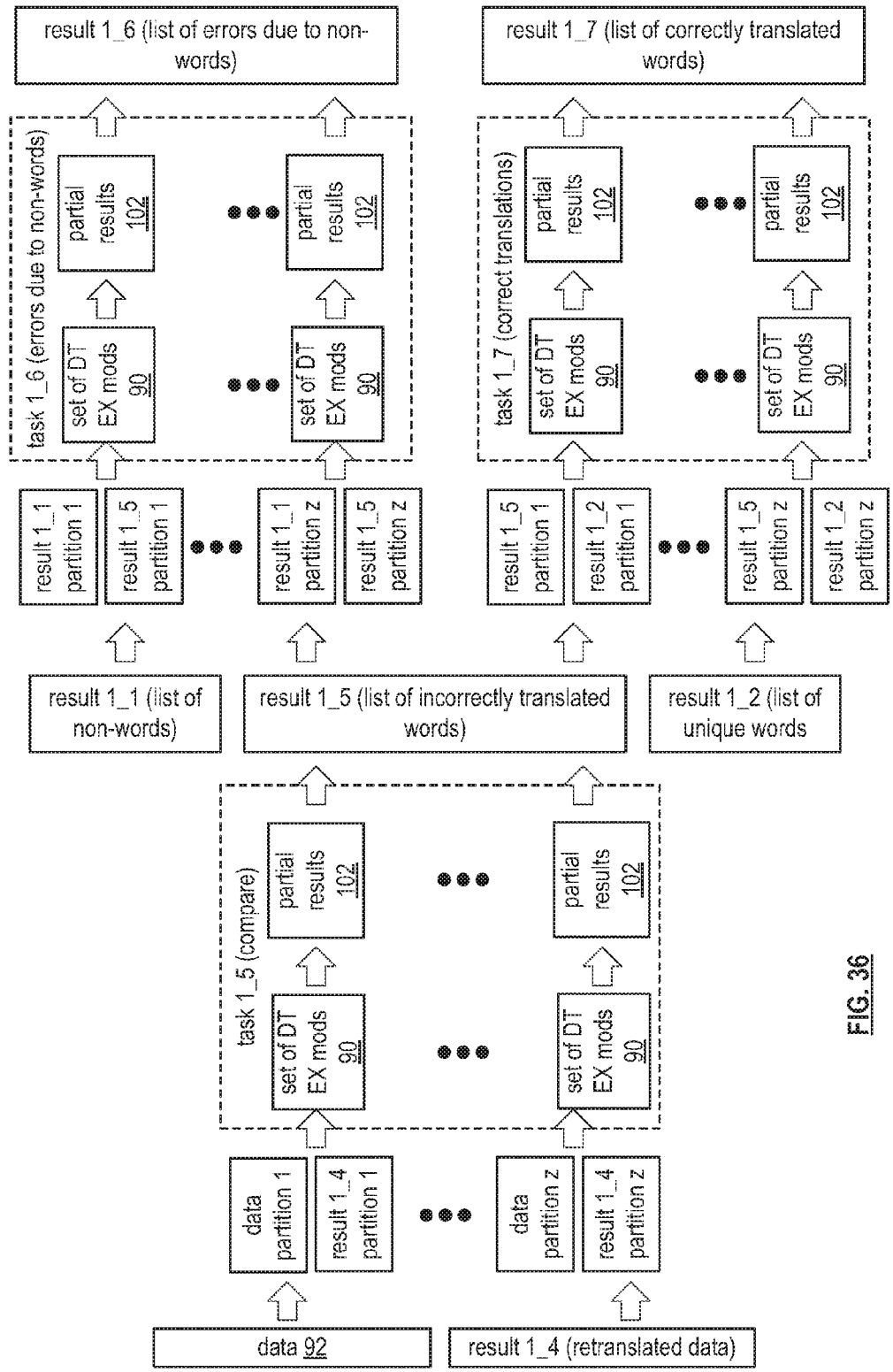

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
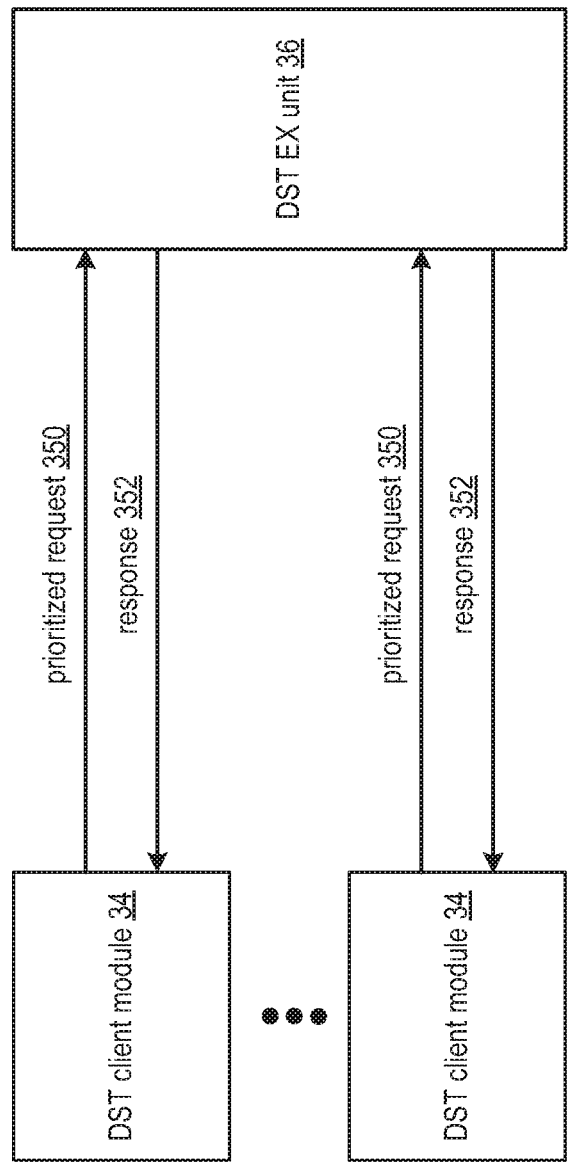
FIG. 40A is a schematic block diagram of another embodiment of a distributed computing system in accordance with the present invention.

FIG. 40A is a schematic block diagram of another embodiment of a distributed computing system that includes a plurality of distributed storage and task (DST) client modules 34 and a DST execution unit 36. The DST client module 34 may be incorporated as part of the DST processing unit 16 or the user device 12 of FIG. 1. The system functions to prioritize access requests from the plurality of DST client modules 34. The access request may include a distributed storage and task network (DSTN) access request. The DSTN access request may include at least one of a read request, a write request, a delete request, a list request, etc. An access request is executed in accordance with a prioritization scheme and a response 352 is generated based on a result of executing the request.

The DST client module 34 generates a prioritized request 350 and sends the prioritized request 350 to the DST execution unit 36. The prioritized request 350 may include a task for execution and a desired priority level for execution of the task. The DST client module 34 selects a value of the desired priority level based on one or more of a previous response 352 corresponding to the request, a request type of the prioritized request 350, the timing requirement, a priority input, and a data type associated with the prioritized request 350.

The DST execution unit 36 determines an execution priority level for the prioritized requests 350 based on one or more of a current loading level, execution priority levels of previously queued requests, and the desired priority level of the prioritized request 350. The execution priority level indicates a priority value level relative to other execution priority levels of other prioritized requests 350. For example, a rejection level indicates that the prioritized request 350 will not be executed. As another example, a process level indicates that the prioritized request 350 will be executed in accordance with other queued prioritized requests 350.

The DST execution unit 36 generates and outputs the response 352 to the DST client module 34, where the response 352 includes the determined execution priority level. Next, the DST execution unit 36 executes tasks associated with the queued prioritized requests 350 in accordance with determined execution priority levels. The DST execution unit 36 may generate a subsequent response 352 that includes another result of execution of tasks associated with another queued prioritized request 350. For example, the DST execution unit 36 generates the response 352 that includes an encoded data slice when the prioritized request 350 includes a request to read the encoded data slice. The method of operation of the system to prioritize requests is discussed in greater detail with reference to FIG. 40B.

Figure 40B:
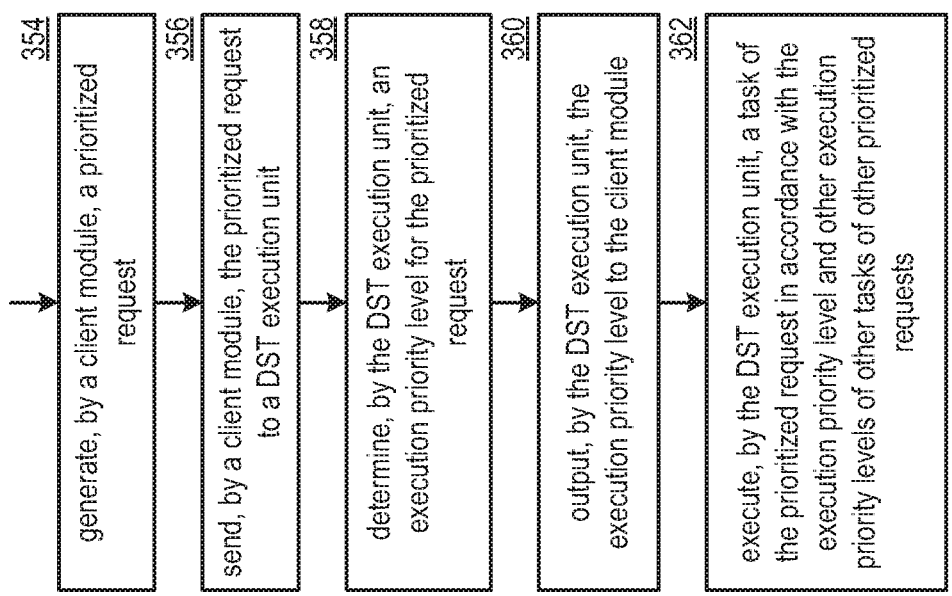
FIG. 40B is a flowchart illustrating an example of prioritizing a request in accordance with the present invention.

FIG. 40B is a flowchart illustrating an example of prioritizing a request. The method begins with step 354 where a distributed storage and task (DST) client module generates a prioritized request. For example, the DST client module generates a read slice request with a higher than average desired priority level value to enable recreation of an important data file. The method continues at step 356 where the DST client module sends the prioritized request to a DST execution unit. The method continues at step 358 where the DST execution unit determines an execution priority level for the prioritized request. The method continues at step 360 where the DST execution unit outputs the execution priority level to the client module. For example, the DST execution unit generates a response that includes the execution priority level corresponding to the prioritized request. The method continues at step 362 where the DST execution unit executes a task associated with the prioritized request in accordance with the execution priority level and other execution priority levels associated with other tasks of other prioritized requests.

Figure 41A:
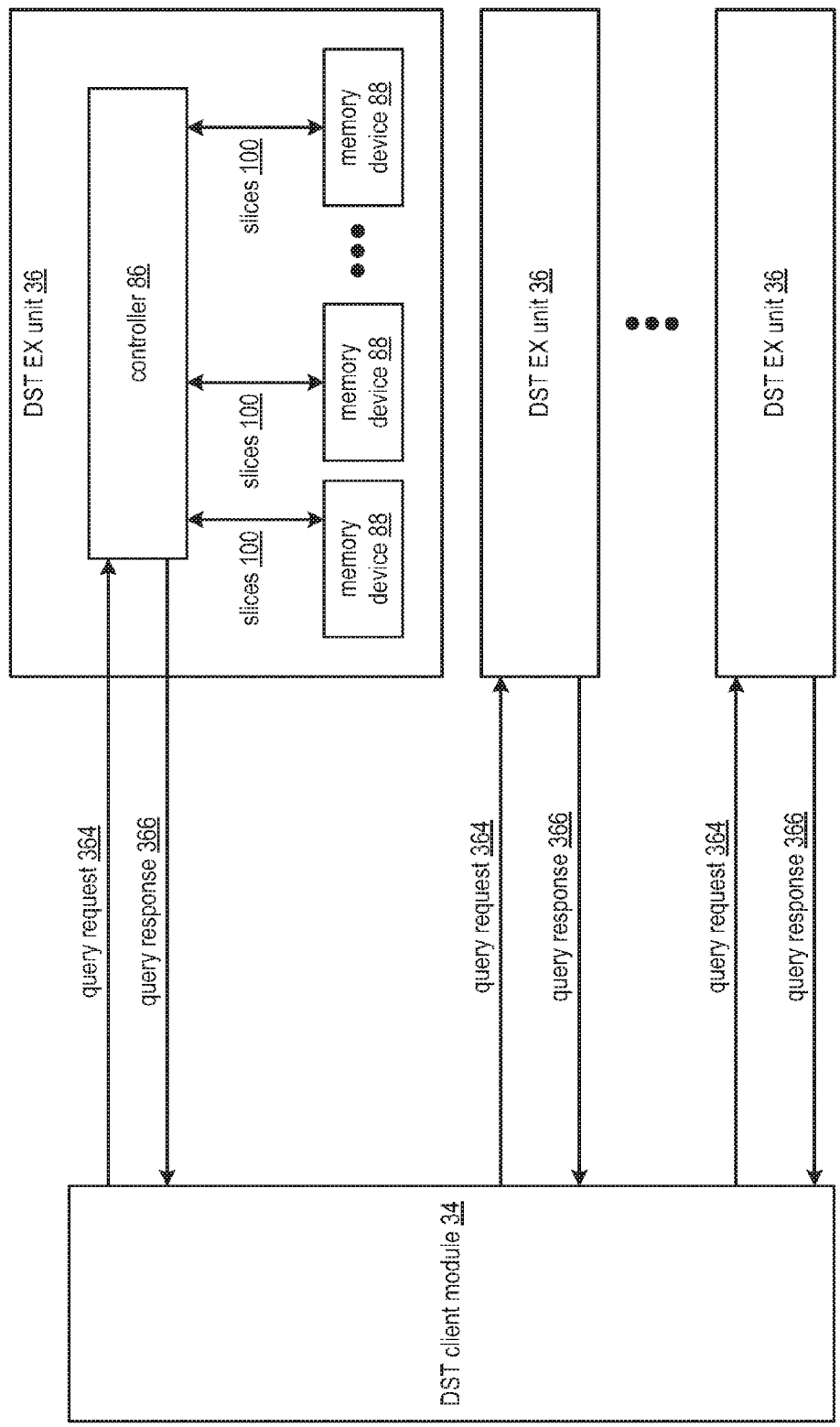
FIG. 41A is a schematic block diagram of another embodiment of a distributed computing system in accordance with the present invention.

FIG. 41A is a schematic block diagram of another embodiment of a distributed computing system that includes a distributed storage and task (DST) client module 34 and a plurality of DST execution units 36. Each DST execution unit 36 of the plurality of DST execution units 36 includes a controller 86 and a plurality of memory devices 88. The plurality of memory devices 88 store encoded data slices 100. The system functions to verify utilization of storage capacity of the plurality of DST execution units 36 with regards to storage of the encoded data slices 100.

The DST client module 34 identifies a file for storage analysis. The identifying may be based on any of receiving a request, a predetermination, a list, utilizing a round robin approach, and identifying the file as a next file on a file list. The DST client module 34 generates sets of slice names corresponding to sets of encoded data slices 100 stored in the DST execution units 36. The file is segmented to produce a plurality of segments. Each segment of the plurality of segments is encoded utilizing a dispersed storage error coding function to produce a set of encoded data slices 100. The generating of the sets of slice names may be based on one or more of a file identifier (ID) of the file, a vault ID corresponding to the file ID, and a registry lookup.

The DST client module 34 identifies a set of DST execution units 36 associated with storage of the sets of encoded data slices 100. The identifying may be based on one or more of receiving identifiers of the set of DST execution units 36, a registry lookup, and a distributed storage and task network (DSTN) virtual address to physical location table lookup.

For each DST execution unit 36 of the set of DST execution units 36, the DST client module 34 generates query requests 364 corresponding to the sets of encoded data slices 100. Each query request 364 includes a slice name corresponding to an encoded data slice 100 of a set of encoded data slices 100 stored in a memory device 88 of the DST execution unit 36. The DST client module 34 outputs the query request 364 to the DST execution unit 36.

A corresponding controller 86 of the DST execution unit 36 receives the query request 364 and identifies the memory device 88 that is utilized to store the encoded data slice 100. The DST execution unit 36 generates a query response 366. The query response 366 includes one or more of the slice name, storage location information which includes an identifier of the memory device 88, a length of time of storage indicator, a memory device age, and a memory device replacement schedule. The generating includes at least one of accessing a local table and retrieving information from the memory device 88. The DST execution unit 36 outputs the query response 366 to the DST client module 34

For the set of encoded data slices 100, the DST client module 34 receives a set of query responses 366 from the set of DST execution units 36. The DST client module 34 facilitates a storage action based on the set of query responses 366. A first storage action includes generating a storage record that includes one or more of the file ID, a source name corresponding to the file ID, identity of the data segments, the sets of slice names, identity of the set of DST execution units 36, and the storage location information within the set of DST execution units 36. A second storage action includes migrating at least some encoded data slices 100 when the storage record compares unfavorably to a desired storage record. For example, the DST client module 34 detects an imbalance based on the comparison and indicates to migrate the at least some encoded data slices 100. The method to verify storage utilization is discussed in greater detail with reference to FIG. 41B.

Figure 41B:
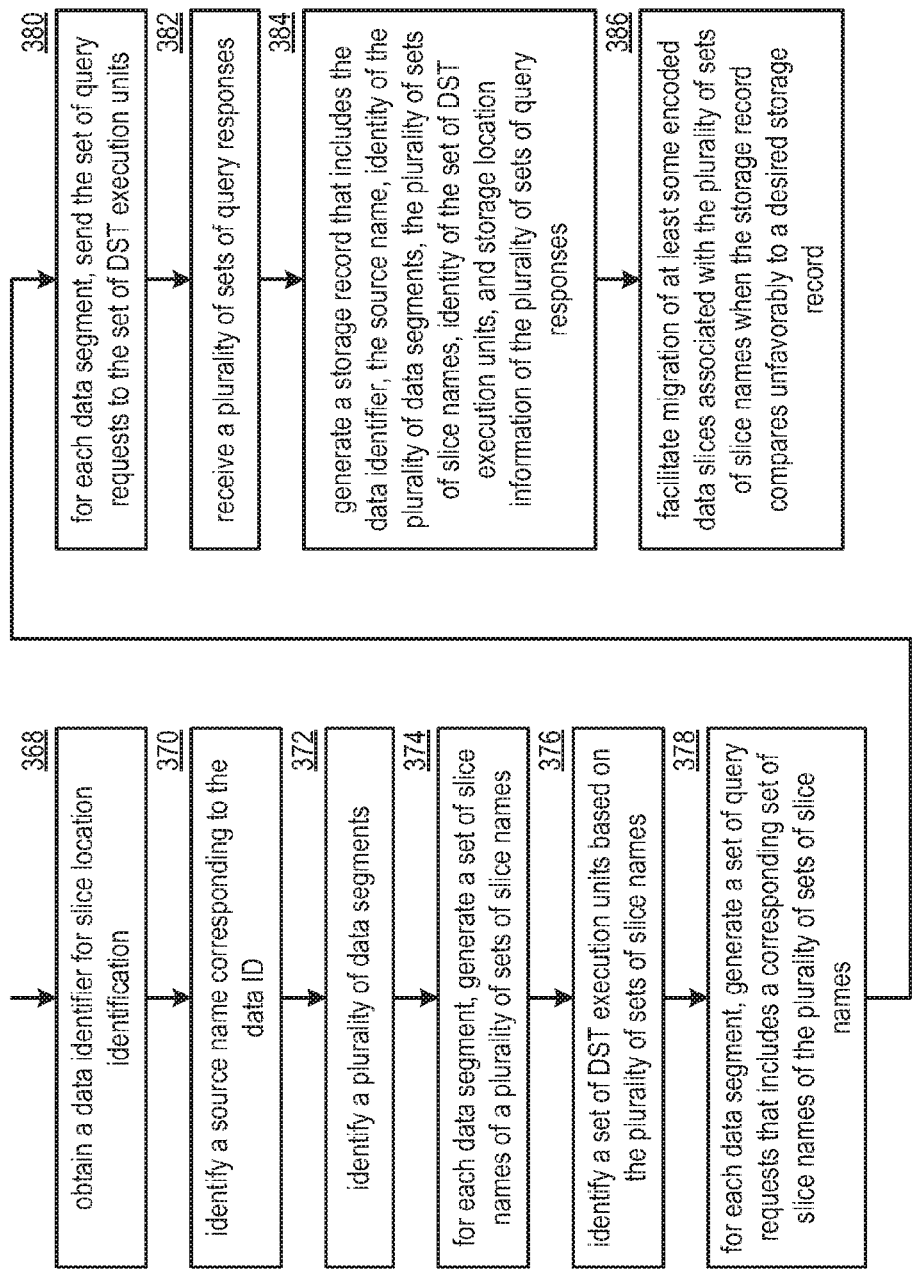
FIG. 41B is a flowchart illustrating an example of verifying storage utilization in accordance with the present invention.

FIG. 41B is a flowchart illustrating an example of verifying storage utilization. The method begins with step 368 where a processing module (e.g., of a distributed storage and task (DST) client module) obtains a data identifier (ID) for slice location identification. The obtaining includes at least one of receiving, initiating a query, extracting from an error message, and receiving a user request. The method continues at step 370 where the processing module identifies a source name (e.g., a virtual distributed storage and task network (DSTN) address) corresponding to the data ID as a specific example, the processing module performs a directory lookup utilizing the data ID to extract the source name from a DSTN directory. The method continues at step 372 where the processing module identifies a plurality of data segments. The identifying includes at least one of extracting identities from a segment allocation table associated with the source name and extracting from a first retrieved data segment associated with the source name.

For each data segment, the method continues at step 374 where the processing module generates a set of slice names. Each slice name includes the source name and a segment number in accordance with a plurality of data segments. The method continues at step 376 where the processing module identifies a set of DST execution units based on sets of slice names. The identifying includes accessing a slice name to physical location table utilizing the set of slice names.

For each data segment, the method continues at step 378 where the processing module generates a set of query requests that includes a corresponding set of slice names. For each data segment, the method continues at step 380 where the processing module sends the set of query requests to the set of DST execution units. The method continues at step 382 where the processing module receives sets of query requests. The method continues at step 384 where the processing module generates a storage record that includes the data identifier, the source name, identity of the data segments, the sets of slice names, identity of the set of DST execution units, and storage location information of the sets of query responses. Alternatively, or in addition to, the processing module may graphically display information of the storage record.

The method continues at step 386 where the processing module facilitates migration of at least some encoded data slices associated with the sets of slice names when the storage record compares unfavorably to a desired storage record. The facilitating includes identifying the encoded data slices based on the comparison. For example, a processing module identifies the encoded data slices to migrate when a memory device identifier of the storage location information is associated with an unfavorable reliability level.

Figure 42A:
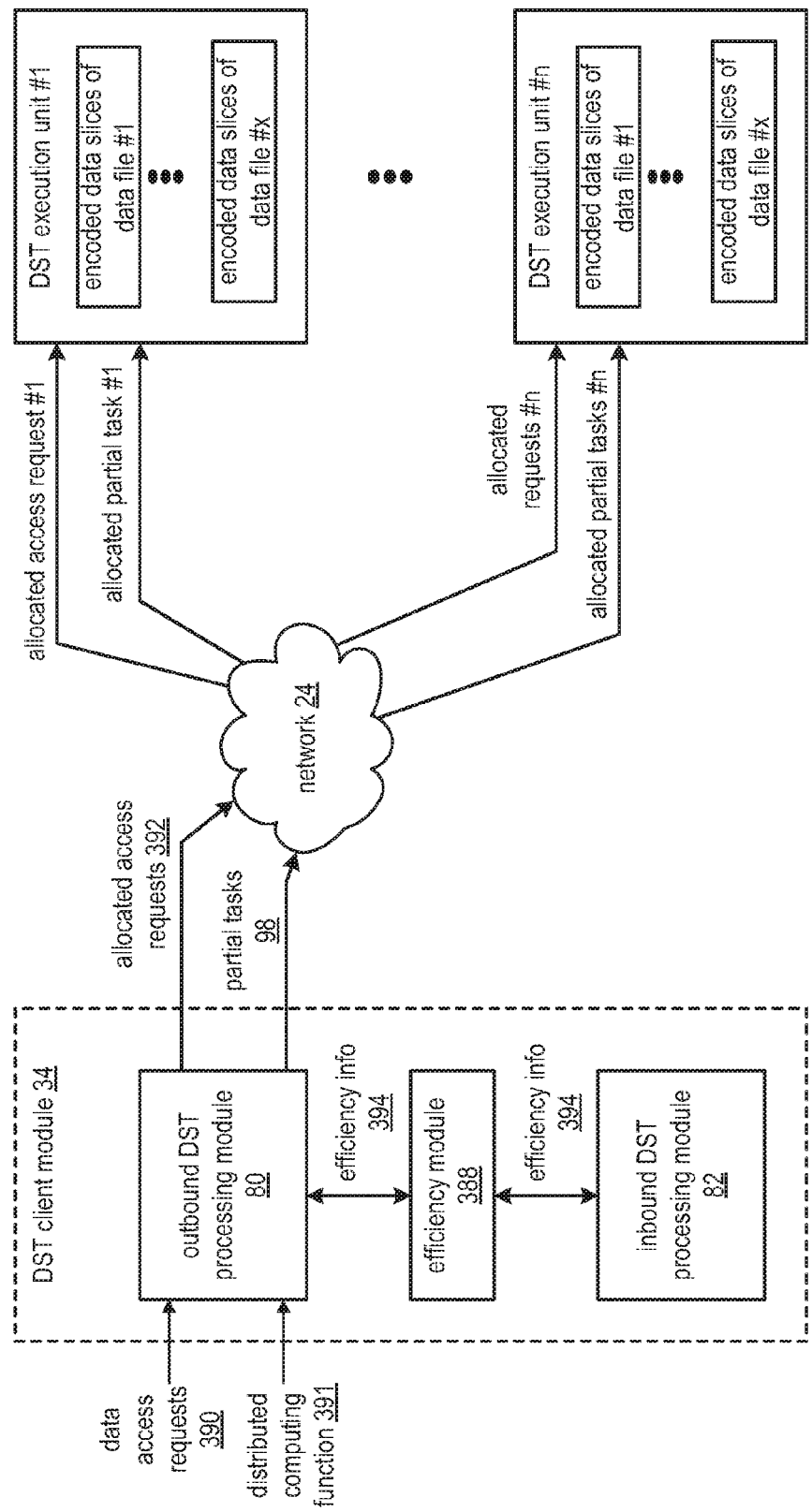
FIG. 42A is a diagram of another example of a distributed storage and task processing in accordance with the present invention.

FIG. 42A is a diagram of another example of a distributed storage and task (DST) processing that includes the DST client module 34, the network 24, and the set of DST execution (DSTE) units of FIG. 3. The DST client module 34 includes the outbound DST processing module 80 and the inbound DST processing module 82 of FIG. 3, and an efficiency module 388. The set of DSTE units, from unit to unit, may have different storage and task processing capabilities and availability. Accordingly, it may be desired to allocate an imbalance of utilization of the task processing and storage capabilities to achieve a desired utilization of the set of DSTE units (e.g., utilizing substantially most of all capabilities of each unit). The DST client module 34 processes a plurality of data access requests 390 and a request to execute a distributed computing function 391 in a manner to achieve the desired utilization of the set of DSTE units. The data access requests 390 request access to a plurality of data files 1-*x*, where each data file includes a plurality of sets of encoded data slices 1-*n* stored in the set of DSTE units.

In an example of achieving the desired utilization of the set of DSTE units, the outbound DST processing module 80 obtains (e.g., receives, creates) the plurality of data access requests 390 and the request to execute the distributed computing function 391 that includes a plurality of partial tasks 98. As a specific example, the outbound DST processing module 80 receives the request execute the distributed computing function 391 and generates the plurality of partial tasks 98. As another specific example, the outbound DST processing module 80 receives the plurality of partial tasks 98. The outbound DST processing module 80 may obtain the plurality of data access requests 390 and the request to execute the distributed computing function 391 overlapping in time. For example, the outbound DST processing 80 receives the plurality of data access requests 390 regarding storage of a data file and obtains the request to execute the distributed computing function 391 regarding the data file. During the overlapping time, the efficiency module 388 may establish the desired utilization of the set of DSTE units to substantially balance loading of the DSTE units based on per unit processing resource utilization to processing resource capabilities. The efficiency module 388 outputs efficiency information 394 to the outbound DST processing module 80, where the efficiency information 394 includes the desired utilization of the set of DSTE units. For example, the outbound DST processing 80 establishes the desired utilization to include a higher resource utilization for one DSTE unit when that DSTE unit has higher processing resource capabilities than other DSTE units.

Having received the established desired utilization of the set of DSTE units, the outbound DST processing module 80 establishes a desired executing efficiency and a desired data access efficiency to obtain the desired utilization of the set of DSTE units. As a specific example of establishing the desired data access efficiency, when the plurality of data access requests 390 includes a plurality of write requests regarding storing the data file as the plurality of sets of encoded data slices in the set of DSTE units, the outbound DST processing module 80 determines a write threshold that indicates, for a set of encoded data slices, a number of encoded data slices to write to the set of DSTE units to ensure proper storage of a data segment of the data file. Having established the write threshold, the outbound DST processing module 80 establishes the desired data access efficiency based on the write threshold.

As another specific example of establishing the desired data access efficiency, when the plurality of data access requests 390 including a plurality of read requests regarding reading a data file from the set of DSTE units as a plurality of sets of encoded data slices, the outbound DST processing module 80 determines a read threshold that indicates, for the set of encoded data slices, a number of encoded data slices to read to ensure recovery of a data segment of the data file from the number of encoded data slices. Having established the read threshold, the outbound DST processing module 80 establishes the desired data access efficiency based on the read threshold.

Having established the desired data access efficiency and the desired executing efficiency, the outbound DST processing module 80 allocates execution of the plurality of partial tasks 98 to the set of DSTE units in accordance with the desired executing efficiency. The outbound DST processing module 80 distributes execution of the plurality of partial tasks 98 among the set of DSTE units such that, from time-to-time, differing DSTE units of the set of DSTE units are not assigned execution of a partial task of the plurality of partial tasks. For example, the outbound DST processing module 80 distributes execution of the plurality of partial tasks 98 such that each DSTE unit is assigned one partial task 98 of a set of five partial tasks 98 when the set of DSTE units includes five DSTE units. The DST processing module 80 may distribute the execution equally amongst the DSTE units or in an imbalanced manner. As a specific example of equal distribution, the outbound DST processing module 80 distributes execution substantially equally allocating the plurality of partial tasks 98 among the set of DSTE units utilizing a pattern to provide the substantially equally allocation. For instance, the pattern indicates on a DSTE unit by DSTE unit basis of when and when not a DSTE unit of the set of DSTE units is allocated a partial task 98. As a specific example of imbalanced distribution, the outbound DST processing module 80 allocates in an imbalanced manner, the plurality of partial tasks 98 among the set of DSTE units. For instance, the outbound DST processing module allocates 4 partial tasks 98 to a first DSTE unit and allocates no partial tasks to a second DSTE unit.

Having allocated execution of the plurality of partial tasks 98, the outbound DST processing module 80 allocates processing of the plurality of data access requests 390 to the set of DSTE units in accordance with the desired data access efficiency. The outbound DST processing module 80 sends allocated access requests 392 of the plurality of data access requests 390 among the set of DSTE units such that, from time-to-time, differing DSTE units are not processing an allocated data access request 392 of the plurality of data access requests 390.

The DST processing module 80 may allocate the allocated data access requests 392 equally amongst the DSTE units or in an imbalanced manner. As a specific example of equal allocation, the outbound DST processing module 80 substantially equally allocates the plurality of data access requests 390 to the set of DSTE units utilizing a pattern (e.g., a different unit is skipped in a round-robin fashion for each set of access slice requests) to provide the substantially equally allocation. For instance, the pattern indicates on a DSTE unit by DSTE unit basis of when and when not a DSTE unit of the set of DSTE units is allocated an allocated data access request 392. As a specific example of imbalanced allocation, the outbound DST processing module 80 allocates, in the imbalanced manner, the plurality of data access requests to the set of DSTE units. For instance, a series of 10 sets of access slice requests includes a first 4 DSTE units and excludes a 5th DSTE unit.

Figure 42B:
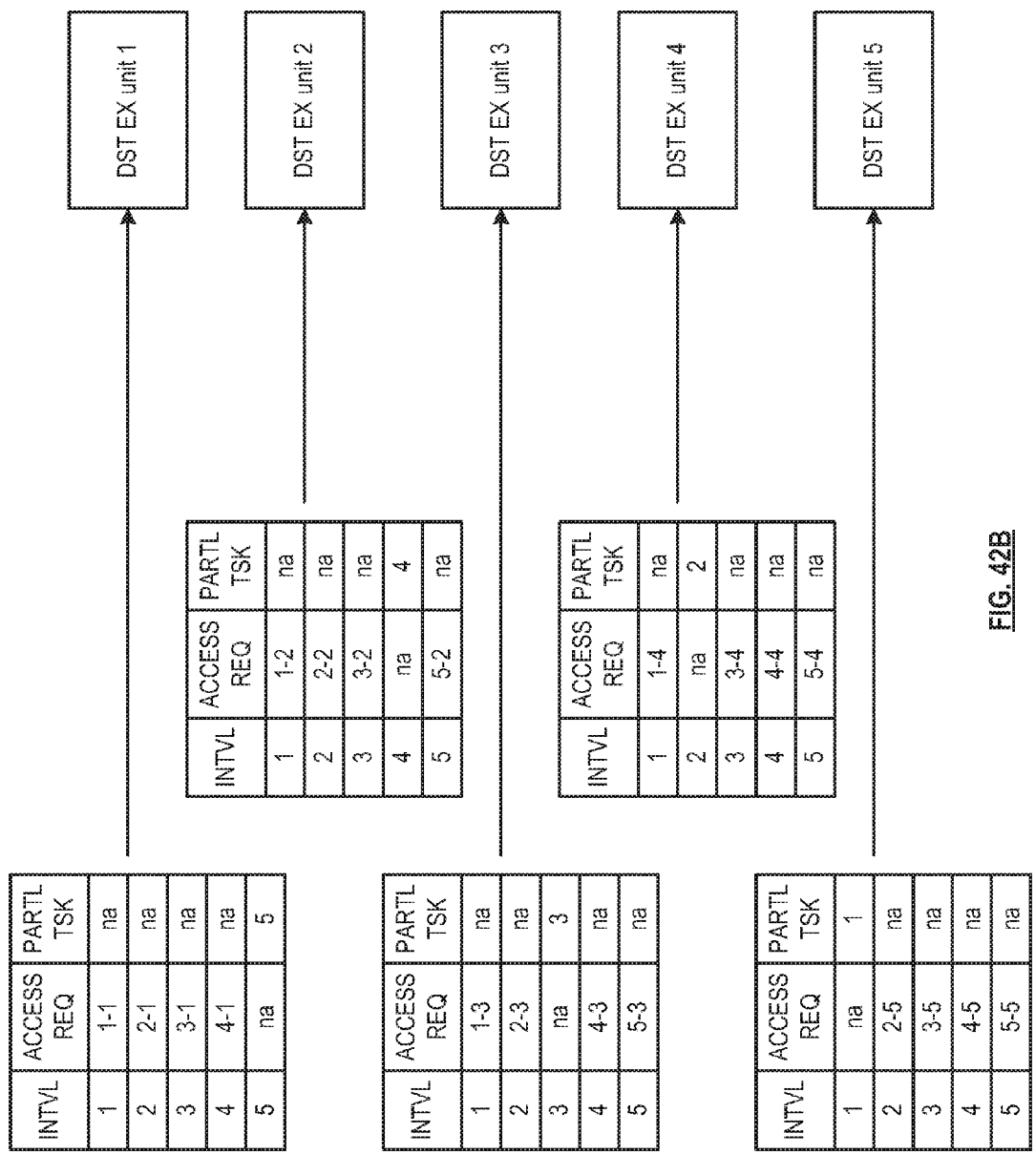
FIG. 42B is a diagram illustrating an example of allocating data access requests and partial tasks to a set of distributed storage and task execution (DSTE) units in accordance with the present invention.

FIG. 42B is a diagram illustrating an example of allocating data access requests and partial tasks to a set of distributed storage and task execution (DSTE) units in accordance with desired utilization of the set of DSTE units to achieve balanced utilization. The data access requests includes at least one of reading, writing, deleting, and listing. The allocating includes allocating one or both of a data access request and a partial task to a common time interval of a series of time intervals. The data access request includes accessing at least one of an encoded data slice for a data segment and a group of encoded data slices for a corresponding group of data segments. For example, a data access request for a first encoded data slice of a first data segment may be allocated to a first time interval and another data access request for a second encoded data slice of a second data segment may be allocated to a second time interval. As another example, a data access request for a group of first encoded data slices of a corresponding group of data segments may be allocated to the first time interval and another data access request for another group of second encoded data slices of the corresponding group of data segments may be allocated to the second time interval.

The allocating of the data access requests and partial tasks illustrates an example of a utilization of a balanced approach for both data access requests and partial tasks. In this example, a repeating pattern of five time intervals is chosen where the number of time intervals for the repeating pattern can be any number and perhaps as a function of the desired utilization of the set of DSTE units. In this example, over time intervals 1-5, each DSTE unit is assigned four data access requests of five data access requests 1-5 for a corresponding four time intervals and an fifth time interval with no data access request assignment. Over the time intervals 1-5, each DSTE unit is assigned one partial task of partial tasks 1-5 for one time interval and no partial tasks for a remaining four other time intervals.

Figure 42C:
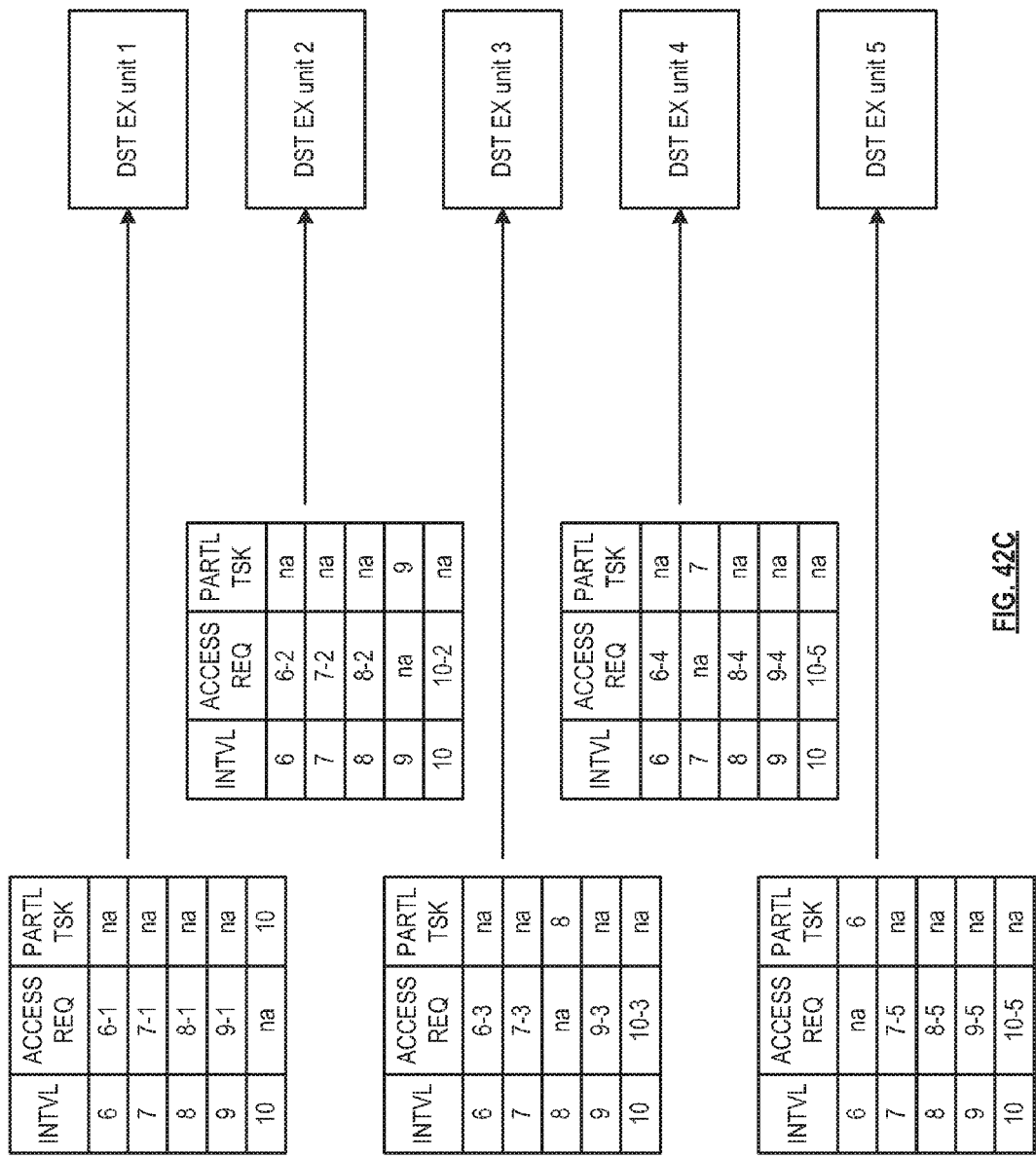
FIG. 42C is a diagram illustrating another example of allocating data access requests and partial tasks to a set of distributed storage and task execution (DSTE) units in accordance with the present invention.

FIG. 42C is a diagram illustrating another example of allocating data access requests and partial tasks to a set of distributed storage and task execution (DSTE) units continuing the example of FIG. 42B in accordance with desired utilization of the set of DSTE units to achieve the balanced utilization. The allocating of the data access requests and partial tasks continues the example of utilization of the balanced approach for both data access requests and partial tasks. When changing from a time interval group (e.g., from the previous five time intervals) to a new time interval group (e.g., this example), the repeating pattern may change (e.g., number of allocated data access requests, number of allocated partial tasks) and/or the number of time intervals per group may be changed (e.g., moving from five time intervals per time interval group to eight time intervals per time interval group).

In the continued example, the repeating pattern of five time intervals is continued to be used. In the continued example, over time intervals 6-10, each DSTE unit is assigned four data access requests of five data access requests 6-10 for a corresponding four time intervals and a fifth time interval with no data access request assignment matching a previous pattern of five time intervals of FIG. 42B. Over the time intervals 6-20, each DSTE unit is assigned one partial task of partial tasks 6-10 for one time interval and no partial tasks for a remaining four other time intervals matching the previous pattern of five time intervals of FIG. 42B.

FIG. 42D is a diagram of a pair of tables illustrating an example of allocating data access requests and partial tasks to a set of distributed storage and task execution (DSTE) units with desired DSTE unit utilization to achieve the balanced utilization. The illustrating of the allocating includes a data access processing table 396 and a partial task processing table 398. The tables correspond to the examples of allocation of data access requests and partial tasks to the set of DSTE units discussed with reference to FIGS. 42B-C. For example, the data access processing table 396 illustrates assignment of data access requests associated with time intervals 1-4 of a first time interval group and another data access request associated with time interval 6 of a second time interval group to a first DSTE unit. As another example, the partial task processing table 398 illustrates assignment of a partial task associated with time interval 1 for the first time interval group and another partial task associated with time interval 6 of the second time interval group to a fifth DSTE unit.

FIG. 42E is a diagram of a pair of tables illustrating another example of allocating data access requests and partial tasks to a set of distributed storage and task execution (DSTE) units with desired DSTE unit utilization to achieve the balanced utilization. The illustrating of the allocating includes a data access processing table 400 and a partial task processing table 402. The example illustrates a first time interval group that includes 15 time intervals and a pattern that is identical for every three time intervals. Each DSTE unit is assigned data access requests associated with four sets of three identical time intervals for a total of 12 time intervals out of the 15 time intervals of the first time interval group. For instance, the data access processing table 400 illustrates that a first DSTE unit is assigned data access requests associated with time intervals 1-12 and not with time intervals 13-15. As another instance, the partial task processing table 402 illustrates that the first DSTE unit is assigned partial tasks associated with time intervals 13-15 and no partial tasks for time intervals 1-12. The cycle may repeat in a second time interval group.

Figure 42F:
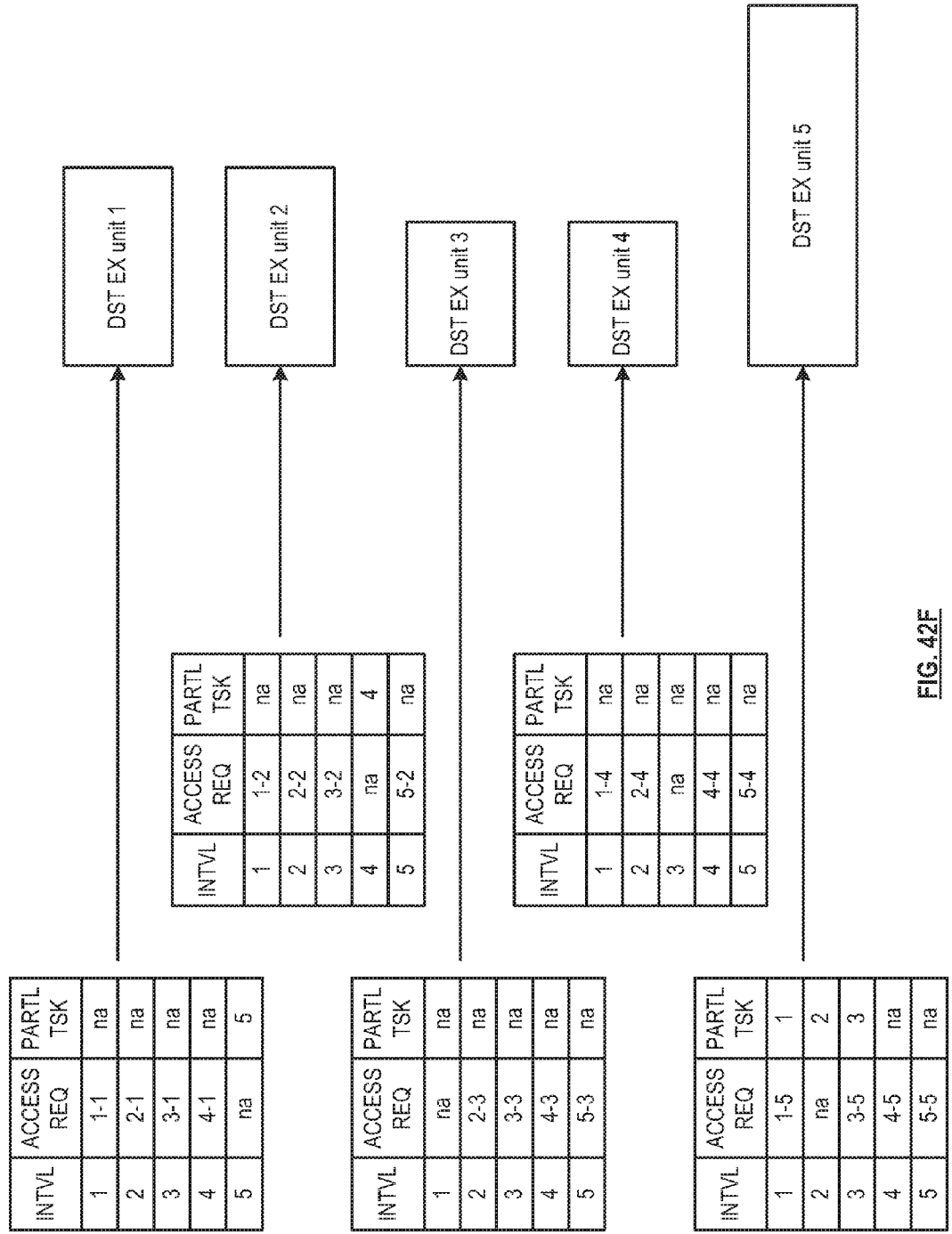
FIG. 42F is a diagram illustrating another example of allocating data access requests and partial tasks to a set of distributed storage and task execution (DSTE) units in accordance with the present invention.
Figure 42G:
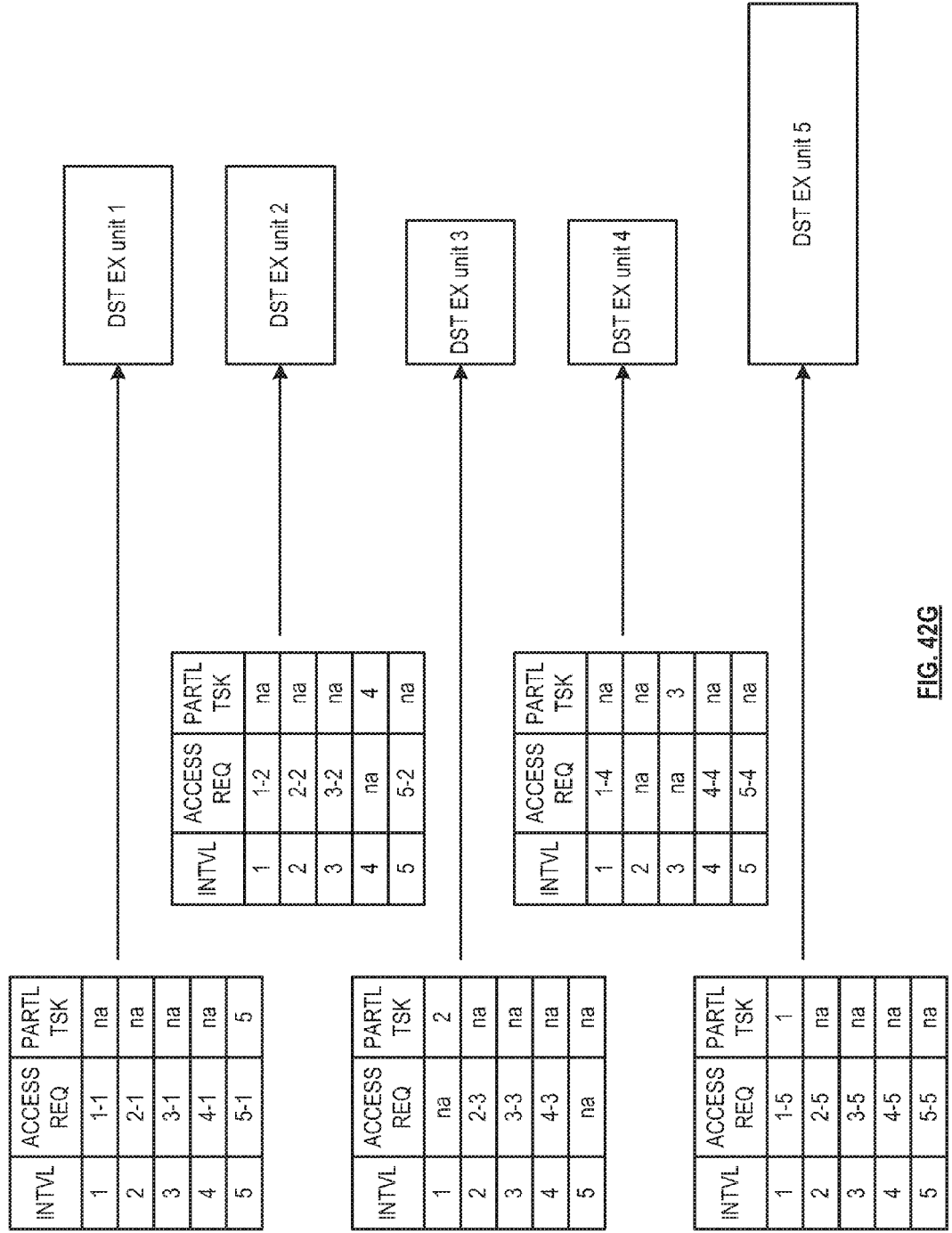
FIG. 42G is a diagram illustrating another example of allocating data access requests and partial tasks to a set of distributed storage and task execution (DSTE) units in accordance with the present invention.
Figure 42H:
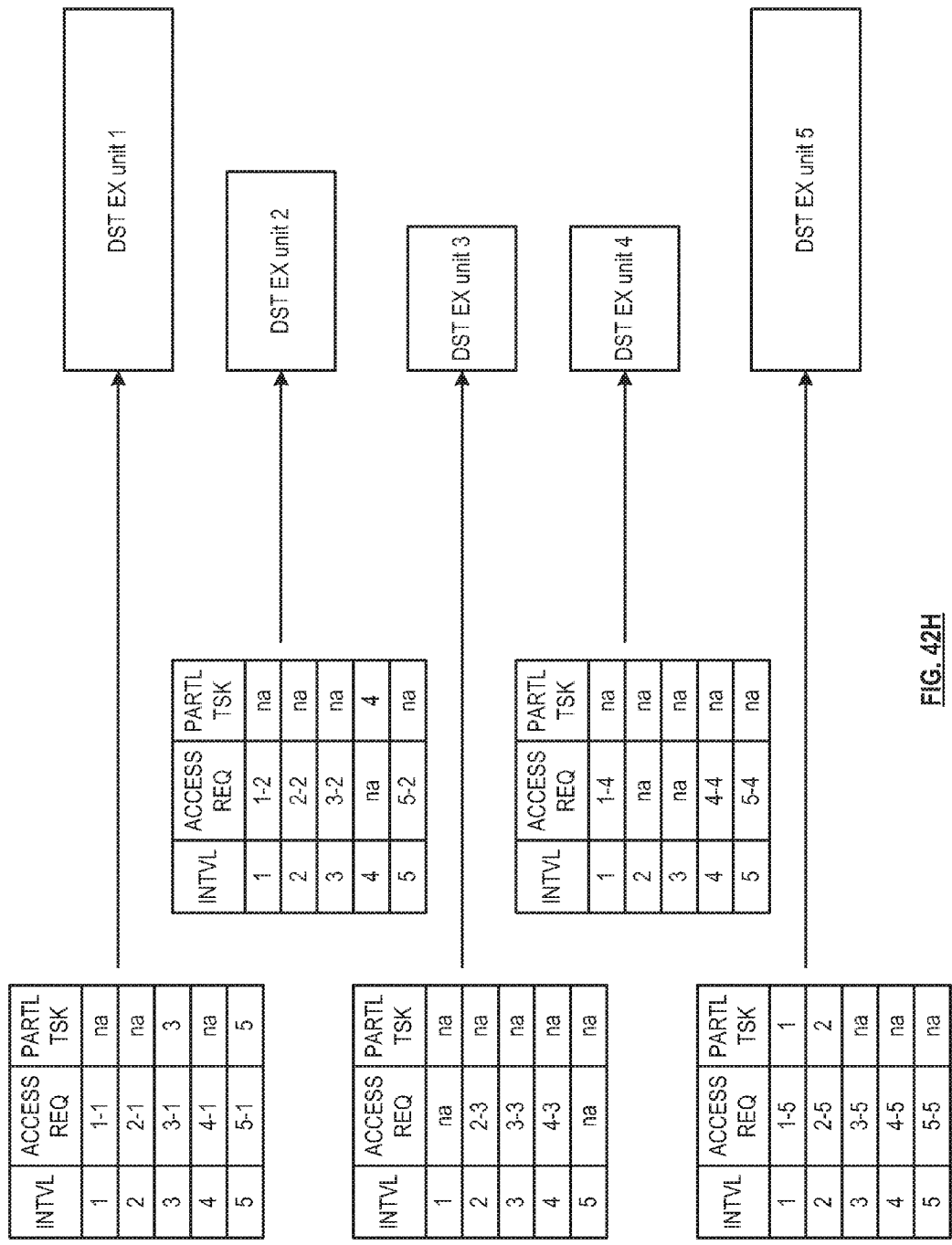
FIG. 42H is a diagram illustrating another example of allocating data access requests and partial tasks to a set of distributed storage and task execution (DSTE) units in accordance with the present invention.

FIGS. 42F-H are diagrams illustrating other examples of allocating data access requests and partial tasks to a set of distributed storage and task execution (DSTE) units to achieve a desired DSTE unit utilization when DSTE resource capabilities are imbalanced. The allocation includes allocating the data access requests and the partial tasks in accordance with the imbalance of resource capabilities. The imbalance of resource capabilities includes at least one of an imbalance of storage capabilities and an imbalance of task processing capabilities. The allocating includes balancing data access requests when storage capabilities are balanced and allocating imbalanced data access requests when the storage capabilities are imbalanced. The allocating further includes balancing partial task requests when partial task processing capabilities are balanced and allocating imbalanced partial task requests when the partial task processing capabilities are imbalanced. FIG. 42F illustrates an example where the data access requests are allocated in a balanced manner and the partial task requests are allocated in the imbalanced manner. FIG. 42G illustrates another example where allocation of the data access requests are allocated in the imbalanced manner and the partial tasks are allocated in the balanced manner. FIG. 42H illustrates yet another example where both the allocation of the data access requests and the partial tasks are allocated in the imbalanced manner.

In particular, FIG. 42F illustrates an example when a fifth DSTE unit has more task executing resource capability than other DSTE units but each DSTE unit has similar data access resource capability. Accordingly, the fifth DSTE unit is allocated partial tasks 1-3 in addition to data access requests 1, 3, 4, and 5 while a third and a fourth DSTE unit with minimal task executing resource capability are not allocated any partial tasks. Each DSTE unit is allocated 4 data access requests within the five time interval time interval group.

FIG. 42G illustrates an example when the first, the second, and the fifth DSTE units have more data access resource capability than other DSTE units but each DSTE unit has similar task executing resource capability. Accordingly, the first and the fifth DSTE units are allocated five data access requests, the second DSTE unit is allocated four data access requests, and the third and fourth DSTE units are only allocated three data access requests. Each DSTE unit is allocated one partial task within the five time interval time interval group.

FIG. 42H illustrates an example when the first and the fifth DSTE units have more data access resource capabilities than other DSTE units. For example, the first and the fifth DSTE units are newer models with expanded memory and expanded task processing power. Accordingly, the first and the fifth DSTE units are allocated five data access requests and two partial tasks during the five time interval time interval group. The second DSTE unit is allocated four data access requests and one partial task. The third and fourth DSTE units are only allocated three data access requests and no partial tasks.

Figure 42I:
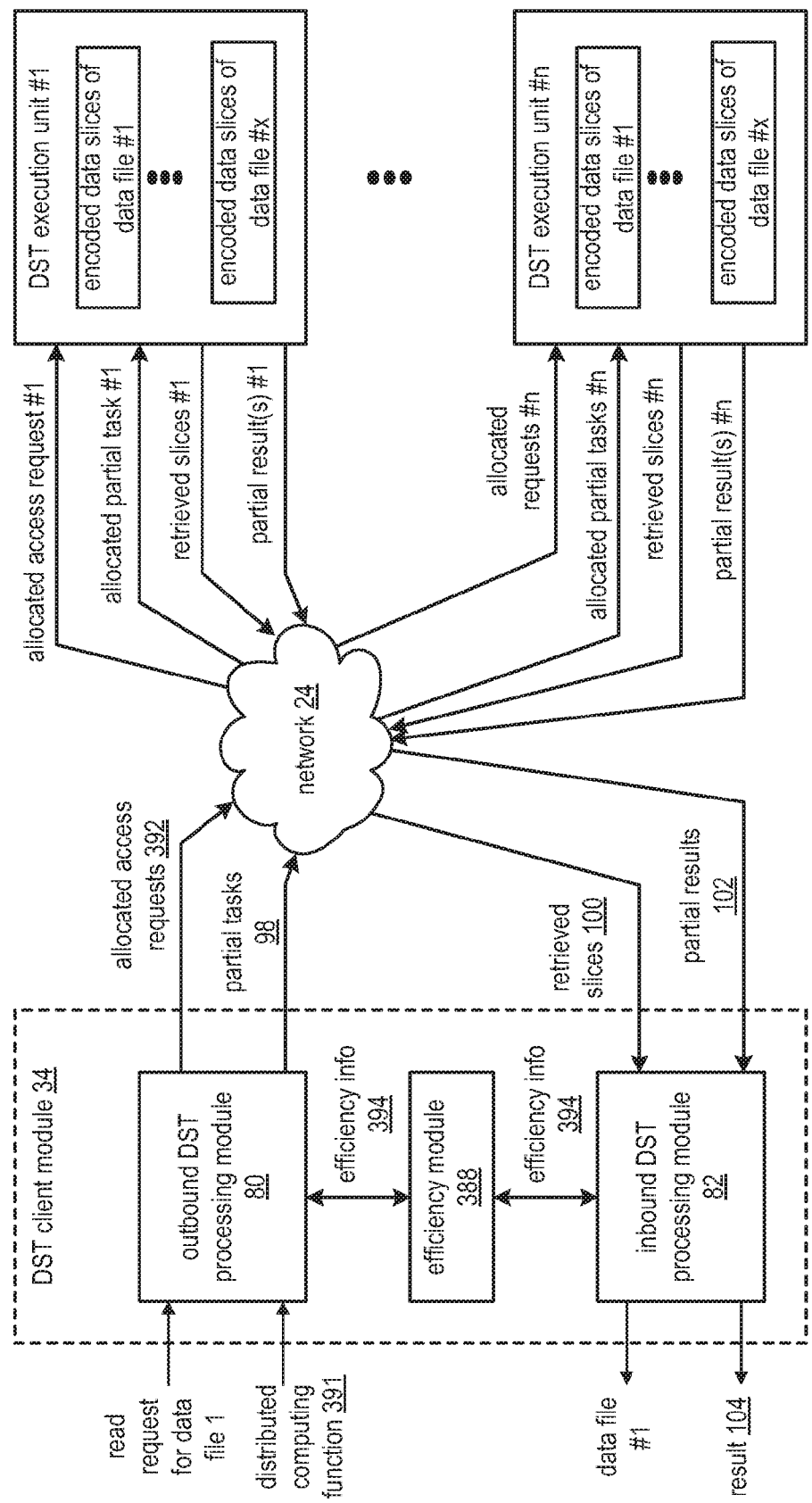
FIG. 42I is a diagram of another example of a distributed storage and task processing in accordance with the present invention.

FIG. 42I is a diagram of another example of a distributed storage and task processing discussed with reference to FIG. 42A where, simultaneously, a data file 1 is read and partial tasks 98 of the distributed computing function 391 are processed. The efficiency module 388 provides the efficiency information 394 that includes the desired utilization of the DSTE units where DSTE units associated with more favorable data access capability are identified for allocation of allocated access requests 392. The outbound DST processing module 80 allocates more read data access requests of the allocated access requests 392 to the identified DSTE units of the set of DSTE units while allocating the partial task 98 to the set of DSTE units in accordance with the desired utilization. The identified DSTE units send retrieved slices 100 to the inbound DST processing module 82. The inbound DST processing module 82 decodes the retrieved slices 100 to reproduce the data file 1. The set of DSTE units sends partial results 102 to the inbound DST processing module 82. The inbound DST processing module 82 aggregates the partial results 102 to produce a result 104.

Figure 42J:
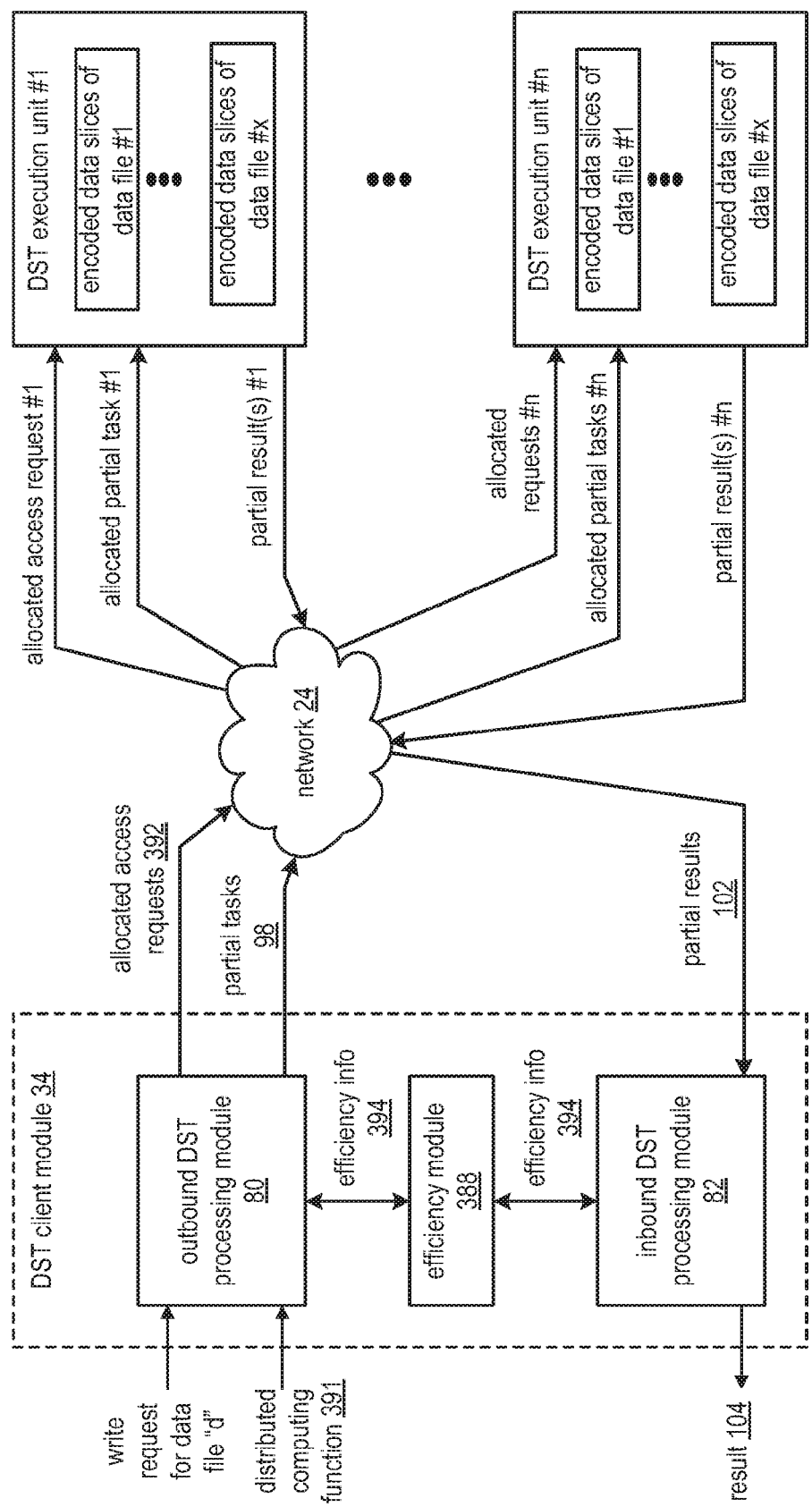
FIG. 42J is a diagram of another example of a distributed storage and task processing in accordance with the present invention.

FIG. 42J is a diagram of another example of a distributed storage and task processing discussed with reference to FIG. 42A where, simultaneously, a data file d is written to the set of DSTE units and partial tasks 98 of the distributed computing function 391 are processed. The efficiency module 388 provides the efficiency information 394 that includes the desired utilization of the DSTE units where DSTE units associated with more favorable data access capability are identified for allocation of allocated access requests 392. The outbound DST processing module 80 allocates more write data access requests of the allocated access requests 392 to the identified DSTE units of the set of DSTE units while allocating the partial task 98 to the set of DSTE units in accordance with the desired utilization. Accordingly, the identified DSTE units store encoded data slices of a plurality of sets of encoded data slices associated with data file d. The set of DSTE units sends partial results 102 to the inbound DST processing module 82. The inbound DST processing module 82 aggregates the partial results 102 to produce a result 104.

Figure 42K:
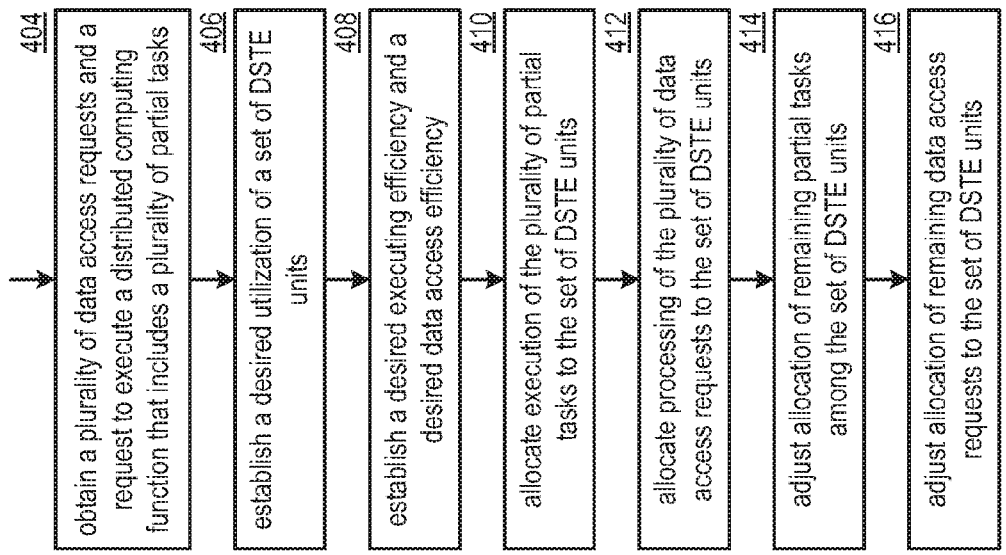
FIG. 42K is a flowchart illustrating an example of load balancing in accordance with the present invention.

FIG. 42K is a flowchart illustrating an example of load balancing. The method begins at step 404 where a processing module (e.g., a distributed storage and task client module) obtains a plurality of data access requests and a request to execute a distributed computing function that includes a plurality of partial tasks. The processing module may obtain the data access requests and the partial tasks overlapping in time, where the data access requests are in regards with storage of a data file and the distributed computing function is with regards to the data file. The method continues at step 406 during the overlapping time, where the processing module establishes a desired utilization of a set of distributed storage and task execution (DSTE) units to substantially balance loading of the DSTE units based on per unit processing resource utilization to processing resource capabilities.

The method continues at step 408 where the processing module establishes a desired executing efficiency and a desired data access efficiency to obtain the desired utilization of the set of DSTE units. For example, the processing module determines a read threshold when the data access requests includes read requests regarding reading the data file from the set of DSTE units as sets of encoded data slices. Having determined the read threshold, the processing module establishes the desired data access efficiency based on the read threshold. As another example, the processing module determines a write threshold when the data access requests includes write requests regarding storing the data file as the sets of encoded data slices in the set of DSTE units. Having determined the write threshold, the processing module establishes the desired data access efficiency based on the write threshold.

The method continues at step 410 where the processing module allocates execution of the partial tasks to the set of DSTE units in accordance with the desired executing efficiency. The desired executing efficiency distributes execution of the plurality of partial tasks among the set of DSTE units such that, from time-to-time, differing DSTE units are not assigned execution of a partial task. The allocating may include equally allocating partial tasks among the DSTE units. For example, the processing module allocates the partial tasks equally among the set of DSTE units utilizing a pattern to provide the equal allocation, where the pattern indicates on a DSTE unit by DSTE unit basis of when and when not a DSTE unit of the set of DSTE units is allocated a partial task. Alternatively, the allocating may include allocation in an imbalanced manner. For example, the processing module allocates, in the imbalanced manner, the partial tasks among the set of DSTE units.

The method continues at step 412 where the processing module allocates processing of the data access requests to the set of DSTE units in accordance with the desired data access efficiency, where the desired data access efficiency distributes processing of the data access requests among the set of DSTE units such that, from time-to-time, differing DSTE units are not processing a data access request. The allocation may be equally amongst the units. For example, the processing module equally allocates the data access requests to the set of DSTE units utilizing a pattern to provide the equal allocation, where the pattern indicates on a DSTE unit by DSTE unit basis of when and when not a DSTE unit is allocated a data access request. Alternatively, the allocating may include allocation in the imbalanced manner. For example, the processing module allocates, in the imbalanced manner, the data access requests to the set of DSTE units.

The method continues at step 414 where the processing module adjusts allocation of further partial tasks among the set of DSTE units. For example, in a next time interval group, the processing module increases or decreases a number of partial tasks allocated to each DSTE unit in accordance with a task execution performance level. The method continues at step 416 where the processing module adjusts allocation of further data access requests to the set of DSTE units. For example, in the next time interval group, the processing module increases or decreases a number of data access requests allocated to each DSTE unit in accordance with a data access execution performance level.

Figure 43A:
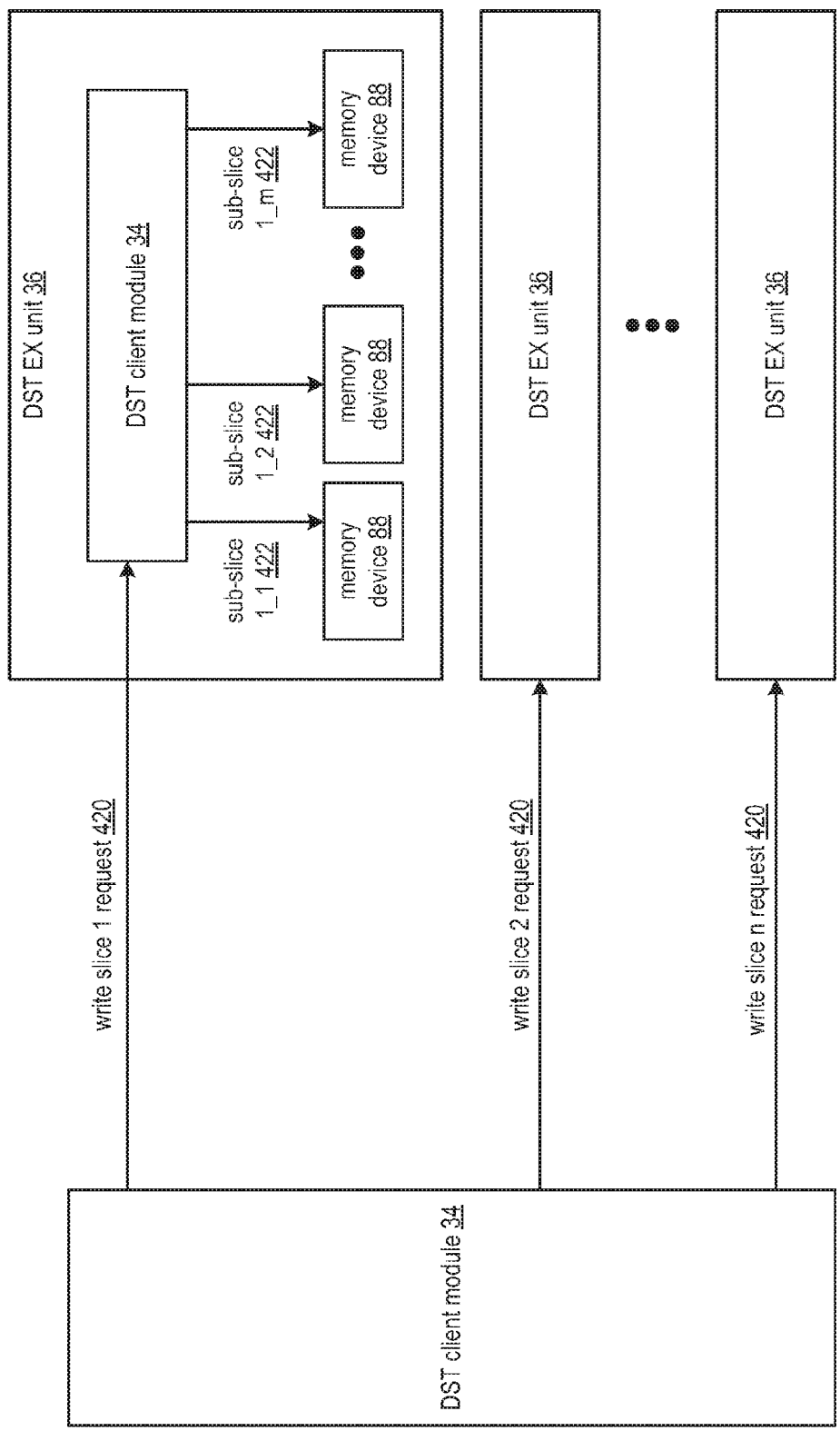
FIG. 43A is a schematic block diagram of another embodiment of a distributed computing system in accordance with the present invention.

FIG. 43A is a schematic block diagram of another embodiment of a distributed computing system that includes the distributed storage and task (DST) client module 34 and a set of DST execution units 36 of FIG. 1. Each DST execution unit 36 includes a DST client module 34 and a plurality of memory devices 88. The system functions to store data as slices 422 in the memory devices 88 of each of the DST execution units 36.

In an example of operation, the DST client module 34 segments the data to produce a plurality of data segments. The DST client module 34 encodes each data segment using a dispersed storage error coding function in accordance with dispersal parameters to produce a set of encoded data slices. The DST client module 34 determines the dispersal parameters based on one or more of a number of DST execution units 36 of the set of DST execution units, a sub-slicing capability of the set of DST execution units 36, and a reliability level of the set of DST execution units 36. For example, the DST client module 34 determines a pillar width number (e.g., number of DST execution units of the set of DST execution units) to be seven when seven DST execution units 36 of the set of DST execution units 36 indicates a favorable sub-slicing capability level.

The DST client module 34 generates a set of write slice requests 1-n 420 that includes the set of encoded data slices. The DST client module 34 outputs the set of write slice requests 1-n 420 to the set of DST execution units 36. For each DST execution unit 36, a corresponding DST client module 34 determines second dispersal parameters based on one or more of a number of memory devices 88, a reliability level of the memory devices 88, an available capacity level of the memory devices 88, and a memory device 88 loading level. For example, the DST client module 34 of the DST execution of 36 determines a pillar width of the second dispersal parameters to be six when six memory devices 88 are associated with a favorable reliability level (e.g., above a minimum reliability threshold level).

The DST client module 34 of the DST execution unit 36 encodes an encoded data slice of a corresponding write slice request 420 using the dispersed storage error coding function in accordance with the second dispersal parameters to produce a set of encoded data sub-slices. The DST client module 34 of the DST execution unit 36 stores the set of encoded data sub-slices in corresponding memory devices 88 of the DST execution unit 36. The method to store the data is discussed in greater detail with reference to FIG. 43B.

Figure 43B:
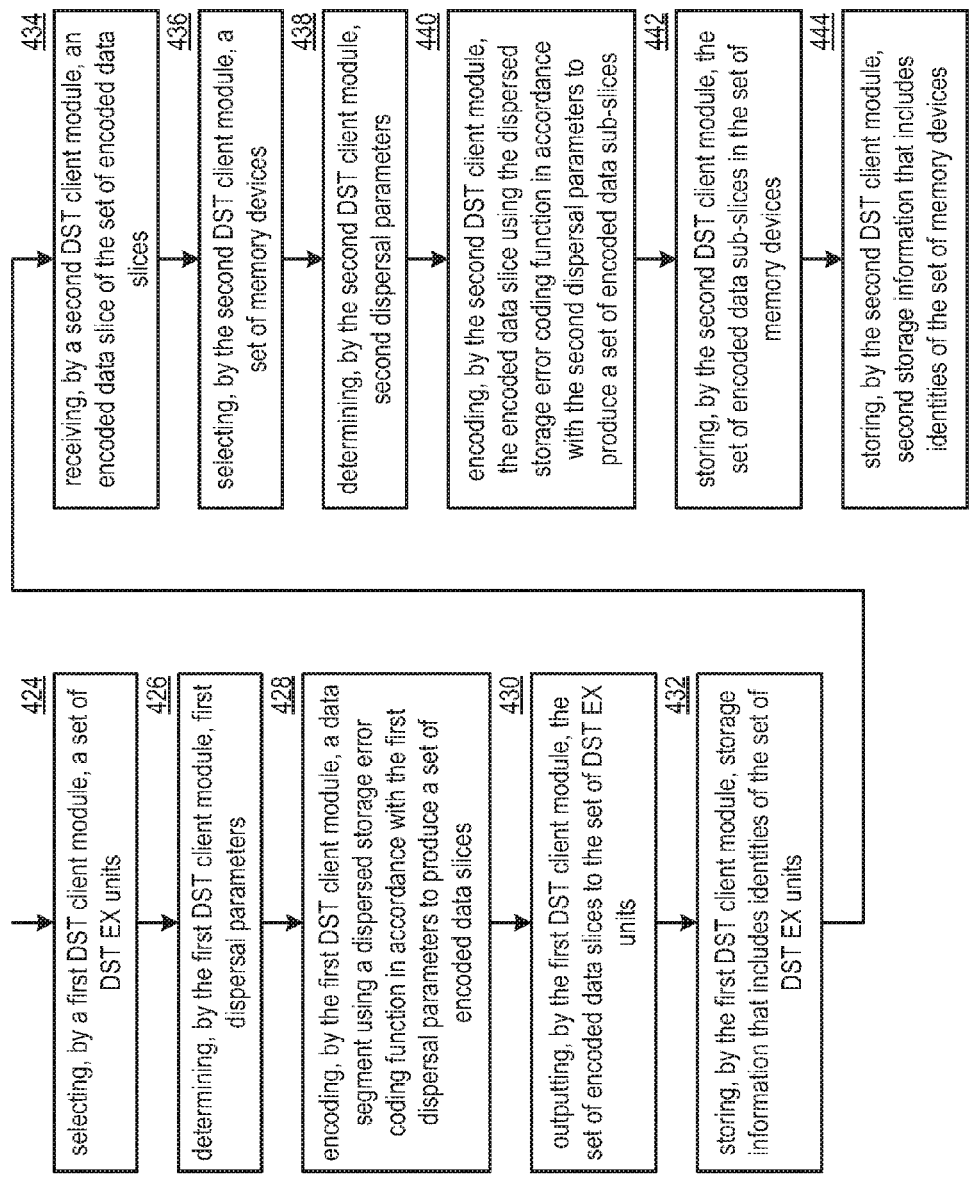
FIG. 43B is a flowchart illustrating an example of storing data in accordance with the present invention.

FIG. 43B is a flowchart illustrating an example of storing data. The method begins at step 424 where a first distributed storage and task (DST) client module selects a set of DST execution units. The selecting may be based on one or more of a lookup, receiving identities of the set of DST execution units, and sub-slicing capabilities of the set of DST execution units. The method continues at step 426 where the first DST client module determines first dispersal parameters. The determining may be based on one or more of a number of DST execution units of the set of DST execution units, sub-slicing capability of the set of DST execution units, and a reliability level of the set of DST execution units.

The method continues at step 428 where the first DST client module encodes a data segment using a dispersed storage error coding function in accordance with the first dispersal parameters to produce a set of encoded data slices. The method continues at step 430 where the first DST client module outputs the set of encoded data slices to the set of DST execution units. The method continues at step 432 where the first DST client module stores storage information with regards to the set of DST execution units. The storage information includes one or more of identities of the set of DST execution units, slice names corresponding to the set of encoded data slices, the first dispersal parameters, and a vault identifier (ID) associated with the data segment. The storing includes storing the storage information in at least one of a local memory and the set of DST execution units.

The method continues at step 434 where a second DST client module receives an encoded data slice of the set of encoded data slices. The method continues at step 436 where the second DST client module selects a set of memory devices. The selecting may be based on one or more of a lookup, receiving memory device identifiers, a memory device reliability level, a memory device available storage capacity level, and a memory device available input/output capacity level. The method continues at step 438 where the second DST client module determines second dispersal parameters. The determining may be based on one or more of a number of memory devices of the set of memory devices, the memory device reliability level, the memory device available storage capacity level, the memory device available input/output capacity level, and the first dispersal parameters. For example, the second DST client module selects a pillar width to be substantially the same as the number of memory devices of the set of memory devices.

The method continues at step 440 where the second DST client module encodes the encoded data slice using the dispersed storage error coding function in accordance with the second dispersal parameters to produce a set of encoded data sub-slices. The method continues at step 442 where the second DST client module stores the set of encoded data sub-slices in the selected set of memory devices. The method continues at step 444 where the second DST client module stores second storage information with regards to the selected set of memory devices. The storing includes generating the second storage information to include one or more of identities of the set of the selected memory devices, the slice name, the second dispersal parameters, the vault ID, and sub-slice names corresponding to the set of encoded data sub-slices. The storing further includes storing the second storage information in at least one of a local memory, at least one of the memory devices of the set of memory devices, and the set of DST execution units.

Figure 44A:
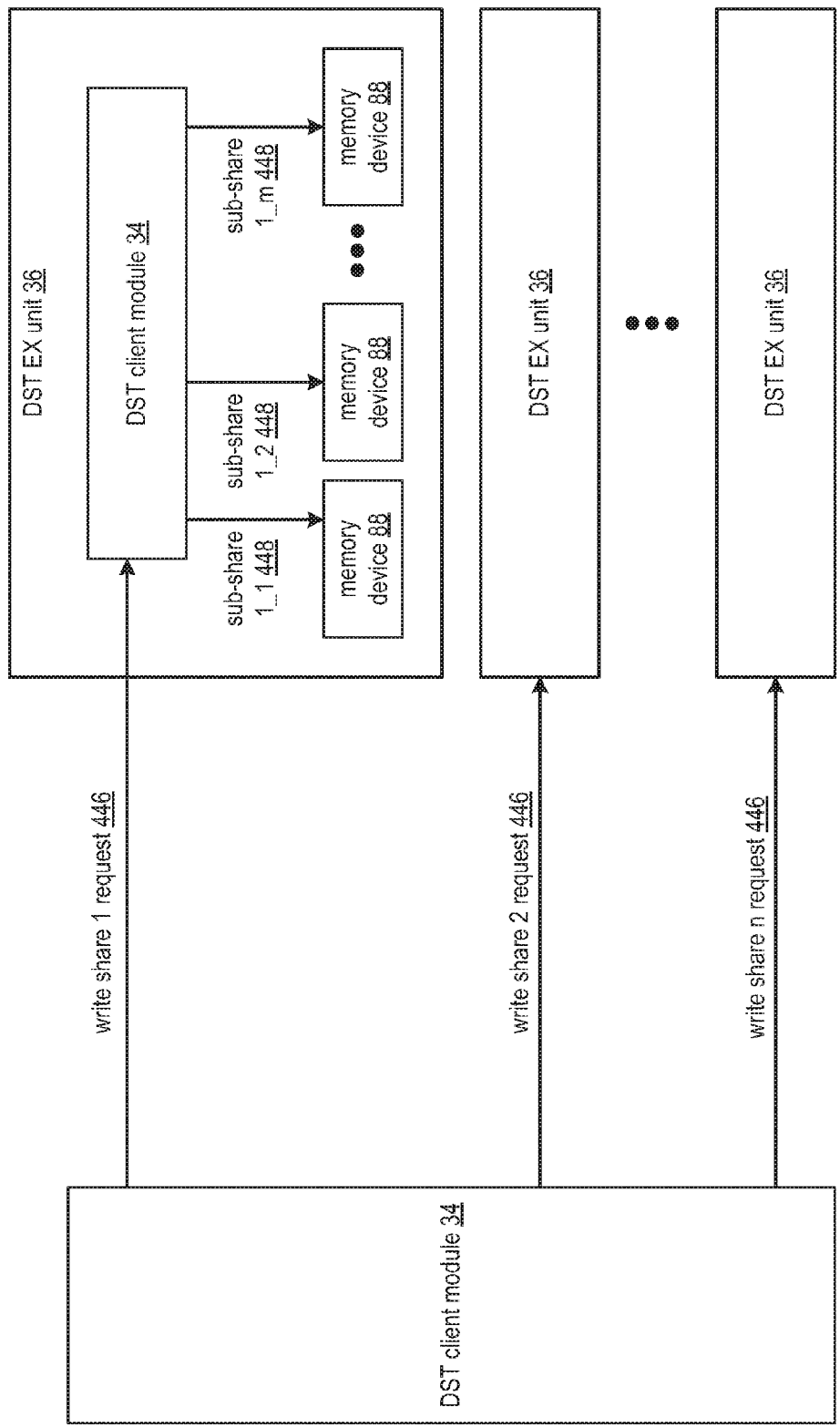
FIG. 44A is a schematic block diagram of another embodiment of a distributed computing system in accordance with the present invention.

FIG. 44A is a schematic block diagram of another embodiment of a distributed computing system that includes the distributed storage and task (DST) client module 34 and the set of DST execution units 36 of FIG. 43A. The system functions to store data as shares in memory devices 88 of the set of DST execution units 36. In an example of operation, the DST client module 34 segments the data to produce a plurality of data segments. For each data segment, the DST client module 34 encodes the data segment using a threshold based secret sharing function in accordance with secret sharing parameters to produce a set of shares. The DST client module 34 determines the secret sharing parameters based on one or more of a number of DST execution units 36 of the set of DST execution units, a sub-sharing capability of the set of DST execution units 36, and a reliability level of the set of DST execution units 36. For example, the DST client module 34 determines a pillar width number (e.g., number of DST execution units of the set of DST execution units) to be 5 when 5 DST execution units 36 of the set of DST execution units 36 indicates a favorable sub-sharing capability level.

The DST client module 34 generates a set of write share requests 1-$n$ 446 that includes the set of shares. The DST client module 34 outputs the set of write share requests 1-$n$ 446 to the set of DST execution units 36. For each DST execution unit 36, a corresponding DST client module 34 of the DST execution unit 36 determines second secret sharing parameters based on one or more of a number of memory devices, a reliability level of the memory devices, an available capacity level of the memory devices, and a memory device loading level. For example, the corresponding DST client module 34 of the DST execution unit 36 determines secret share threshold number of the second secret sharing parameters to be 3 when 3 memory devices are associated with a favorable reliability level.

The DST client module 34 of the DST execution unit 36 encodes a share of a corresponding write share request 446 using the threshold based secret sharing function in accordance with the second secret sharing parameters to produce a set of sub-shares 448. The DST client module 34 of the DST execution unit 36 stores the set of sub-shares 448 in corresponding memory devices 88 of the DST execution unit 36. The method to store the data is discussed in greater detail with reference to FIG. 44B.

Figure 44B:
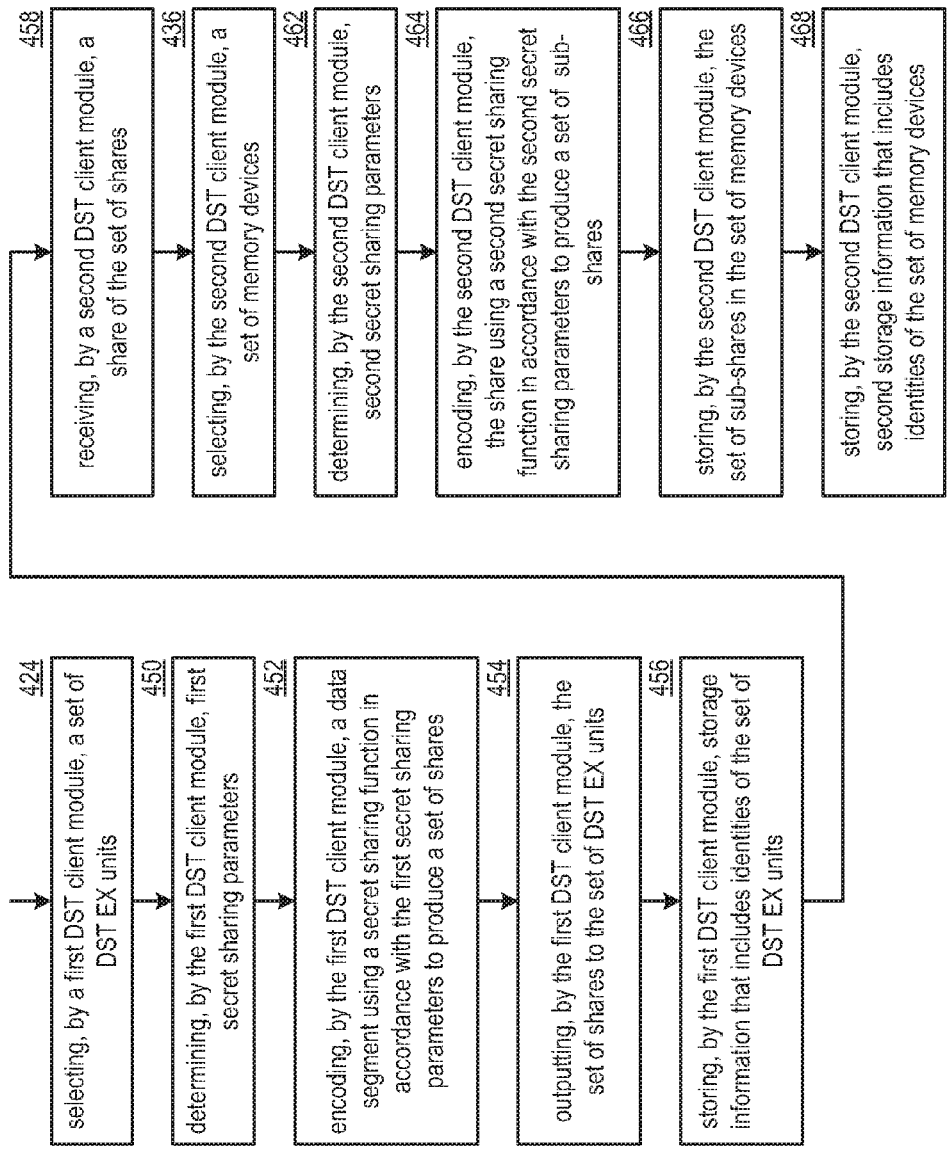
FIG. 44B is a flowchart illustrating another example of storing data in accordance with the present invention.

FIG. 44B is a flowchart illustrating another example of storing data, that includes similar steps to FIG. 43B. The method begins with step 424 of FIG. 43B where a first distributed storage and task (DST) client module selects a set of DST execution units. The method continues at step 450 where the first DST client module determines first secret sharing parameters. The determining may be based on one or more of a number of DST execution units of the set of DST execution units, sub-sharing capability of the set of DST execution units, and a reliability level of the set of DST execution units.

The method continues at step 452 where the first DST client module encodes a data segment using a threshold based secret sharing function in accordance with the first secret sharing parameters to produce a set of shares. The method continues at step 454 where the first DST client module outputs the set of shares to the set of DST execution units. The method continues at step 456 where the first DST client module stores storage information with regards to the set of DST execution units. The storage information includes one or more of identities of the set of DST execution units, share names corresponding to the set of encoded data slices, the first secret sharing parameters, and a vault identifier (ID) associated with the data segment. The storing includes storing the storage information in at least one of a local memory and the set of DST execution units.

The method continues at step 458 where a second DST client module receives a share of the set of shares. The method continues with step 436 of FIG. 43B where the second DST client module selects a set of memory devices. The method continues at step 462 where the second DST client module determines second secret sharing parameters. The determining may be based on one or more of a number of memory devices of the set of memory devices, the memory device reliability level, the memory device available storage capacity level, the memory device available input/output capacity level, and the first dispersal parameters. For example, the second DST client module selects a threshold number to be substantially the same as the number of memory devices of the set of memory devices.

The method continues at step 464 where the second DST client module encodes the share using the threshold based secret sharing function in accordance with the second secret sharing parameters to produce a set of sub-shares. The method continues at step 466 where the second DST client module stores the set of sub-shares in the selected set of memory devices. The method continues at step 468 where the second DST client module stores second storage information with regards to the selected set of memory devices. The storing includes generating the second storage information to include one or more of identities of the set of the selected memory devices, a share name, the second secret sharing parameters, a vault ID, and sub-share names corresponding to the set of sub-shares. The storing further includes storing the second storage information in at least one of a local memory, at least one of the memory devices of the set of memory devices, and the set of DST execution units.

Figure 45A:
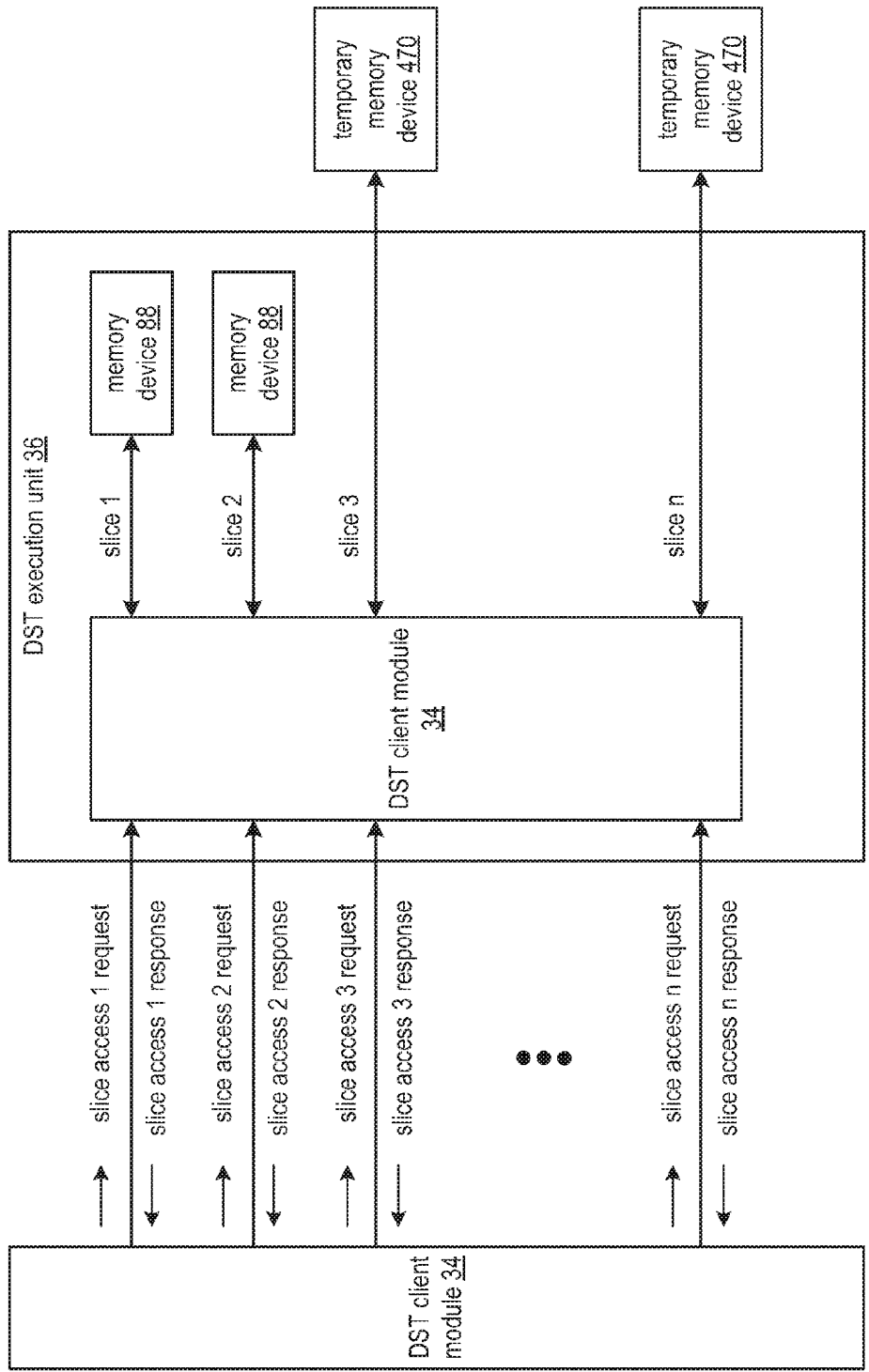
FIG. 45A is a schematic block diagram of another embodiment of a distributed computing system in accordance with the present invention.

FIG. 45A is a schematic block diagram of another embodiment of a distributed computing system that includes a distributed storage and task client (DST) module 34, a DST execution unit 36, and one or more temporary memory devices 470. The temporary memory devices 470 may be implemented as one or more of a flash drive, an external magnetic disk drive, and an external optical disk drive. The DST execution unit 36 includes a DST client module 34 and one or more memory devices 88. Alternatively, the DST execution unit 36 may be implemented by at least one of a DST processing unit, a server, and a user device. The system functions to access a set of encoded data slices 1-$n$ stored in a set of storage devices to emulate access of a set of DST execution units 36. The storage devices include at least one of the one or more memory devices 88 and may include at least one of the one or more temporary memory devices 470. Data is segmented to produce a plurality of data segments.

In an example of operation, the DST client module 34 encodes each data segment using a dispersed storage error coding function in accordance with dispersal parameters to produce a corresponding set of encoded data slices of a plurality of encoded data slices. The plurality of encoded data slices includes the set of encoded data slices. Next, the DST client module 34 generates a set of slice access requests 1-$n$ to access the set of encoded data slices. The set of slice access requests 1-$n$ includes a set of slice names corresponding to the set of encoded data slices. The set of slice access requests 1-$n$ includes at least one of a set of read requests and a set of write slice requests. The set of slice access requests 1-$n$ includes the set of encoded data slices when the set of slice access requests 1-$n$ includes the set of write slice requests. The DST client module 34 outputs the set of slice access requests 1-$n$ to the DST execution unit 36.

The DST client module 34 of the DST execution unit 36 receives the set of slice access requests 1-n and identifies the set of storage devices based on at least one of the set of slice names, a storage device current level of availability indicator, an estimated storage device future level of availability indicator, a storage device performance level indicator, and an estimated access frequency level of the set of encoded data slices. For example, the DST client module 34 of the DST execution unit 36 selects the set of storage devices to include three temporary memory devices 470 and five memory devices 88 when a pillar width number of the dispersal parameters is 8, a decode threshold number of the dispersal parameters is 5, and estimated storage device future level of availability indicators of the three temporary memory devices 470 is favorable (e.g., likely to be available when subsequent retrieval of the set of encoded data slices is required) when the set of slice access requests 1-n includes the set of write slice requests.

The DST client module 34 of the DST execution unit 36 accesses the identified set of storage devices to facilitate the set of slice access requests 1-n. For example, the DST client module 34 of the DST execution unit 36 stores the set of encoded data slices in the identified set of storage devices when the set of slice access requests 1-n includes the set of write slice requests. As another example, the DST client module 34 of the DST execution unit 36 retrieves the set of encoded data slices from the identified set of storage devices when the set of slice access requests 1-n includes the set of read slice requests. The DST client module 34 of the DST execution unit 36 generates a set of slice access responses 1-n to indicate at least one of status (e.g., success, failure, error code) and a result (e.g., a retrieved encoded data slice) of execution of a corresponding slice access request. Methods to access the identified set of storage devices to facilitate access of the set of encoded data slices are discussed in greater detail with reference to FIGS. 45B-D.

FIG. 45B is a flowchart illustrating another example of storing data. The method begins at step 472 where a processing module (e.g., of a distributed storage and task (DST) client module of a DST execution unit) receives a set of write slice requests that includes a set of encoded data slices for intended storage in a set of DST execution units. The method continues at step 474 where the processing module selects a set of storage devices. The set of storage devices may include one or more memory devices and temporary memory devices. The method continues at step 476 where the processing module stores the set of encoded data slices in the set of identified storage devices. The method continues at step 478 where the processing module generates a set of write slice responses. For example, the processing module generates the set of write slice responses to indicate whether a corresponding encoded data slice was successfully stored. The method continues at step 480 where the processing module outputs the set of write slice responses to a requesting entity in accordance with a DST execution unit emulation approach. The DST execution unit emulation approach includes at least one of generating a write slice response to include one or more of a write sequence status, a write sequence result, and an emulated DST execution unit identifier.

FIG. 45C is a flowchart illustrating another example of retrieving data. The method begins at step 482 where a processing module (e.g., of a distributed storage and task (DST) client module of a DST execution unit) receives at least one read slice request of a set of read slice requests to retrieve a set of encoded data slices from a set of DST execution units. The method continues at step 484 where the processing module identifies a set of storage devices of a plurality of storage devices associated with storage of the set of encoded data slices. The identifying includes at least one of performing a lookup, initiating a query of one or more memory devices, initiating a query of one or more temporary memory devices, and receiving a query response. The method continues at step 486 where the processing module retrieves the set of encoded data slices from the set of identified storage devices. The method continues at step 488 where the processing module generates a set of read slice responses that includes the set of encoded data slices. The method continues at step 490 where the processing module outputs the set of read slice responses to a requesting entity in accordance with a DST execution unit emulation approach.

Figure 45D:
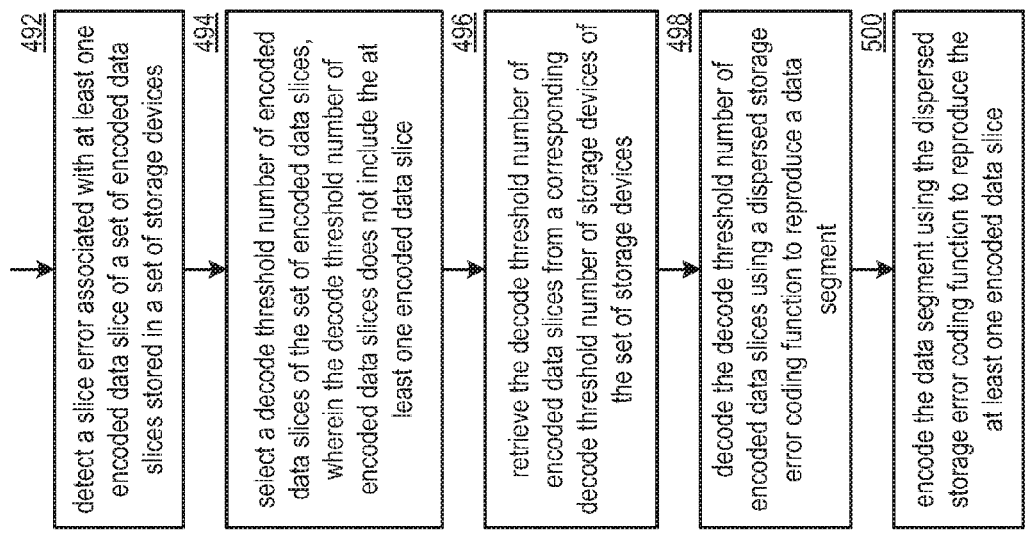
FIG. 45D is a flowchart illustrating another example of rebuilding data in accordance with the present invention.

FIG. 45D is a flowchart illustrating another example of rebuilding data. The method begins at step 492 where a processing module (e.g., of a distributed storage and task (DST) client module of a DST execution unit) detects a slice error associated with at least one encoded data slice of a set of encoded data slices stored in a set of storage devices associated with DST execution unit emulation. The detecting includes at least one of identifying a storage device failure associated with the at least one encoded data slice, detecting that a storage device is unavailable (e.g., a temporary memory device is unplugged from the computing device), detecting slice corruption, and detecting a missing slice.

The method continues at step 494 where the processing module selects a decode threshold number of encoded data slices of the set of encoded data slices. The decode threshold number of encoded data slices does not include the at least one encoded data slice. The selecting includes identifying available encoded data slices stored in available storage devices. The method continues at step 496 where the processing module retrieves the decode threshold number of encoded data slices from a corresponding decode threshold number of storage devices of the set of storage devices. The method continues at step 498 where the processing module decodes the decode threshold number of encoded data slices using a dispersed storage error coding function to reproduce a data segment. The method continues at step 500 where the processing module encodes the data segment using the dispersed storage error coding function to reproduce the at least one encoded data slice. Next, the processing module may store the reproduced at least one encoded data slice in at least one storage device of the set of storage devices.

FIG. 46A is a schematic block diagram of an embodiment of a data communication system that includes a transmitting device 502 and a receiving device 504. The transmitting device 502 may be a user device 12 of FIG. 1 and the receiving device 504 may be another user device 12 of FIG. 1. The transmitting device 502 includes a data slice error control (EC), (e.g., or error coded) protocol layer transmit side module 506, a physical layer module 508, and a processing module 510. The receiving device 504 includes a data slice EC protocol layer receive side module 512, another physical layer module 508, and a processing module 514.

The data communication system functions to robustly communicate data from the transmitting device 502 to the receiving device 504. In an example of operation, the data slice EC protocol layer transmit side module 506 divides the data into data partitions, where the data partitions include data segments. The data slice EC protocol layer transmit side module 506 forms a collection of data segments and concurrently encodes the collection of data segments in accordance with a dispersed storage error encoding function to produce sets of encoded data slices. Each set of encoded data slices includes a total number of encoded data slices (e.g., a pillar width) and corresponds to a data segment. The receiving device 504 requires a decode threshold number of encoded data slices of the set of encoded data slices to recover the data segment. The data slice EC protocol layer transmit side module 506 generates sets of slices names for the sets of encoded data slices, where a slice name of the sets of slice names uniquely identifies an encoded data slice to a particular data segment of the collection of data segments.

With the sets of encoded data slices encoded, the processing module 510 determines a transmit number to be initially greater than the decode threshold number and less than the total number (e.g., based on a previous transmit number selection, a communication path performance indicator, a predetermination). The data slice EC protocol layer transmit side module 506 selects a transmit number of encoded data slices from each set of encoded data slices to produce sets of transmit encoded data slices. Having produced the sets of transmit encoded data slices, the data slice EC protocol layer transmit side module 506 randomizes ordering of the sets of transmit encoded data slices to produce a random order of encoded data slices 516.

The data slice EC protocol layer transmit side module 506 transmits encoded data slices of the random order of encoded data slices 516. The transmitting includes outputting the encoded data slices 516 and slice names and may further include at least one of the data slice EC protocol layer transmit side 506 and the processing module 510 outputting coordination information regarding the dispersed storage (DS) error encoding function and an indication of the transmit number to the physical layer module 508 of the transmitting device 502. The physical layer module 508 of the transmitting device 502 encodes the encoded data slices 516 (e.g., and the slice names, the DS error encoding function coordination information, the transmit number) using a physical layer protocol to produce channel symbols as a robust transmission of data 518 for transmission via one or more communication paths to the receiving device 504. The physical layer protocol may include an industry standard or proprietary approach to encode data for transmission over a communication path (e.g., wireless, wireline) that is subject to impairments (e.g., channel fading, dropouts, interference, symbol mixing, etc.). The physical layer protocol may include a broadcast transmission (e.g., a simultaneous transmission to multiple recipients) and/or a unicast transmission (e.g., to one recipient).

An encoded data slice error rate corresponds to a number of data segments per data partition (e.g., D) and the transmit number (e.g., k<t<n; where n=total number, k=decode threshold number) minus the decode threshold in accordance with an expression: maximum number of contiguous slices that may be dropped=D*(t−k). For example, eight contiguous encoded data slices 516 may be dropped from the robust transmission of data 518 without affecting the transmission of the data when a number of data partitions is 4, the transmission number is 5 and the decode threshold is 3.

With the robust transmission of data 518 transmitted from the transmitting device 502 to the receiving device 504, the physical layer module 508 of the receiving device 504 decodes the channel symbols to produce received encoded data slices 520 of the random order of encoded data slices (e.g., including slice names, the transmit number, the DS error encoding function coordination information). The physical layer module 508 of the receiving device 504 utilizes the physical layer protocol to decode the channel symbols to reproduce the encoded data slices 520. From time to time, channel impairments may overwhelm a capability level of the physical layer protocol to correct errors. When overwhelmed, the reproduced encoded data slices 520 may not include each of the encoded data slices 516 that were transmitted from the transmitting device 502.

The data slice EC protocol layer receive side module 512 receives the encoded data slices 520 and interprets the corresponding slice names to de-randomize the random order of encoded data slices into sets of transmit encoded data slices. As a specific example, the data slice EC protocol layer receive side module 512 interprets, for an encoded data slice of the received encoded data slices 520, a corresponding slice name to identify a segment identifier that ties the encoded data slice to one of the collection of data segments, a data object identifier that ties the encoded data slice to the data, and a slice identifier that uniquely identifies the encoded data slice in the set of encoded data slices.

With the received encoded data slices 520 de-randomized, the data slice EC protocol layer receive side module 512, on a set by set basis and using the dispersed storage error encoding function, determines whether the decode threshold number of encoded data slices of a set of transmit encoded data slices have been received (e.g., decodable if so). When the decode threshold number of encoded data slices have not yet been received, the data slice EC protocol layer receive side module 512 determines whether a sufficient number of encoded data slices of the set of transmit encoded data slices are still to be received. As a specific example, the data slice EC protocol layer receive side module 512 identifies encoded data slices of the set of transmit encoded data slices that have been successfully received, determines how many more encoded data slices are to be received based on the transmit number and a current order position in the serially receiving the random order of encoded data slices, and when a sum of the number of encoded data slices that have been successfully received and a number of the more encoded data slices to be received is equal to or greater than the decode threshold number, the data slice EC protocol layer receive side module 512 indicates that the sufficient number of encoded data slices are still to be received.

Having determined whether the sufficient number of encoded data slices are still to be received, the data slice EC protocol layer receive side module 512 waits until the decode threshold number of encoded data slices are received when the sufficient number of encoded data slices are still to be received. Alternatively, when the data slice EC protocol layer receive side module 512 indicates that less than the sufficient number of encoded data slices are still to be received, the processing module 514 sends a feedback message 522 that requests one or more encoded data slices of the set of encoded data slices to be transmitted (e.g., re-send missed encoded data slices, send other encoded data slices). The feedback message 522 may include a request for one or more encoded data slices of the set of encoded data slices and slice names of encoded data slices that have been successfully received. The physical layer module 508 of the receiving device 504 encodes the feedback 522 using the physical layer protocol to output a transmission of feedback 524 to the transmitting device 502.

The physical layer module 508 of the transmitting device 502 receives the transmission of feedback 524 from the receiving device 504 (e.g., a recipient of the transmit encoded data slices 516) and applies the physical layer protocol on the transmission of feedback 524 to recapture the feedback. The processing module 510 interprets the feedback 522 to determine, for a data segment, that at least one more encoded data slice of the set of encoded data slices of the data segment is to be transmitted to the receiving device 504 such that the receiving device 504 has the decode threshold number of encoded data slices to recover the data segment. The processing module 510 identifies one or more encoded data slices from a remaining subset of encoded data slices corresponding to the encoded data slices between the transmit number and the total number (e.g., slice is not sent yet, alternatively resend a slice that was missed). The processing module 510 interrupts the transmitting of the encoded data slices of the random order of encoded data slices 516 to send the one more encoded data slices to the receiving device 504 (e.g., inserting and/or appending).

The receiving device 504 may miss an unacceptable number of received encoded data slices 520 with regards to parameters affecting the encoded data slice error rate. The processing module 510 interprets the feedback 522 to determine whether an adjustment should be made regarding the robust transmission of data 518. For example, the processing module 510 determines that the adjustment should be made when a planned transmit number of encoded data slices for the set of encoded data slices is not enough due to missed received encoded data slices 520. For instance, the processing module 510 determines that the adjustment should be made when receiving feedback at a rate higher than a high feedback generation rate threshold. When the adjustment should be made, the processing module 510 determines at least one of increasing or decreasing the number of data segments per data partition, and increasing or decreasing the transmit number. For instance, the processing module 510 determines to increase the number of data segments per data partition when the encoded data slice error rate is higher than a maximum error rate threshold as indicated by identified missing encoded data slices. In another instance, the processing module 510 determines to decrease the transmit number when the encoded data slice error rate is less than a minimum error rate threshold.

When the decode threshold number of encoded data slices are received, the data slice EC protocol layer receive side module 512 decodes the threshold number of encoded data slices to recapture a corresponding data segment of the collection of data segments and may send a feedback message 522 requesting that one or more encoded data slices not be sent (e.g., since the decode threshold number of encoded data slices have already been received). The data slice EC protocol layer receive side module 512 recaptures collections of data segments to recover the data portions and combines the data portions to reproduce the data.

FIG. 46B is a schematic block diagram of another embodiment of a data communication system that includes the transmitting device 502 and a plurality of the receiving devices 504 of FIG. 46A. The transmitting device 502 transmits the encoded data slices of the random order of encoded data slices 516 as at least one of individual unicast transmissions of the robust transmission of data 518 to each receiving device 504 and as a broadcast of a common robust transmission of data 518 simultaneously to all of the receiving devices 504. Each receiving device 504 receives the robust transmission of data 518, receives the encoded data slices 520 of the random order of encoded data slices 516, and determines whether to issue a corresponding transmission of feedback 524 based on receiving and decoding the received encoded data slices 520. For example, a first receiving device 504 issues the corresponding transmission of feedback 524 indicating that additional encoded data slices are required for a set of encoded data slices and a second receiving device 504 does not issue another corresponding transmission of feedback 524 when receiving enough encoded data slices for the set of encoded data slices.

In response to receiving one or more transmissions of feedback 524, the transmitting device 502 may interrupt the robust transmission of data 518 to include additional encoded data slices of the encoded data slices 516. The transmitting device 502 may send the additional encoded data slices to a corresponding receiving device 504 requiring additional encoded data slices as a unicast message within the robust transmission of data 518 being transmitted to the corresponding receiving device 504. Alternatively, the transmitting device 502 may send the additional encoded data slices to all receiving devices 504 as a broadcast message when at least one of the receiving devices 504 requires the additional encoded data slices.

FIG. 46C is a schematic block diagram of an embodiment of the data slice error coded (EC) protocol layer transmit side module 506 and the processing module 510 of FIG. 46A, where the data slice EC protocol layer transmit side module 506 includes the data partitioning module 110 of FIG. 4, a data segmenting module 526, a segment buffer 528, a set of dispersed storage (DS) error encoding modules 112 of FIG. 4, a slice buffer 530, a set of subset selection modules 532, and a transmit buffer and multiplexer (MUX) module 534.

In an example of operation, the data partitioning module 110 uses a partitioning scheme to partition data 536 into a set of data partitions 538. For example, the data partitioning module 110 partitions the data into a set of a partition number (e.g., D) of equally sized data partitions 538. The data segmenting module 526 uses a segmenting scheme to segment the data partitions 538 to produce segments 540 and temporarily stores the segments 540 in the segment buffer 528 to provide a collection of data segments 542 for each of the DS error encoding modules 112. For example, the data segmenting module 526 segments the data partitions 538 to produce a first collection of data segments that includes data segments of one data partition. As another example, the data segmenting module 526 segments the data partitions 538 to produce first data segments of the data segments of a given number (e.g., D) of data partitions 538. As yet another example, the data segmenting module 526 segments the data partitions 538 to produce second data segments of the data segments of the given number of data partitions 538. As a still further example, the data segmenting module 526 segments the data partitions 538 to produce a data segment of a given number of data segments of the data segments of the given number of data partitions.

FIGS. 46D-G illustrate various segmenting schemes to provide the collection of data segments 542 from the segment buffer 528 to the set of DS error encoding modules 112. In particular, FIG. 46D illustrates an example where segments 540 from the data segmenting module 526 includes four data segments for each of four data partitions. The segment buffer 528 provides segment buffering 552 to output for collections of data segments where each collection includes the four data segments of a common data partition. For example, a segment collection 1 includes data segments 1-4 associated with data partition 1. FIG. 46E illustrates another example where the segment buffer 528 provides the segment buffering 552 output for the collections of data segments where each collection includes a common segment number of each of the data partitions. For example, the segment collection 1 includes four data segment 4s associated with each data partition 1-4. FIG. 46F illustrates another example where the segment buffer 528 provides the segment buffering 552 output for the collections of data segments where each collection includes a pseudorandom selection where the collection includes unique data segment numbers from unique data. For example, the segment collection 1 includes data segments associated with different data segment numbers from four different data partitions. FIG. 46G illustrates another example where the segment buffer 528 provides the segment buffering 552 output for the collections of data segments where each collection includes a random selection where the collection includes any data segment number from any data partition. For example, the segment collection 1 includes some common segment numbers and uncommon segment numbers of some common and uncommon data partitions.

Returning to the discussion of FIG. 46C, each of the DS error encoding modules 112 concurrently encodes an associated collection of data segments 542 in accordance with a dispersed storage error encoding function to produce sets of encoded data slices. Each set of encoded data slices includes a total number (e.g., n) of encoded data slices and corresponds to a data segment of the collection of data segments. A decode threshold number (e.g., k) of encoded data slices of the set of encoded data slices is required to recover the corresponding data segment. Each DS error encoding module 112 generates sets of slices names for associated sets of encoded data slices, where a slice name uniquely identifies an encoded data slice to a particular data segment of the collection of data segments. The set of DS error encoding modules 112 stores the sets of encoded data slices and sets of slice names in the slice buffer 530.

The processing module 510 determines a transmit number 544 to be initially greater than the decode threshold number and less than the total number. The set of subset selection modules 532 selects a transmit number of encoded data slices from each set of encoded data slices from the slice buffer 530 to produce sets of transmit encoded data slices 548. The processing module 510 coordinates with a recipient (e.g., the receiving device 504 of FIG. 46A) regarding the dispersed storage error encoding function and sends an indication of the transmit number 544 to recipient.

FIG. 46H illustrates one of many possible examples of selecting the transmit number of encoded data slices from the sets of encoded data slices where the sets of encoded data slices includes encoded data slices of a first collection of four data segments 1-4 where each data segment is encoded to produce six encoded data slices (EDS). For example, a fourth set of encoded data slices includes encoded data slices 1-6 of a fourth data segment of the first data segment collection. Each encoded data slice is stored in the slice buffer 530 along with a corresponding slice name. The slice name may be interpreted to identify a segment identifier that ties the encoded data slice to one of the collection of data segments, a data object identifier that ties the encoded data slice to the data, and a slice identifier that uniquely identifies the encoded data slice in the set of encoded data slices. The selecting of the transmit number of encoded data slices from each set of encoded data slices includes four encoded data slices for each transmit encoded data slice set of four transmit encoded data slices sets 1-4 as an output of subset selections 554. Each transmit encoded data slice set may include same or different slice numbers per set. For example, a transmit encoded data slices set 1 includes a first four encoded data slices 1-4 of the encoded data slice set 1 for segment 1 of data segment collection 1. As another example, a transmit encoded data slice set 3 includes encoded data slices 1-2 and 5-6 of the encoded data slice set 3 for segment 3 of data segment collection 1.

Returning to the discussion of FIG. 46C, the transmit buffer and MUX module 534 randomizes ordering of the sets of transmit encoded data slices 548 to produce a random order of encoded data slices 516 in accordance with an ordering pattern 550 to establish a transmit order 556. The transmit buffer and MUX module 534 transmits encoded data slices of the random order of encoded data slices 516 and sends, in an order corresponding to the randomized ordering, the sets of slice names with the random order of encoded data slices. FIGS. 46I-J illustrate an example of the transmit order 556. In the examples, the output of subset selections 554 that includes the sets of transmit encoded data slices of FIG. 46H are to be transmitted to the one or more recipients in accordance with the ordering pattern 550 and transmit order 556. In particular, FIG. 46I illustrates an example where the transmit order 556 includes sending encoded data slices of sequential segments 1-4 in a repetitive pattern. For instance, slice 4 of segment 1 is sent followed by a slice 4 of segment 2, followed by slice 6 of segment 3, followed by a slice 6 of segment 4, followed by slice 3 of segment 1, etc. As another example, FIG. 46J illustrates an example where the transmit order 556 includes sending encoded data slices using a random pattern. For instance, slice 4 of segment 1 is sent, followed by slice 4 segment 2, followed by slice 3 of segment 1, followed by slice 3 a segment 2, etc. Many other ordering patterns 550 and resulting transmit orders 556 are possible.

Returning to the discussion of FIG. 46C, the processing module 510 receives feedback 522 from one or more recipients of the random order of encoded data slices 516. The feedback 522 is in regards to one or more of reception and non-reception of sent encoded data slices and a request for more encoded data slices beyond a planned transmit encoded data slice set. Examples of generation of the feedback 522 will be discussed in greater detail with reference to FIGS. L-O. The processing module 510 interprets the feedback 522 to determine whether to adjust parameters of robust transmission of the encoded data slices and/or to send more than planned encoded data slices to the one or more recipients. For example, the processing module 510 interprets the feedback 522 to determine whether an adjustment should be made regarding the robust transmission (e.g., adjust when encoded data slice error rate too high or too low). When the adjustment should be made, the processing module 510 determines at least one of increasing or decreasing the number of data segments per data partition and increasing or decreasing the transmit number.

In an example of interpreting the feedback 522 to determine whether to send more than the planned encoded data slices to the one or more recipients, the processing module 510 interprets the feedback 522 to determine, for a data segment of the collection of data segments, that at least one more encoded data slice of the set of encoded data slices of the data segment is to be transmitted to the recipient such that the recipient has the decode threshold number of encoded data slices to recover the data segment. Next, the processing module 510 identifies another one more encoded data slices from a remaining subset of encoded data slices corresponding to the encoded data slices between the transmit number and the total number. Having identified the other one or more encoded data slices, the processing module 510 issues an interrupt 552 to the transmit buffer and MUX module 534 to interrupt the transmitting of the encoded data slices of the random order of encoded data slices 516 to send the other one more encoded data slices.

In another example of interpreting the feedback 522 to determine whether to send more than the planned encoded data slices to the one or more recipients, the processing module 510 interprets the feedback 522 to determine, for the data segment, whether the recipient has received the decode threshold number of encoded data slices for the data segment and whether another encoded data slice of the transmit number of encoded data slices for the data segment remain to be transmitted. When the recipient has received the decode threshold number of encoded data slices for the data segment and the other encoded data slice of the transmit number of encoded data slices remains to be transmitted, the processing module facilitates removal of the other encoded data slice from the random order of encoded data slices 516 (e.g., issues another interrupt 552 to the transmit buffer and MUX module 534 with a slice name corresponding to the other encoded data slice for removal).

In yet another example of interpreting the feedback 522 to determine whether to send more than the planned encoded data slices to the one or more recipients, the processing module 510 receives, from the recipient, feedback regarding accurate receipt of encoded data slices corresponding to the data segment (e.g., which were received and/or not received). Next, the processing module 510 interprets the feedback 522 to determine, for the data segment, whether the recipient will receive the decode threshold number of encoded data slices for the data segment based on a remaining number of encoded data slices of the transmit number of encoded data slices for the data segment that have not been transmitted. When the recipient will not receive the decode threshold number of encoded data slices for the data segment based on the remaining number of encoded data slices of the transmit number of encoded data slices for the data segment, the processing module 510 identifies another encoded data slice from a remaining subset of encoded data slices corresponding to the encoded data slices between the transmit number and the total number. The processing module 510 issues another interrupt 552 that includes identity of the other encoded data slice such that the transmit buffer and MUX module 534 adds the other encoded data slice to the random order of encoded data slices 516.

FIG. 46K is a schematic block diagram of an embodiment of the data slice error coded (EC) protocol layer receive side 512 and the processing module 514 of FIG. 46A, where the data slice EC protocol layer receive side module 512 includes the data de-partitioning module 184 of FIG. 13, a data de-segmenting module 558, a de-segment buffer 560, a set of dispersed storage (DS) error decoding modules 182 of FIG. 13, a set of threshold buffer modules 1-D, and a received buffer and a de-multiplexer (deMUX) module 561.

In an example of operation, the receive buffer and deMUX module 561 receives encoded data slices 520 of a random order of encoded data slices, where each encoded data slice has a unique slice name. The receive buffer and deMUX module 561 interprets slice names to de-randomize the random order of encoded data slices in accordance with an ordering patterned 550 into sets of transmit encoded data slices, where the sets of transmit encoded data slices corresponds to sets of encoded data slices. The ordering pattern 550 may be obtained by at least one of receiving the ordering pattern 550 from a sending entity, utilizing a predetermination, and determining the ordering pattern 550 based on interpreting the slice names.

The plurality sets of encoded data slices are dispersed storage error encoded versions of a collection of data segments of data portions of data. Each set of transmit encoded data slices includes a transmit number 544 of encoded data slices of a total number of encoded data slices of a corresponding set of encoded data slices. As a specific example of interpreting, the receive buffer and deMUX module 561 interprets, for an encoded data slice, a corresponding slice name to identify a segment identifier that ties the encoded data slice to one of the collection of data segments, a data object identifier that ties the encoded data slice to the data, and a slice identifier that uniquely identifies the encoded data slice in the set of encoded data slices. The receive buffer and deMUX module 561 outputs receiver buffer status 564 to the processing module 514, where the status 564 includes an indication of the slice names.

Each of the threshold buffers 1-D attempts to collect a decode threshold number 562 of encoded data slices 546 of sets of encoded data slices from the receive buffer and deMUX module 561 as the random order of encoded data slices 520 is received in accordance with a random reception order 568. The threshold buffers 1-D each provides a buffer status 566 to the processing module 514 indicating whether the decode threshold number 562 of encoded data slices 546 has been collected. FIGS. 46L-N illustrates examples of the random reception order 568 where four transmit encoded data slice sets 1-4 are transmitted with the transmit order 556 of FIG. 46I. In particular, FIG. 46L illustrates an example when all encoded data slices of the four transmit encoded data slice sets 1-4 are received with no errors. The decode threshold number of encoded data slices per set of the transmit encoded data slice sets has been received after receiving a third column of the four columns (e.g., when the decode threshold number is three). As such, transmission of additional encoded data slices for each of the transmit encoded data slice sets is not required. Feedback may be provided indicating that sufficient slices have been received.

As another example, FIG. 46M illustrates an example when a maximum number of contiguous encoded data slices are not received for the sets of transmit encoded data slices and each of the transmit encoded data slice sets are decodable when waiting for all of the encoded data slices of the transmit encoded data slice sets 1-4 to be received. As yet another example, FIG. 46N illustrates an example when too many encoded data slices are not received preventing decoding of at least one corresponding data segment. Interpretation of the received encoded data slices after two encoded data slices of the third transmit encoded data slice set were not received indicates that a sufficient number of encoded data slices for transmit encoded data slices set 3 will not be received from the transmit number of encoded data slices and at least one more encoded data slice is required.

Returning to the discussion of FIG. 46K, the processing module 514, on a set by set basis and in accordance with a dispersed storage error encoding function, determines whether the decode threshold number of encoded data slices of a set of transmit encoded data slices of the sets of transmit encoded data slices have been received based on one or more of the receiver buffer status 564 and the buffer status 566. When the decode threshold number of encoded data slices have not yet been received, the processing module 514 determines whether a sufficient number of encoded data slices of the set of transmit encoded data slices are still to be received (e.g., more slices should be received of the transmit number of slices). As a specific example, the processing module 514 identifies encoded data slices of the set of transmit encoded data slices that have been successfully received and determines how many more encoded data slices are to be received based on the transmit number and a current order position in the serially receiving the random order of encoded data slices. When a sum of the number of encoded data slices that have been successfully received and a number of the more encoded data slices to be received is equal to or greater than the decode threshold number, the processing module 514 indicates that the sufficient number of encoded data slices are still to be received.

When the sufficient number of encoded data slices are still to be received, the processing module 514 waits until the decode threshold number of encoded data slices are received. When less than the sufficient number of encoded data slices are still to be received, the processing module 514 sends a feedback message 522 that requests one or more encoded data slices of the set of encoded data slices to be transmitted. Alternatively, or in addition to, the processing module 514 sends the feedback message 522 that includes a request for one or more encoded data slices of the set of encoded data slices and slice names of encoded data slices that have been successfully received.

Once each of the threshold buffers 1-D has a decode threshold number of encoded data slices for each corresponding set of encoded data slices, each of the corresponding DS error decoding modules 182 decodes the decode threshold number of encoded data slices to recapture a corresponding data segment of the collection of data segments. In addition, the processing module 514 may determine whether one or more encoded data slices of the set of transmit encoded data slices are still to be received (e.g., now unnecessary). When the one or more encoded data slices are still to be received, the processing module 514 sends another feedback message 522 requesting that the one or more encoded data slices not be sent.

Each DS error decoding module 182 outputs collections of data segments 542 to the de-segment buffer 560. Each of the de-segment buffer 560, the data de-segmenting module 558, and the data de-partitioning module 184 perform opposite functions as compared to corresponding counterparts including the segment buffer 528, the data segmenting module 526, and the data partitioning module 110 of FIG. 46C. For example, the data de-segmenting module 558 de-segments data segments 540 to recover the data partitions 538 (e.g., data portions). The data de-partitioning module 184 combines the data partitions to reproduce data 536.

FIG. 46O is a diagram illustrating an example of interrupt transmit ordering of encoded data slices that includes the transmitting device 502 and the receiving device 504 of FIG. 46A. In an example of operation, the transmitting device 502 sends the robust transmission of data 518 to the receiving device 504 that includes the transmit encoded data slices sets 1-4 transmitted in accordance with the transmit order 556 of FIG. 46I. The receiving device 502 determines that two encoded data slices of transmit encoded data slices set 3 are not received and issues a transmission of feedback 524 that includes feedback with regards to the two encoded data slices that were not received. The transmitting device 502 receives the feedback and determines how many and which encoded data slices to send to the receiving device 504. For instance, the transmitting device 502 identifies encoded data slice 4 of the set of encoded data slices associated with the transmit encoded data slices set 3.

The transmitting device 502 may interrupt the robust transmission of data 518 at any time. In this example, the transmitting device 502 sends an interrupt transmission of data 570 to the receiving device 504, where the interrupt transmission of data 570 includes the encoded data slice 4. For instance, the transmitting device 502 interrupts the robust transmission of data 518 after completion of sending of a second column of the sets of transmit encoded data slices to send encoded data slice 4 of the set of encoded data slices associated with the transmit encoded data slices set 3. In another instance, the transmitting device 502 sends the encoded data slice 4 after sending the transmit number of encoded data slices for each transmit encoded data slices set.

FIG. 46P is a flowchart illustrating an example of encoding data for a robust transmission of the data to a recipient. The method begins at step 572 where a processing module (e.g., of a distributed storage and task client module) divides the data for transmission into data partitions, where a data partition includes data segments. For a collection of data segments of the data segments from one or more data partitions, the method continues at step 574 where the processing module concurrently encodes the collection of data segments using a dispersed storage error encoding function to produce sets of encoded data slices. The collection of data segments includes one of: the data segments of one of the data partitions, first data segments of the data segments of a given number of data partitions, second data segments of the data segments of the given number of data partitions, and a data segment of a given number of data segments of the given number of data partitions. Each set of encoded data slices includes a total number of encoded data slices and corresponds to a data segment of the collection of data segments. A decode threshold number of encoded data slices of the set of encoded data slices is required to recover the corresponding data segment.

The method continues at step 576 where the processing module coordinates with the recipient regarding the dispersed storage error encoding function. As a specific example, the processing module issues dispersed storage error encoding function information (e.g., function identifier, dispersal parameters) to the recipient. As another specific example, the recipient requests the dispersed storage error coding function information. The method continues at step 578 where the processing module generates sets of slices names for the sets of encoded data slices, where each slice name uniquely identifies an encoded data slice to a particular data segment of the collection of data segments. The method continues at step 580 where the processing module determines a transmit number to be initially greater than the decode threshold number and less than the total number. The method continues at step 582 where the processing module sends an indication of the transmit number to the recipient.

The method continues at step 584 where the processing module selects a transmit number of encoded data slices from each of the sets of encoded data slices to produce sets of transmit encoded data slices. The method continues at step 586 where the processing module randomizes ordering of the plurality of sets of transmit encoded data slices to produce a random order of encoded data slices. The method continues at step 588 where the processing module transmits encoded data slices of the random order of encoded data slices, where an encoded data slice error rate corresponds to a number of data segments per data partition and the transmit number minus the decode threshold. The method continues at step 590 where the processing module sends, in an order corresponding to the randomized ordering, the sets of slice names with the random order of encoded data slices.

The method continues at step 592 where the processing module receives feedback from the recipient of the transmit encoded data slices. As a specific example, the processing module receives, from the recipient, feedback regarding accurate receipt of encoded data slices corresponding to a data segment of the collection of data segments (e.g., slice names of received encoded data slices, slice names of non-received encoded data slices). The method continues at step 594 where the processing module interprets the feedback to determine whether an adjustment should be made regarding the robust transmission. For example, the processing module determines to adjust parameters of the robust transmission when the encoded data slice error rate is greater than a maximum error rate threshold. The method branches to step 598 when the processing module determines not to adjust the robust transmission. The method continues to step 596 when the processing module determines to adjust the robust transmission. The method continues at step 596 where the processing module determines at least one of increasing or decreasing the number of data segments per data partition and increasing or decreasing the transmit number.

The method continues at step 598 where the processing module interprets the feedback to determine whether to add or remove encoded data slices of the robust transmission. As a specific example of interpreting the feedback, the processing module interprets the feedback to determine, for the data segment, whether the recipient has received the decode threshold number of encoded data slices for the data segment and whether at least one encoded data slice of the transmit number of encoded data slices for the data segment remains to be transmitted. When the recipient has received the decode threshold number of encoded data slices for the data segment and the at least one encoded data slice of the transmit number of encoded data slices remains to be transmitted, the method branches to step 600 to remove encoded data slices of the robust transmission. As another specific example of interpreting the feedback, the processing module interprets the feedback to determine, for a data segment of the collection of data segments, that at least one more encoded data slice of the set of encoded data slices of the data segment is to be transmitted to the recipient such that the recipient has the decode threshold number of encoded data slices to recover the data segment. When the at least one more encoded data slice of the set of encoded data slices of the data segment is to be transmitted to the recipient such that the recipient has the decode threshold number of encoded data slices to recover the data segment, the method branches to step 602 to add encoded data slices. As another specific example of interpreting the feedback, the processing module interprets the feedback to determine, for the data segment, whether the recipient will receive the decode threshold number of encoded data slices for the data segment based on a remaining number of encoded data slice of the transmit number of encoded data slices for the data segment that have not been transmitted. When the recipient will not receive the decode threshold number of encoded data slices for the data segment based on the remaining number of encoded data slices of the transmit number of encoded data slices for the data segment, the method branches to step 604 to add encoded data slices.

When the recipient has received the decode threshold number of encoded data slices for the data segment and the at least one encoded data slice of the transmit number of encoded data slices remains to be transmitted, the method continues at step 600 where the processing module removes the at least one encoded data slice from the random order of encoded data slices. When the at least one more encoded data slice of the set of encoded data slices of the data segment is to be transmitted to the recipient such that the recipient has the decode threshold number of encoded data slices to recover the data segment, the method continues at step 602 where the processing module identifies the at least one more encoded data slice from a remaining subset of encoded data slices corresponding to the encoded data slices between the transmit number and the total number. Next, the processing module interrupts the transmitting of the encoded data slices of the random order of encoded data slices to send the at least one more encoded data slice. When the recipient will not receive the decode threshold number of encoded data slices for the data segment based on the remaining number of encoded data slices of the transmit number of encoded data slices for the data segment, the method continues at step 604 where the processing module identifies the at least one more encoded data slice from the remaining subset of encoded data slices corresponding to the encoded data slices between the transmit number and the total number. Next, the processing module adds the at least one more encoded data slice to the random order of encoded data slices.

FIG. 46Q is a flowchart illustrating an example of decoding data for robust reception of the data. The method begins at step 606 where a processing module (e.g., of a distributed storage and task (DST) client module) receives encoded data slices of a random order of encoded data slices. Each encoded data slice of the random order of encoded data slices has a unique slice name. An encoded data slice error rate corresponds to a number of data segments per data partition and a transmit number minus a decode threshold number. The method continues at step 608 where the processing module interprets slice names to de-randomize the random order of encoded data slices into sets of transmit encoded data slices. The sets of transmit encoded data slices corresponds to sets encoded data slices, where the sets of encoded data slices is a dispersed storage error encoded version of a collection of data segments of a data portion of data portions of the data. Each set of transmit encoded data slices includes the transmit number of encoded data slices of a total number of encoded data slices of a corresponding set of encoded data slices.

As a specific example, the processing module interprets, for an encoded data slice, a corresponding slice name to identify a segment identifier that ties the encoded data slice to one of the collection of data segments. As another specific example, the processing module interprets the corresponding slice name to identify a data object identifier that ties the encoded data slice to the data. As yet another specific example, the processing module interprets the corresponding slice name to identify a slice identifier that uniquely identifies the encoded data slice in the set of encoded data slices.

The method continues at step 610, where the processing module, on a set by set basis and in accordance with a dispersed storage error encoding function (e.g., using the decode threshold number), determines whether the decode threshold number of encoded data slices of a set of transmit encoded data slices of the sets of transmit encoded data slices have been received. The method branches to step 616 when the decode threshold number of encoded data slices have not been received. The method continues to step 612 when the decode threshold number of encoded data slices have been received. The method continues at step 612 where the processing module determines whether one or more encoded data slices of the set of transmit encoded data slices are still to be received when the decode threshold number of encoded data slices have been received (e.g., based on interpretation of a transmit ordering pattern and the decode threshold number). When the one or more encoded data slices are still to be received, the method continues at step 614 where the processing module sends a feedback message requesting that the one or more encoded data slices not be sent. The method branches to step 624.

When the decode threshold number of encoded data slices have not yet been received, the method continues at step 616 where the processing module determines whether a sufficient number of encoded data slices of the set of transmit encoded data slices are still to be received. As a specific example, the processing module identifies encoded data slices of the set of transmit encoded data slices that have been successfully received and determines how many more encoded data slices are to be received based on the transmit number and a current order position in serially receiving the random order of encoded data slices. When the processing module determines that a sum of the number of encoded data slices that have been successfully received and a number of the more encoded data slices to be received is equal to or greater than the decode threshold number, the processing module indicates that the sufficient number of encoded data slices are still to be received. The method branches to step 622 where the processing module determines that less than the sufficient number of encoded data slices are still to be received. The method continues to step 618 when the sufficient number of encoded data slices are still to be received. The method continues at step 618 where the processing module waits until the decode threshold number of encoded data slices are received when the sufficient number of encoded data slices are still to be received. When the decode threshold number of encoded data slices are received, the method continues at step 620 where the processing module decodes the decode threshold number of encoded data slices to recapture a corresponding data segment of the collection of data segments. The method branches to step 624.

When less than the sufficient number of encoded data slices are still to be received, the method continues at step 622 where the processing module sends a feedback message that requests one or more encoded data slices of the set of encoded data slices to be transmitted. Alternatively, the processing module sends a feedback message that includes a request for the one or more encoded data slices of the set of encoded data slices and slice names of encoded data slices that have been successfully received.

The method continues at step 624 where the processing module recovers the data portions. For example, the processing module aggregates corresponding collections of data segments to reproduce each data portion. The method continues at step 626 where the processing module combines the data portions to reproduce the data.

FIG. 47A is a schematic block diagram of another embodiment of a distributed storage and task (DST) execution unit 36 that includes a plurality of the interfaces 169, a plurality of the processing modules 84, a plurality of the memories 88, a plurality of the distributed task (DT) execution modules 90, and a plurality of the DST client modules 34 of FIGS. 3 and 11. The DST execution unit 36 receives, via at least one interface 169, requests to execute a plurality of tasks. A task of the plurality of tasks includes at least one of rebuilding data, balancing data, migrating data, accessing data, writing data, reading data, determining a result, verifying consistency of data, scanning for lost slices, performing rebuilding operations, encrypting slices, decrypting slices, calculating an integrity value, comparing the calculated integrity value to a received integrity value, and processing a distributed computing job.

At least one processing module 84 determines a priority level associated with the task. The determining may be based on one or more of a task prioritization scheme, a task type, an estimated duration of task completion, a requesting entity identifier (ID), a task execution resource performance level, and prioritization guidance (e.g., allowable to increase priority, allowable to decrease priority). The determining of the priority level associated with the task may be performed at any time including initial receipt of the task by the DST execution unit 36 and any subsequent time period thereafter up to when the task is executed. For example, the processing module 84 lowers the priority level associated with the task during execution of the task when the task execution resource performance level indicates that the task execution is very favorable.

At least one of the processing module 84 and a DT execution module 90 assigns resources of the DST execution unit 36 to execute the task in accordance with the priority level of the task. For example, the processing module 84 assigns a higher than average number of resources to the task when the priority level is higher than average. The assigning may be performed at any time during execution of the tasks including an initial assignment and a subsequent assignment during task execution. The resources for execution of the task include one or more of allocated memory 88, processing threads, number of processing modules, amount of processing utilization, number of DT execution modules 90, number of DST client modules 34, amount of memory 88, and amount of memory bandwidth. The method of operation to assigning the priority level and to assign the resources is discussed in greater detail with reference to FIG. 47B.

FIG. 47B is a flowchart illustrating an example of prioritizing tasks. The method begins at step 630 where a processing module (e.g., of a distributed storage and task (DST) execution unit) identifies required resources for one or more tasks of a plurality of pending tasks. The identifying is based on one or more of a lookup, receiving a resource identifier, accessing a record of a previous resource assignment, and a table of required resources and tasks. The method continues at step 632 where the processing module determines resource availability information for one or more resources of a plurality of resources. The determining may be based on one or more of a lookup, initiating a query, receiving the availability information, accessing a historical record of resource availability, and initiating a test.

The method continues at step 634 where the processing module determines a task priority level for each of the one more tasks of the plurality of pending tasks in accordance with a task prioritization scheme. The task prioritization scheme may indicate which types of tasks are to be prioritized higher or lower than other tasks. The method continues at step 636 where the processing module facilitates execution of the one or more tasks of the plurality of pending tasks in accordance with the task priority level for each of the one or more tasks of the plurality of pending tasks and a task priority level of each other task of the plurality of pending tasks. For example, the processing module executes tasks in order of priority and time received when the tasks include a common priority level.

The method continues at step 638 where the processing module determines a task execution performance level for one or more tasks of a plurality of executing tasks. The determining may be based on one or more of receiving, initiating a query, and measuring. The method continues at step 640 where the processing module determines an updated task priority level for each of the one or more tasks of the plurality of executing tasks based on the task performance level for the one or more tasks of the plurality of executing tasks and in accordance with the task priority prioritizing scheme. For example, the processing module raises the task priority level when execution of the task is falling behind a desired schedule. As another example the processing module lowers the task priority level when lowering of the task priority is allowable and execution the task is at least meeting expectations of the desire schedule.

The method continues at step 642 where the processing module facilitates execution of the one or more tasks of the plurality of executing tasks in accordance with the updated task priority level for each of the one or more tasks of the plurality of executing tasks. For example, a number of processing threads available for a DT execution module to execute a distributed computing task may be reduced to four from eight and a number of processing threads available for a DST client module to perform a slice rebuilding task may be increased to six from two when an updated task priority level of the rebuilding task is increased and an updated task priority level of the distributed computing task is lowered.

FIG. 48 is a flowchart illustrating an example of generating a tracking record. The method begins at step 644 where a processing module (e.g., of a distributed storage and task (DST) client module) receives a request to store data. The method continues at step 646 where the processing module generates and stores a tracking record that includes a timestamp of receiving the request. The receiving of the request may align with a tracking record trigger associated with at least one of detecting an error, detecting a number of operations, upon receiving a request, and always.

The method continues at step 648 where the processing module segments data to produce a plurality of sets of data segments in accordance with a segmentation scheme. The method continues at step 650 where the processing module generates and stores a tracking record that includes one or more of a timestamp of segmenting complete, a number of data segments, a size of a data segment, and an identifier of the segmentation scheme.

For each data segment of the plurality of data segments, the method continues at step 652 where the processing module encodes the data segment using a dispersed storage error coding function in accordance with an encoding scheme to produce a set of encoded data slices. The encoding scheme includes utilization of one or more codecs. The codecs include at least one of error coding, calculating an integrity value, interleaving, encrypting, compressing, expanding, appending additional information, and generating a slice name. The method continues at step 654 where the processing module generates and stores a tracking record that indicates one or more of a timestamp of encoding complete and identifiers of the one or more codecs.

For each encoded data slice of the set of encoded data slices, the method continues at step 656 where the processing module outputs the encoded data slice to the corresponding DST execution unit. The outputting includes a series of steps. A first step includes selecting the corresponding DST execution unit from a set of DST execution units. The selecting may be based on one or more of a requesting entity identifier, a vault identifier, a slice name to physical location table lookup, and receiving an identifier of the corresponding DST execution unit. A second step includes generating a write slice request to include the encoded data slice. A third step includes sending the write slice request to the corresponding DST execution unit. The method continues at step 658 where the processing module generates and stores a tracking record that includes one or more of a timestamp of sending complete, the identifier of the corresponding DST execution unit, and a portion of the write slice request.

For each encoded data slice of the set of encoded data slices, the method continues at step 660 where the processing module receives an acknowledgment from the corresponding DST execution unit. The method continues at step 662 where the processing module generates and stores a tracking record that includes one or more of a timestamp of acknowledgment receipt and at least a portion of the acknowledgment.

When receiving at least a write threshold number of acknowledgments, the method continues at step 664 where the processing module generates and stores a tracking record that includes at least one of a timestamp of receipt of the write threshold number of acknowledgments, identifiers of DST execution units associated with the receipt of the write threshold number of acknowledgments, a number of DST execution units associated with the receipt of the write threshold number of acknowledgments.

Alternatively, or in addition to, when receiving at least a threshold number of acknowledgments, the processing module generates and stores a tracking record that includes at least one of a timestamp of receipt of the threshold number of acknowledgments, identifiers of DST execution units associated with the receipt of the threshold number of acknowledgments, and a number of DST execution units associated with the receipt of the threshold number of acknowledgments. The threshold number includes one of a decode threshold number and a pillar width number.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for robust reception of data by one or more processing modules including processing hardware, the method comprises:
as encoded data slices of a random order of encoded data slices are received:
determining, via the processing hardware, whether an encoded data slice error rate has been reached, wherein each encoded data slice of the random order of encoded data slices has a unique slice name such that the random order of encoded data slices has a corresponding plurality of slice names, and wherein an encoded data slice error rate corresponds to a mathematical function of a number of data segments per data partition, a transmit number, a decode threshold number, and a total number of encoded data slices per set of encoded data slices;
when the encoded data slice error rate has not been reached:
interpreting, via the processing hardware, a slice index, a segment indicator, and a collection indicator of the corresponding plurality of slice names to determine the random order and to de-randomize the random order of encoded data slices into a plurality of sets of transmit encoded data slices, wherein the plurality of sets of transmit encoded data slices corresponds to a plurality of sets of encoded data slices, wherein the plurality of sets of encoded data slices is a dispersed storage error encoded version of a collection of data segments of a data portion of a plurality of data portions of the data, wherein one of the plurality of sets of transmit encoded data slices includes the transmit number of encoded data slices of a total number of encoded data slices of a corresponding one of the plurality of sets of encoded data slices; and on a set by set basis and in accordance with a dispersed storage error encoding function:
determining, via the processing hardware, whether the decode threshold number of encoded data slices of a set of transmit encoded data slices of the plurality of sets of transmit encoded data slices have been received;
when the decode threshold number of encoded data slices have not yet been received, determining, via the processing hardware, whether a sufficient number of encoded data slices of the set of transmit encoded data slices are still to be received based on the determined random order and the de-randomizing of the random order of encoded data slices wherein the determining whether the sufficient number of encoded data slices is still to be received comprises:
identifying encoded data slices of the set of transmit encoded data slices that have been successfully received;
determining how many more encoded data slices are to be received based on the transmit number and a current order position in the receiving of the random order of encoded data slices; and
when a sum of a number of encoded data slices that have been successfully received and a number of the more encoded data slices to be received is equal to or greater than the decode threshold number, indicating that the sufficient number of encoded data slices are still to be received;
when the sufficient number of encoded data slices are still to be received, waiting, via the processing hardware, until the decode threshold number of encoded data slices are received; and
when the decode threshold number of encoded data slices are received, decoding, via the processing hardware, the decode threshold number of encoded data slices to recapture a corresponding data segment of the collection of data segments.

2. The method of claim 1 further comprises at least one of:
when less than the sufficient number of encoded data slices are still to be received, sending a feedback message that requests one or more encoded data slices of the set of transmit encoded data slices to be transmitted; or
when less than the sufficient number of encoded data slices are still to be received, sending a feedback message that includes a request for one or more encoded data slices of the set of transmit encoded data slices and slice names of encoded data slices that have been successfully received.

3. The method of claim 1 further comprises:
when the encoded data slice error rate has been reached, sending a feedback message that includes a request for retransmission of the random order of encoded data slices.

4. The method of claim 1 further comprises:
when the decode threshold number of encoded data slices have been received, determining whether one or more encoded data slices of the set of transmit encoded data slices are still to be received; and
when the one or more encoded data slices are still to be received, sending a feedback message requesting that the one or more encoded data slices not be sent.

5. The method of claim 1 further comprises:
recovering the plurality of data portions; and
combining the plurality of data portions to reproduce the data.

6. The method of claim 1, wherein the interpreting the corresponding plurality of slice names comprises:
interpreting, for an encoded data slice of the plurality of encoded data slices, a corresponding slice name of the corresponding plurality of slice names to identify a segment identifier that ties the encoded data slice to one of the collection of data segments, a data object identifier that ties the encoded data slice to the data, and a slice identifier that uniquely identifies the encoded data slice in the set of transmit encoded data slices.

7. A non-transitory computer readable storage medium that stores operational instructions, that when executed by processing hardware, cause the processing hardware to perform the following:
as encoded data slices of a random order of encoded data slices are received:
determine whether an encoded data slice error rate has been reached, wherein each encoded data slice of the random order of encoded data slices has a unique slice name such that the random order of encoded data slices has a corresponding plurality of slice names, and wherein an encoded data slice error rate corresponds to a mathematical function of a number of data segments per data partition, a transmit number, a decode threshold number, and a total number of encoded data slices per set of encoded data slices;
when the encoded data slice error rate has not been reached:
interpret a slice index, a segment indicator, and a collection indicator of the corresponding plurality of slice names to determine the random order and to de-randomize the random order of encoded data slices into a plurality of sets of transmit encoded data slices, wherein the plurality of sets of transmit encoded data slices corresponds to a plurality of sets of encoded data slices, wherein the plurality of sets of encoded data slices is a dispersed storage error encoded version of a collection of data segments of a data portion of a plurality of data portions of data, wherein one of the plurality of sets of transmit encoded data slices includes the transmit number of encoded data slices of a total number of encoded data slices of a corresponding one of the plurality of sets of encoded data slices;
on a set by set basis and in accordance with a dispersed storage error encoding function:
determine whether the decode threshold number of encoded data slices of a set of transmit encoded data slices of the plurality of sets of transmit encoded data slices have been received;

when the decode threshold number of encoded data slices have not yet been received, determine whether a sufficient number of encoded data slices of the set of transmit encoded data slices are still to be received based on the determined random order and the de-randomizing of the random order of encoded data slices wherein the determining whether the sufficient number of encoded data slices is still to be received comprises:
identifying encoded data slices of the set of transmit encoded data slices that have been successfully received;
determining how many more encoded data slices are to be received based on the transmit number and a current order position in the receiving of the random order of encoded data slices; and
when a sum of a number of encoded data slices that have been successfully received and a number of the more encoded data slices to be received is equal to or greater than the decode threshold number, indicating that the sufficient number of encoded data slices are still to be received; and
when the sufficient number of encoded data slices are still to be received, wait until the decode threshold number of encoded data slices are received; and
when the decode threshold number of encoded data slices are received, decode the decode threshold number of encoded data slices to recapture a corresponding data segment of the collection of data segments.

8. The non-transitory computer readable storage medium of claim 7 wherein the operational instructions, when executed by the processing hardware, cause the processing hardware to perform at least one of:
when less than the sufficient number of encoded data slices are still to be received, send a feedback message that requests one or more encoded data slices of the set of transmit encoded data slices to be transmitted; or
when less than the sufficient number of encoded data slices are still to be received, sending a feedback message that includes a request for one or more encoded data slices of the set of transmit encoded data slices and slice names of encoded data slices that have been successfully received.

9. The non-transitory computer readable storage medium of claim 7 wherein the operational instructions, when executed by the processing hardware, cause the processing hardware to:
when the encoded data slice error rate has been reached, sending a feedback message that includes a request for retransmission of the random order of encoded data slices.

10. The non-transitory computer readable storage medium of claim 7 wherein the operational instructions, when executed by the processing hardware, cause the processing hardware to:
when the decode threshold number of encoded data slices have been received, determine whether one or more encoded data slices of the set of transmit encoded data slices are still to be received; and
when the one or more encoded data slices are still to be received, send a feedback message requesting that the one or more encoded data slices not be sent.

11. The non-transitory computer readable storage medium of claim 7 wherein the operational instructions, when executed by the processing hardware, cause the processing hardware to:
recover the plurality of data portions; and
combine the plurality of data portions to reproduce data.

12. The non-transitory computer readable storage medium of claim 7 wherein the operational instructions, when executed by the processing hardware, cause the processing hardware to interpret the corresponding plurality of slice names by:
interpreting, for an encoded data slice of the plurality of encoded data slices, a corresponding slice name of the corresponding plurality of slice names to identify a segment identifier that ties the encoded data slice to one of the collection of data segments, a data object identifier that ties the encoded data slice to the data, and a slice identifier that uniquely identifies the encoded data slice in the set of transmit encoded data slices.

13. A processing system that includes processing hardware of a dispersed storage network, the processing hardware including a memory that stores operational instructions and at last one processor that executes the operational instructions, the processing hardware configured to perform the following:
as encoded data slices of a random order of encoded data slices are received:
determine whether an encoded data slice error rate has been reached, wherein each encoded data slice of the random order of encoded data slices has a unique slice name such that the random order of encoded data slices has a corresponding plurality of slice names, and wherein an encoded data slice error rate corresponds to a mathematical function of a number of data segments per data partition, a transmit number, a decode threshold number, and a total number of encoded data slices per set of encoded data slices;
when the encoded data slice error rate has not been reached:
interpret a slice index, a segment indicator, and a collection indicator of the corresponding plurality of slice names to determine the random order and to de-randomize the random order of encoded data slices into a plurality of sets of transmit encoded data slices, wherein the plurality of sets of transmit encoded data slices corresponds to a plurality of sets of encoded data slices, wherein the plurality of sets of encoded data slices is a dispersed storage error encoded version of a collection of data segments of a data portion of a plurality of data portions of data, wherein one of the plurality of sets of transmit encoded data slices includes the transmit number of encoded data slices of a total number of encoded data slices of a corresponding one of the plurality of sets of encoded data slices;
on a set by set basis and in accordance with a dispersed storage error encoding function:
determine whether the decode threshold number of encoded data slices of a set of transmit encoded data slices of the plurality of sets of transmit encoded data slices have been received;
when the decode threshold number of encoded data slices have not yet been received, determine whether a sufficient number of encoded data slices of the set of transmit encoded data slices are still to be received based on the determined random order and the de-randomizing of the random order of encoded data slices wherein the determining whether the sufficient number of encoded data slices is still to be received comprises:

identifying encoded data slices of the set of transmit encoded data slices that have been successfully received;

determining how many more encoded data slices are to be received based on the transmit number and a current order position in the receiving of the random order of encoded data slices; and when a sum of a number of encoded data slices that have been successfully received and a number of the more encoded data slices to be received is equal to or greater than the decode threshold number, indicating that the sufficient number of encoded data slices are still to be received; and when the sufficient number of encoded data slices are still to be received, wait until the decode threshold number of encoded data slices are received; and when the decode threshold number of encoded data slices are received, decode the decode threshold number of encoded data slices to recapture a corresponding data segment of the collection of data segments.

14. The processing system of claim 13 wherein the processing hardware is further configured to perform at least one of:

when less than the sufficient number of encoded data slices are still to be received, send a feedback message that requests one or more encoded data slices of the set of transmit encoded data slices to be transmitted; or when less than the sufficient number of encoded data slices are still to be received, sending a feedback message that includes a request for one or more encoded data slices of the set of transmit encoded data slices and slice names of encoded data slices that have been successfully received.

15. The processing system of claim 13 wherein the processing hardware is further configured to:

when the encoded data slice error rate has been reached, sending a feedback message that includes a request for retransmission of the random order of encoded data slices.

16. The processing system of claim 13 wherein the processing hardware is further configured to:

when the decode threshold number of encoded data slices have been received, determine whether one or more encoded data slices of the set of transmit encoded data slices are still to be received; and when the one or more encoded data slices are still to be received, send a feedback message requesting that the one or more encoded data slices not be sent.

17. The processing system of claim 13 wherein the processing hardware is further configured to:

recover the plurality of data portions; and combine the plurality of data portions to reproduce data.

* * * * *